US012513472B2

(12) United States Patent
McKinney et al.

(10) Patent No.: US 12,513,472 B2
(45) Date of Patent: Dec. 30, 2025

(54) EAR-WORN ELECTRONIC DEVICE EMPLOYING USER-INITIATED ACOUSTIC ENVIRONMENT ADAPTATION

(71) Applicant: STARKEY LABORATORIES, INC., Eden Prairie, MN (US)

(72) Inventors: Martin McKinney, Edina, MN (US); David Fabry, Eden Prairie, MN (US); Jumana Harianawala, Eden Prairie, MN (US); Ke Zhou, Prior Lake, MN (US); Jaymin Baroda, Eden Prairie, MN (US); Brantly Sturgeon, Burnsville, MN (US); Christopher Larry Howes, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 18/737,541

(22) Filed: Jun. 7, 2024

(65) Prior Publication Data

US 2024/0323615 A1  Sep. 26, 2024

Related U.S. Application Data

(60) Division of application No. 17/733,207, filed on Apr. 29, 2022, now Pat. No. 12,035,107, which is a
(Continued)

(51) Int. Cl.
*H04R 25/00* (2006.01)
*H04R 25/02* (2006.01)

(52) U.S. Cl.
CPC .............. *H04R 25/50* (2013.01); *H04R 25/02* (2013.01); *H04R 2225/41* (2013.01); *H04R 2225/43* (2013.01)

(58) Field of Classification Search
CPC .... H04R 25/50; H04R 25/02; H04R 2225/41; H04R 2225/43
See application file for complete search history.

(56) References Cited

U.S. PATENT DOCUMENTS

| 7,340,231 B2 | 3/2008 | Behrens |
| 10,235,128 B2 | 3/2019 | Vaughn |

(Continued)

FOREIGN PATENT DOCUMENTS

| EP | 1432282 | 6/2004 |
| EP | 2255548 | 5/2013 |

(Continued)

OTHER PUBLICATIONS

Wikipedia, Non-volatile memory, published Jan. 2019, https://web.archive.org/web/20190107230131/https://en.wikipedia.org/ wiki/ Non-volatile memory (Year: 2019).
(Continued)

*Primary Examiner* — Mark Fischer
(74) *Attorney, Agent, or Firm* — Mueting Raasch Group

(57) ABSTRACT

An ear-worn electronic device comprises a microphone configured to sense sound in an acoustic environment, an acoustic transducer, and a non-volatile memory configured to store a plurality of parameter value sets, each of the parameter value sets associated with a different acoustic environment. A control input is configured to receive a control input signal produced by at least one of a user-actuatable control of the ear-worn electronic device and an external electronic device communicatively coupled to the ear-worn electronic device in response to a user action. A processor is configured to classify the acoustic environment using the sensed sound and determine a listening intent preference of the user. The processor is configured to apply, in response to the control input signal, one of the parameter
(Continued)

value sets appropriate for the classification and the listening intent preference of the user.

20 Claims, 19 Drawing Sheets

Related U.S. Application Data continuation-in-part of application No. 17/770,680, filed as application No. PCT/US2021/012016 on Jan. 3, 2021.

(60) Provisional application No. 63/108,765, filed on Nov. 2, 2020, provisional application No. 62/956,824, filed on Jan. 3, 2020.

(56) References Cited

U.S. PATENT DOCUMENTS

| | | | |
|---|---|---|---|
| 10,262,673 | B2 | 4/2019 | Ray |
| 11,641,556 | B2 | 5/2023 | Gandhi |
| 2007/0286350 | A1 | 12/2007 | Krause |
| 2009/0296965 | A1 | 12/2009 | Kojima |
| 2011/0137656 | A1 | 6/2011 | Xiang |
| 2011/0176697 | A1 | 7/2011 | Apfel |
| 2015/0030170 | A1 | 1/2015 | Fitz |
| 2015/0195641 | A1* | 7/2015 | Di Censo ............ H04R 1/1083 381/71.6 |
| 2015/0271607 | A1 | 9/2015 | Sabin |
| 2016/0309267 | A1 | 10/2016 | Fitz |
| 2019/0066710 | A1 | 2/2019 | Bryan |
| 2019/0342677 | A1 | 11/2019 | Gran |
| 2020/0380979 | A1 | 12/2020 | Meacham |

FOREIGN PATENT DOCUMENTS

| | | |
|---|---|---|
| EP | 2830330 | 1/2015 |
| EP | 3082350 | 10/2016 |
| EP | 3468227 | 5/2023 |
| WO | WO 2018021920 | 2/2018 |

OTHER PUBLICATIONS

PCT International Search Report and Written Opinion for PCT/US2021/012016 dated Apr. 16, 2021 (11 pages).

Saeidi et al., "Speaker Recognition For Speech Under Face Cover", ISCA (the International Search Communication Association), 2015, 6 pages, https://erepo.uef.fi/bistream/handle/123456789/4370/saeidi_speaker_2015.pdf?sequence=1&isAllowed (Year: 2015).

Palmiero et al., "Speech Intelligibility Assessment of Protective Facemasks and Air-Purifying Respirators", Journal of Occupational and Environmental Hygiene, vol. 13, No. 12, Jun. 30, 2016, pp. 960-968.

PCT Search Report and Written Opinion for PCT/US2021/012017 dated Apr. 15, 2021 (17 pages).

\* cited by examiner

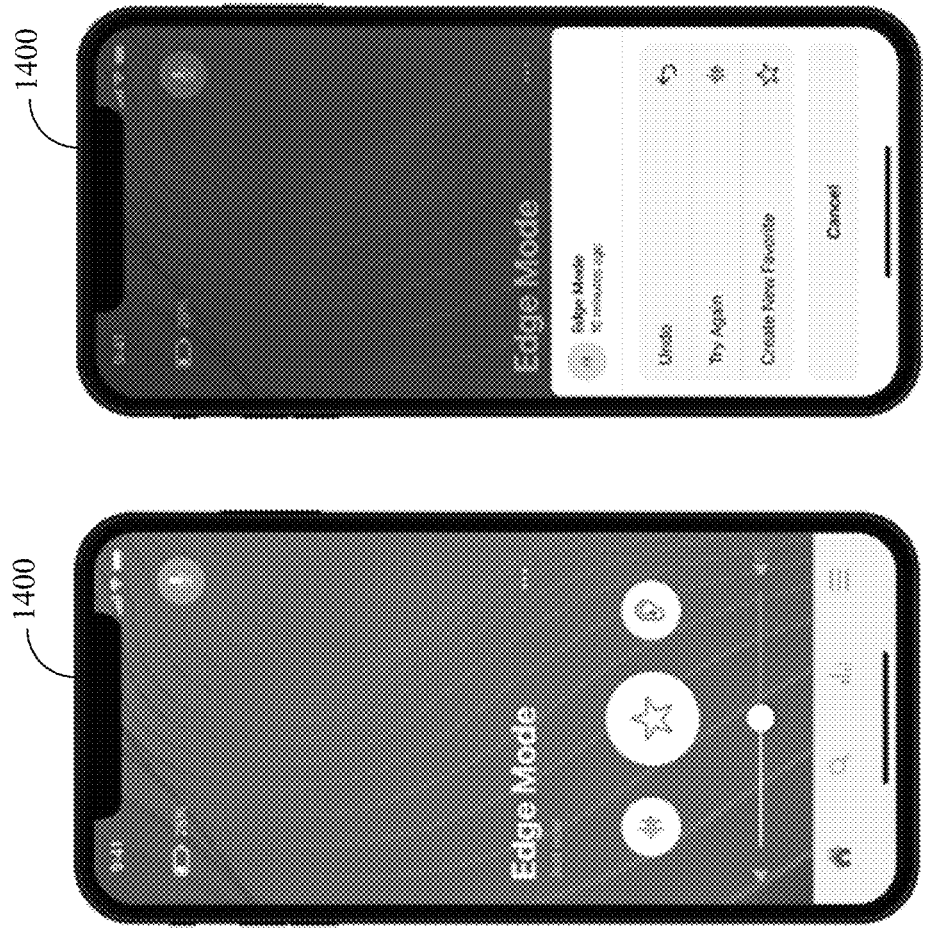
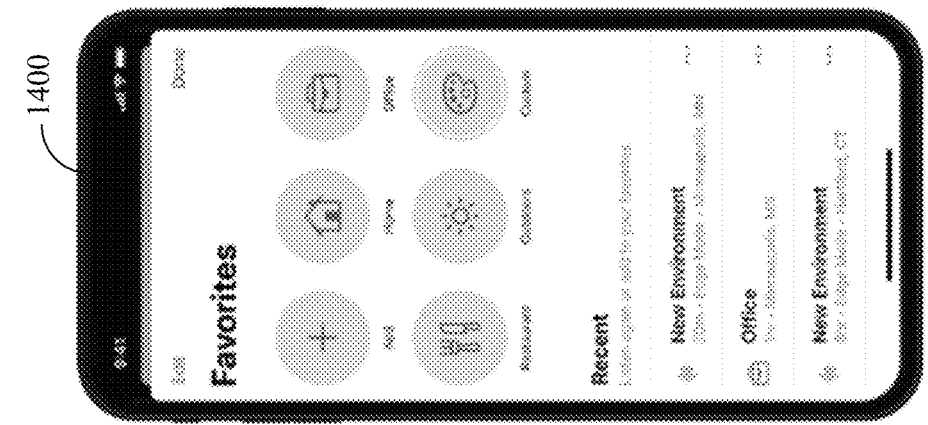
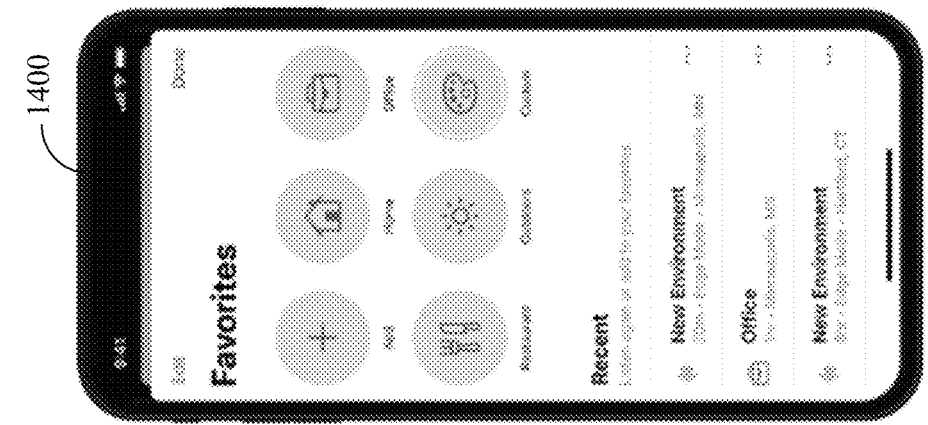
*Figure 14A*
*Figure 14B*
*Figure 14C*

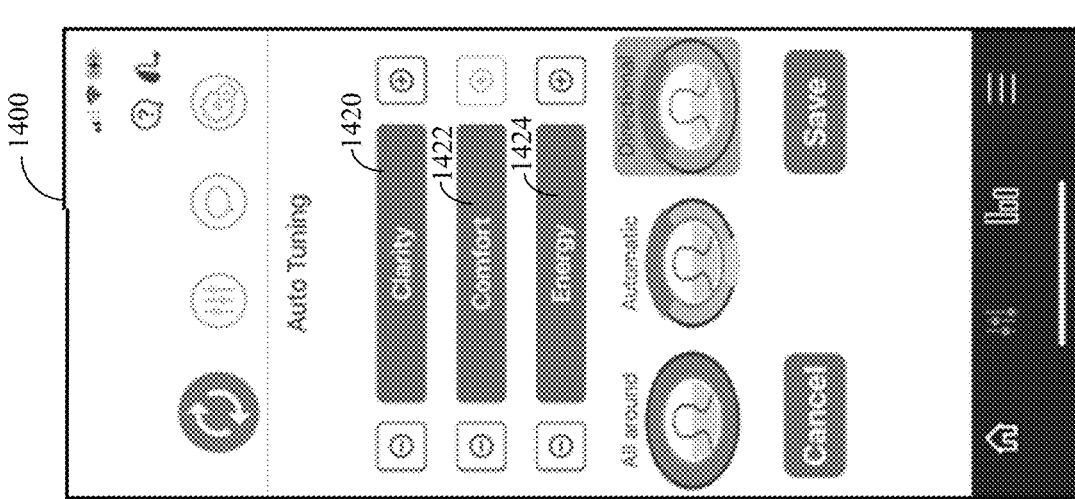
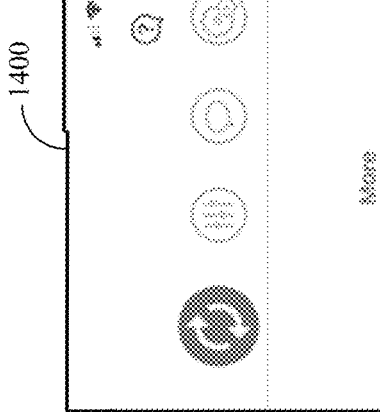
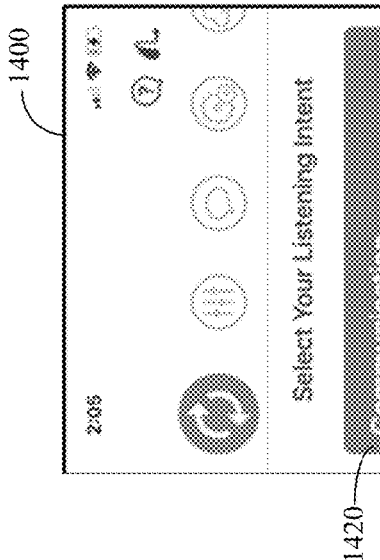

EAR-WORN ELECTRONIC DEVICE EMPLOYING USER-INITIATED ACOUSTIC ENVIRONMENT ADAPTATION

RELATED PATENT APPLICATIONS

This application is a divisional application of U.S. patent application Ser. No. 17/733,207, filed Apr. 29, 2022, which is a continuation-in-part of U.S. patent application Ser. No. 17/770,680 filed Apr. 21, 2022, which is a U.S. National Stage application under 35 U.S.C. 371 of PCT Application No. PCT/US2021/012016 filed Jan. 3, 2021, which claims priority to U.S. Provisional Application No. 62/956,824 filed Jan. 3, 2020 and U.S. Provisional Application No. 63/108,765, filed Nov. 2, 2020, the contents of which are hereby incorporated by reference in their entireties.

TECHNICAL FIELD

This application relates generally to ear-level electronic systems and devices, including hearing aids, personal amplification devices, and hearables.

BACKGROUND

Hearing devices provide sound for the user. Some examples of hearing devices are headsets, hearing aids, speakers, cochlear implants, bone conduction devices, and personal listening devices.

SUMMARY

Embodiments are directed to an ear-worn electronic device configured to be worn in, on or about an ear of a wearer. The device comprises at least one microphone configured to sense sound in an acoustic environment and a speaker or a receiver. A non-volatile memory is configured to store a plurality of parameter value sets, each of the parameter value sets associated with a different acoustic environment. The device comprises a user-actuatable control. A processor is operably coupled to the microphone, the speaker or the receiver, the non-volatile memory, and the user-actuatable control. The processor is configured to classify the acoustic environment using the sensed sound and, in response to actuation of the user-actuatable control by the wearer, apply one of the parameter value sets appropriate for the classification.

Embodiments are directed to an car-worn electronic device configured to be worn in, on or about an car of a wearer. The device comprises at least one microphone configured to sense sound in an acoustic environment, an acoustic transducer, and a non-volatile memory configured to store a plurality of parameter value sets, each of the parameter value sets associated with a different acoustic environment. A control input of the device is configured to receive a control input signal produced by at least one of a user-actuatable control of the car-worn electronic device and an external electronic device communicatively coupled to the car-worn electronic device in response to a user action. A processor is operably coupled to the microphone, the acoustic transducer, the non-volatile memory, and the control input. The processor is configured to classify the acoustic environment using the sensed sound and apply, in response to the control input signal, one of the parameter value sets appropriate for the classification. The processor can be configured to apply one of the parameter value sets that enhance intelligibility of speech in the acoustic environment.

Embodiments are directed to an ear-worn electronic device configured to be worn in, on or about an ear of a wearer. The device comprises at least one microphone configured to sense sound in an acoustic environment and a speaker or a receiver. A non-volatile memory is configured to store a plurality of parameter value sets, each of the parameter value sets associated with a different acoustic environment. The device comprises a user-actuatable control and at least one activity sensor. A processor is operably coupled to the microphone, the speaker or the receiver, the non-volatile memory, the activity sensor, and the user-actuatable control. The processor is configured to classify the acoustic environment using the sensed sound and determine an activity status of the wearer. The processor is further configured to apply one of the parameter value sets appropriate for the classification and the activity status in response to actuation of the user-actuatable control by the wearer.

Embodiments are directed to an car-worn electronic device configured to be worn in, on or about an ear of a wearer. The device comprises at least one microphone configured to sense sound in an acoustic environment and a speaker or a receiver. A non-volatile memory is configured to store a plurality of parameter value sets, each of the parameter value sets associated with a different acoustic environment. The device comprises a user-actuatable control and a sensor arrangement comprising one or more sensors configured to sense one or more of a physical state, a physiologic state, and an activity status of the wearer and to produce sensor signals. A processor is operably coupled to the microphone, the speaker or the receiver, the non-volatile memory, the sensor arrangement, and the user-actuatable control. The processor is configured to classify the acoustic environment using at least the sensed sound and apply one of the parameter value sets appropriate for the classification in response to actuation of the user-actuatable control by the wearer and the sensor signals.

Embodiments are directed to a method implemented by an ear-worn electronic device configured to be worn in, on or about an ear of a wearer. The method comprises storing a plurality of parameter value sets in non-volatile memory of the device, each of the parameter value sets associated with a different acoustic environment. The method comprises sensing sound in an acoustic environment, and classifying, by a processor of the device, the acoustic environment using the sensed sound. The method also comprises receiving, from the wearer, a user input via a user-actuatable control of the device. The method further comprises applying, by the processor, one of the parameter value sets appropriate for the classification in response to the user input.

Embodiments are directed to a method implemented by an ear-worn electronic device configured to be worn in, on or about an ear of a wearer. The method comprises storing a plurality of parameter value sets in non-volatile memory of the device, each of the parameter value sets associated with a different acoustic environment. The method comprises sensing sound in an acoustic environment, and classifying, by a processor of the device, the acoustic environment using the sensed sound. The method also comprises receiving, from the wearer, a user input via a user-actuatable control of the device. The method further comprises determining, by the processor, an activity status of the wearer via a sensor arrangement. The method also comprises applying, by the processor, one of the parameter value sets appropriate for the classification and the activity status in response to the user input.

Embodiments are directed to a method implemented by an ear-worn electronic device configured to be worn in, on or about an ear of a wearer. The method comprises storing a plurality of parameter value sets in non-volatile memory of the device, each of the parameter value sets associated with a different acoustic environment. The method comprises sensing sound in an acoustic environment, and classifying, by a processor of the device, the acoustic environment using the sensed sound. The method also comprises receiving, from the wearer, a user input via a user-actuatable control of the device. The method further comprises sensing, using a sensor arrangement, one or more of a physical state, a physiologic state, and an activity status of the wearer and producing sensor signals by the sensor arrangement. The method also comprises applying, by the processor, one of the parameter value sets appropriate for the classification in response to actuation of the user-actuatable control by the wearer and the sensor signals.

Embodiments are directed to a method implemented by an ear-worn electronic device configured to be worn in, on or about an ear of a wearer. The method comprises storing a plurality of parameter value sets in non-volatile memory of the device, each of the parameter value sets associated with a different acoustic environment, sensing sound in an acoustic environment, and classifying, by a processor of the device, the acoustic environment using the sensed sound. The method also comprises receiving, by the processor, a control input signal produced by at least one of a user-actuatable control of the device and an external electronic device communicatively coupled to the device in response to a user action. The method further comprises applying, by the processor in response to the control input signal, one of the parameter value sets appropriate for the classification. In some embodiments, the method also comprises sensing, using a sensor arrangement of the device, one or more of a physical state, a physiologic state, and an activity status of the wearer, and producing, by the sensor arrangement, sensor signals indicative of one or more of the physical state, the physiologic state, and the activity status of the wearer. The method further comprises applying, by the processor in response to the control input signal, one of the parameter value sets appropriate for the classification and one or more of the physical state, the physiologic state, and the activity status of the wearer.

Embodiments are directed to an ear-worn electronic device configured to be worn in, on or about an ear of a wearer. The device comprises at least one microphone configured to sense sound in an acoustic environment, an acoustic transducer, and a non-volatile memory configured to store a plurality of parameter value sets each associated with a different acoustic environment, wherein at least one or more of the parameter value sets are associated with an acoustic environment with muffled speech. The device also comprises a control input configured to receive a control input signal produced by at least one of a user-actuatable control of the ear-worn electronic device, a sensor of the ear-worn electronic device, and an external electronic device communicatively coupled to the ear-worn electronic device. The device further comprises a processor operably coupled to the microphone, the speaker or the receiver, the non-volatile memory, and the control input. The processor is configured to classify the acoustic environment as one with muffled speech using the sensed sound and, in response to a signal received from the control input, apply one or more of the parameter value sets appropriate for the classification to enhance intelligibility of muffled speech.

Embodiments are directed to an ear-worn electronic device configured to be worn in, on or about an ear of a wearer. The device comprises at least one microphone configured to sense sound in an acoustic environment, an acoustic transducer, and a non-volatile memory configured to store a plurality of parameter value sets each associated with a different acoustic environment, wherein at least one or more of the parameter value sets are associated with an acoustic environment with muffled speech. The device also comprises a control input configured to receive a control input signal produced by at least one of a user-actuatable control of the ear-worn electronic device, a sensor of the ear-worn electronic device, and an external electronic device communicatively coupled to the ear-worn electronic device. The device further comprises a processor operably coupled to the microphone, the acoustic transducer, the non-volatile memory, and the control input. The processor is configured to classify the acoustic environment as one with muffled speech using the sensed sound and, in response to a signal received from the control input, apply one or more of the parameter value sets appropriate for the classification to enhance intelligibility of muffled speech. In some embodiments, the processor is configured to classify the acoustic environment and detect a change in gain for frequencies within a specified frequency range relative to a baseline in response to receiving the control input signal, wherein the change in gain is indicative of the presence of muffled speech.

Embodiments are directed to a method implemented by an ear-worn electronic device configured to be worn in, on or about an ear of a wearer. The method comprises storing a plurality of parameter value sets in non-volatile memory of the device, each of the parameter value sets associated with a different acoustic environment, wherein at least one or more of the parameter value sets are associated with an acoustic environment with muffled speech delivered by one or more masked persons within the acoustic environment. The method also comprises sensing sound in an acoustic environment, and classifying, by a processor of the device using the sensed sound, the acoustic environment as one with muffled speech. The method further comprises receiving a signal from a control input of the device, and applying, by the processor in response to the control input signal, one or more of the parameter value sets appropriate for the classification to enhance intelligibility of muffled speech.

Embodiments are directed to a method implemented by an ear-worn electronic device configured to be worn in, on or about an ear of a wearer. The method comprises storing a plurality of parameter value sets in non-volatile memory of the device, each of the parameter value sets associated with a different acoustic environment, wherein at least one or more of the parameter value sets are associated with an acoustic environment with muffled speech. The method also comprise sensing sound in an acoustic environment, and classifying, by a processor of the device using the sensed sound, the acoustic environment as one with muffled speech. The method further comprises receiving a signal from a control input of the device, and applying, by the processor in response to the control input signal, one or more of the parameter value sets appropriate for the classification to enhance intelligibility of muffled speech.

Embodiments are directed to a method implemented by an ear-worn electronic device configured to be worn in, on or about an ear of a user. The method comprises storing a plurality of parameter value sets in the device, each of the parameter value sets associated with a different acoustic environment. The method also comprises classifying an acoustic environment of the user using sound sensed by the device, receiving an input signal in response to a user action, and determining a listening intent preference of the user. The method further comprises applying, in response to the input signal, one of the parameter value sets to a captured audio stream to deliver processed sound through the device, the processed sound being appropriate for the classification and consistent with the listening intent preference of the user.

Embodiments are directed to an ear-worn electronic device configured to be worn in, on or about an ear of a user. The device comprises at least one microphone configured to sense sound in an acoustic environment and an acoustic transducer. A memory is configured to store a plurality of parameter value sets, each of the parameter value sets associated with a different acoustic environment. A control input is configured to receive a control input signal produced by at least one of a user-actuatable control of the ear-worn electronic device and an external electronic device communicatively coupled to the ear-worn electronic device in response to a user action. A processor is operably coupled to the microphone, the acoustic transducer, the memory, and the control input. The processor is configured to classify the acoustic environment using the sensed sound and determine a listening intent preference of the user. The processor is configured to apply, in response to the control input signal, one of the parameter value sets appropriate for the classification and the listening intent preference of the user.

Embodiments are directed to a method implemented by an ear-worn electronic device configured to be worn in, on or about an ear of a user. The method comprises receiving an adaptation request in response to a user action, capturing a sample of ambient sound in response to the adaptation request, and receiving a listening intent preference of the user. The method also comprises determining a set of audio processing parameters based on the ambient sound and the listening intent preference. The method further comprises applying the set of audio processing parameters to a captured audio stream to deliver processed sound through the device, the processed sound being consistent with the listening intent preference of the user.

Embodiments are directed to an ear-worn electronic device configured to be worn in, on or about an ear of a user. The device comprises a control input configured to receive an adaptation request in response to a user action, at least one microphone configured to capture a sample of ambient sound in response to the adaptation request, and an acoustic transducer. A memory is configured to store audio processing parameters. A processor is operably coupled to the microphone, the acoustic transducer, the memory, and the control input. The processor is configured to determine a listening intent preference of the user and a set of audio processing parameters based on the ambient sound and the listening intent preference. The processor is configured to apply the set of audio processing parameters to a captured audio stream to deliver processed sound through the device, the processed sound being consistent with the listening intent preference of the user.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein:

FIGS. 14A-14C illustrate different displays of a smartphone configured to facilitate connectivity and interaction with an ear-worn electronic device for implementing features of an Edge Mode, a Mask Mode or other mode of the ear-worn electronic device in accordance with any of the embodiments disclosed herein;

FIGS. 14G-14I illustrate different displays of a smartphone configured to facilitate connectivity and interaction with an ear-worn electronic device for implementing features of an Edge Mode of the ear-worn electronic device in accordance with any of the embodiments disclosed herein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
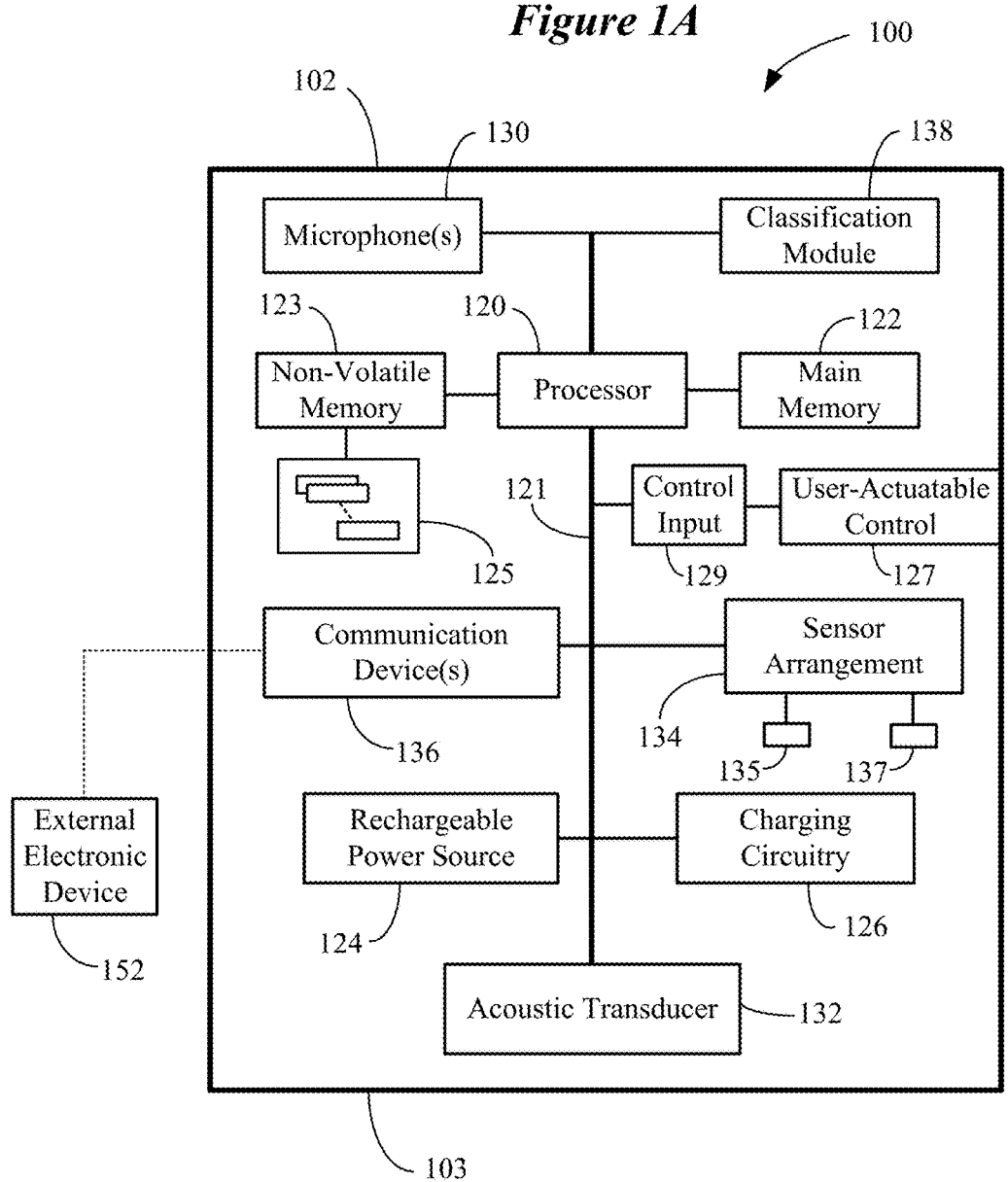
FIG. 1A illustrates an ear-worn electronic device in accordance with any of the embodiments disclosed herein.

Embodiments disclosed herein are directed to any ear-worn or ear-level electronic device, including cochlear implants and bone conduction devices, without departing from the scope of this disclosure. The devices depicted in the figures are intended to demonstrate the subject matter, but not in a limited, exhaustive, or exclusive sense. Ear-worn electronic devices (also referred to herein as "hearing devices"), such as hearables (e.g., wearable earphones, ear monitors, earbuds, electronic earplugs), hearing aids, hearing instruments, and hearing assistance devices, typically include an enclosure, such as a housing or shell, within which internal components are disposed. Typical components of a hearing device can include a processor (e.g., a digital signal processor or DSP), memory circuitry, power management and charging circuitry, one or more communication devices (e.g., one or more radios, a near-field magnetic induction (NFMI) device), one or more antennas, one or more microphones, buttons and/or switches, and a receiver/speaker, for example. Hearing devices can incorporate a long-range communication device, such as a Bluetooth® transceiver or other type of radio frequency (RF) transceiver. A communication facility (e.g., a radio or NFMI device) of a hearing device system can be configured to facilitate communication between a left hearing device and a right hearing device of the hearing device system.

The term hearing device of the present disclosure refers to a wide variety of car-level electronic devices that can aid a person with impaired hearing. The term hearing device also refers to a wide variety of devices that can produce processed sound for persons with normal hearing. Hearing devices include, but are not limited to, behind-the-car (BTE), in-the-car (ITE), in-the-canal (ITC), invisible-in-canal (IIC), receiver-in-canal (RIC), receiver-in-the-car (RITE) or completely-in-the-canal (CIC) type hearing devices or some combination of the above. Throughout this disclosure, reference is made to a "hearing device," which is understood to refer to a system comprising a single left ear device, a single right ear device, or a combination of a left ear device and a right car device.

Users of hearing devices (e.g., hearing aid users) are typically exposed to a variety of listening situations, such as speech, speech with noise, speech with music, speech muffled by protective masks (e.g., for virus protection), music and/or noisy environments. To yield an enhanced listening experience for hearing device users, the behavior of the device, for example the activation of a directional microphone or the compression/expansion parameters, should adapt to the user's current acoustic environment. This indicates the need for sound classification algorithms functioning as a front end to the rest of the signal processing scheme housed in the hearing device.

It has been found that a single set of hearing device parameters is not sufficient to optimally configure a hearing device for all acoustic environments and listening intents. To address this deficiency, some hearing devices utilize multiple parameter memories, each designed for a specific acoustic environment. The memory parameters are typically set up during the hearing-aid fitting and are designed for common problematic listening situations. During operation, hearing device wearers typically use a push button to cycle through the memories to access the appropriate settings for a given situation. A disadvantage of this approach is that wearers have to cycle through their memories, and they have to remember which memories are best for specific conditions. From a usability perspective, this limits the number of memories and situations a typical hearing device wearer can effectively employ.

Acoustic environment adaptation has been developed, wherein a mechanism to automatically classify the current acoustic environment drives automatic parameter changes to improve operation for that specific environment. A disadvantage to this approach is that the automatic changes are not always desired and can be distracting when the hearing device wearer is in a dynamic acoustic environment and the adaptations occur frequently. Extended customization via a connected mobile device has also been developed, which can be utilized by hearing device wearers to modify and store configurations for future use. Technically, this approach has the most flexibility for configuring and optimizing hearing device parameters for specific listening situations. However, this method depends on the connection to a mobile device and sometimes this connection is not available, e.g., if the mobile device is not nearby. This approach can also be unduly challenging to less sophisticated hearing device wearers.

According to any of the embodiments disclosed herein, a hearing device is configured with a mechanism which allows a hearing device wearer to optimally and automatically set hearing device parameters for their current acoustic environment and listening intent through a simple, single interaction with the hearing device, such as by simply pressing a button or activating a control on the hearing device and/or automatically or semi-automatically by the hearing device in response to one or more control input signals generated by one or more sensors of the hearing device and/or a communication device communicatively coupled to the hearing device. In some configurations, the hearing device can be configured with a mechanism which allows a hearing device wearer to optimally and automatically set hearing device parameters for their current acoustic environment and listening intent in response to a control input signal generated by an external electronic device (e.g., a smartphone or a smart watch) via a user action and received by a communication device of the hearing device. In accordance with some mechanisms, the wearer of the hearing device volitionally (e.g., physically) activates a mechanism which allows the wearer to optimally and automatically set hearing device parameters for their current acoustic environment and listening intent. In accordance with other mechanisms, the wearer of the hearing device volitionally (e.g., physically) activates a mechanism feature which, subsequent to user actuation, facilitates optimal and automatic setting of hearing device parameters for the wearer's current acoustic environment and listening intent.

Some of the disclosed mechanisms to assess the acoustic environment and user activity are contained completely on the hearing device, without the need for connection/communication with a mobile device or internet. Hearing device wearers do not have to remember which program memory is used for which acoustic situation-instead, they simply get the best settings for their current situation through the simple press of a button or control on the hearing device or via a control input signal generated by a sensor of the hearing device or received from an external electronic device (e.g., a smartphone or a smart watch). Hearing device wearers are not subject to parameter changes when they don't want them (e.g., there can be no automatic adaptation involved in some modes). All parameter changes can be user-driven and are optimal for the wearer's current listening situation.

A hearing device according to various embodiments is configured to detect a discrete set of listening situations, through monitoring acoustic characterization variables in the hearing device aid as well as (optionally) activity monitoring data. For these discrete set of situations, parameters (e.g., parameter offsets) are created during the fitting process and stored on the hearing device. When the hearing device wearer pushes the memory button, the current situation is assessed, interpreted, and used to lookup the appropriate parameter set in the stored configurations. The relevant parameters are loaded and made available in the current active memory for the user to experience.

Any of the embodiments disclosed herein can incorporate a mechanism for a hearing device wearer to optimally and automatically set hearing device parameters for their current acoustic environment and in the presence of persons (e.g., the wearer of the hearing device, other persons in proximity to the wearer). This mechanism of the hearing device, which is referred to herein as "Edge Mode" for convenience and not of limitation, can be activated manually by the hearing device wearer (e.g., via a user-interface input or a smart device input), semi-automatically (e.g., automatically initiated but activated only after a wearer confirmation input) or automatically (e.g., via a sensor input).

Any of the embodiments disclosed herein can incorporate a mechanism for a hearing device wearer to optimally and automatically set hearing device parameters for their current acoustic environment and in the presence of persons (e.g., the wearer of the hearing device, other persons in proximity to the wearer) speaking through a protective mask worn about the face including the mouth. This mechanism of the hearing device, which is referred to herein as "Mask Mode" for convenience and not of limitation, can be activated manually by the hearing device wearer (e.g., via a user-interface input or a smart device input), semi-automatically (e.g., automatically initiated but activated only after a wearer confirmation input) or automatically (e.g., via a sensor input).

In general, any of the device, system, and method embodiments disclosed herein can be configured to implement Edge Mode features, Mask Mode features, or both Edge Mode and Mask Mode features. Several of the device, system, and method embodiments disclosed herein are described as being specifically configured to implement Mask Mode features. In such embodiments, it is understood that such device, system, and method embodiments can also be configured to implement Edge Mode features in addition to Mask Mode features. In various embodiments, the Mask Mode and Edge Mode features are implemented using the same or similar processes and hardware, but Mask Mode features are more particularly directed to enhance intelligibility of muffled speech (e.g., speech uttered by persons wearing a protective mask). Edge Mode and/or Mask Mode features of the hearing devices, systems, and methods of the present disclosure can be implemented using any of the processes and/or hardware disclosed in commonly-owned U.S. patent application Ser. No. 62/956,824 filed on Jan. 3, 2020, and U.S. patent application Ser. No. 63/108,765 filed on Nov. 2, 2020, which are incorporated herein by reference in their entireties.

Embodiments of the disclosure are defined in the claims. However, below there is provided a non-exhaustive listing of non-limiting Edge Mode examples. Any one or more of the features of these Edge Mode examples may be combined with any one or more features of another example, embodiment, or aspect described herein.

Example Ex1. An ear-worn electronic device configured to be worn in, on or about an ear of a wearer, and comprising at least one microphone configured to sense sound in an acoustic environment, a speaker or a receiver, a non-volatile memory configured to store a plurality of parameter value sets, each of the parameter value sets associated with a different acoustic environment, a user-actuatable control, and a processor operably coupled to the microphone, the speaker or the receiver, the non-volatile memory, and the user-actuatable control, the processor configured to classify the acoustic environment using the sensed sound and, in response to actuation of the user-actuatable control by the wearer, apply one of the parameter value sets appropriate for the classification.

Example Ex2. The device according to Ex1, wherein the processor is configured to continuously or repetitively classify the acoustic environment prior to actuation of the user-actuatable control by the wearer.

Example Ex3. The device according to Ex1 or Ex2, wherein the processor is configured to classify the acoustic environment in response to actuation of the user-actuatable control by the wearer.

Example Ex4. The device according to one or more of Ex1 to Ex3, wherein the user-actuatable control comprises a button disposed on device.

Example Ex5. The device according to one or more of Ex1 to Ex4, wherein the user-actuatable control comprises a sensor responsive to a touch or a tap by the wearer.

Example Ex6. The device according to one or more of Ex1 to Ex5, wherein the user-actuatable control comprises a voice recognition control implemented by the processor.

Example Ex7. The device according to one or more of Ex1 to Ex6, wherein the user-actuatable control comprises gesture detection circuitry responsive to a wearer gesture made in proximity to the device.

Example Ex8. The device according to one or more of Ex1 to Ex7, wherein each of the parameter value sets comprises a set of gain values or gain offsets associated with a different acoustic environment.

Example Ex9. The device according to one or more of Ex1 to Ex7, wherein each of the parameter value sets comprises a set of gain values or gain offsets associated with a different acoustic environment, and a set of noise-reduction parameters associated with the different acoustic environments.

Example Ex 10. The device according to one or more of Ex1 to Ex7, wherein each of the parameter value sets comprises a set of gain values or gain offsets associated with a different acoustic environment, a set of noise-reduction parameters associated with the different acoustic environments, and a set of microphone mode parameters associated with the different acoustic environments.

Example Ex11. The device according to one or more of Ex1 to Ex7, wherein the parameter value sets comprises a normal parameter value set associated with a normal or default acoustic environment, and a plurality of other parameter value sets each associated with a different acoustic environment.

Example Ex 12. The device according to one or more of Ex1 to Ex7, wherein the parameter value sets comprise a normal parameter value set, and each of the other parameter value sets define offsets to parameters of the normal parameter value set.

Example Ex13. The device according to Ex12, wherein the processor is coupled to a main memory and the normal parameter value set resides in the main memory, and the processor is configured to select a parameter value set appropriate for the classification and, in response to actuation of the user-actuatable control by the wearer, apply offsets of the selected parameter value set to parameters of the normal parameter value set residing in the main memory.

Example Ex14. An ear-worn electronic device configured to be worn in, on or about an ear of a wearer, and comprising at least one microphone configured to sense sound in an acoustic environment, a speaker or a receiver, a non-volatile memory configured to store a plurality of parameter value sets, each of the parameter value sets associated with a different acoustic environment, a user-actuatable control, at least one activity sensor, and a processor operably coupled to the microphone, the speaker or the receiver, the non-volatile memory, the activity sensor, and the user-actuatable control, the processor configured to classify the acoustic environment using the sensed sound and determine an activity status of the wearer, the processor further configured to apply one of the parameter value sets appropriate for the classification and the activity status in response to actuation of the user-actuatable control by the wearer.

Example Ex15. The device according to Ex14, wherein the activity sensor comprises a motion sensor.

Example Ex16. The device according to Ex14 or Ex15, wherein the activity sensor comprises a physiologic sensor.

Example Ex17. The device according to one or more of Ex14 to Ex16, comprising any one or any combination of the components and/or the functions of one or more of Ex2 to Ex13.

Example Ex18. An ear-worn electronic device configured to be worn in, on or about an ear of a wearer, and comprising at least one microphone configured to sense sound in an acoustic environment, a speaker or a receiver, a non-volatile memory configured to store a plurality of parameter value sets, each of the parameter value sets associated with a different acoustic environment; a user-actuatable control, a sensor arrangement comprising one or more sensors configured to sense one or more of a physical state, a physiologic state, and an activity status of the wearer and to produce sensor signals, and a processor operably coupled to the microphone, the speaker or the receiver, the non-volatile memory, the sensor arrangement, and the user-actuatable control, the processor configured to classify the acoustic environment using at least the sensed sound and apply one of the parameter value sets appropriate for the classification in response to actuation of the user-actuatable control by the wearer and the sensor signals.

Example Ex19. The device according to Ex18, wherein the processor is configured to classify the acoustic environment using the sensed sound and the sensor signals.

Example Ex20. The device according to Ex18 or Ex19, wherein the processor is configured to classify the acoustic environment using the sensed sound, and select one of the parameter value sets appropriate for the classification using the sensor signals.

Example Ex21. The device according to Ex18 or Ex20, wherein the processor is configured to classify a sensor output state of one or more of the sensors using the sensor signals, and apply one of a plurality of device settings stored in the non-volatile memory in response to the sensor output state classification.

Example Ex22. The device according to Ex18 or Ex20, comprising any one or any combination of the components and/or the functions of one or more of Ex2 to Ex13.

Example Ex23. A method implemented by an ear-worn electronic device configured to be worn in, on or about an ear of a wearer, comprising storing a plurality of parameter value sets in non-volatile memory of the device, each of the parameter value sets associated with a different acoustic environment, sensing sound in an acoustic environment, classifying, by a processor of the device, the acoustic environment using the sensed sound, receiving, from the wearer, a user input via a user-actuatable control of the device, and applying, by the processor, one of the parameter value sets appropriate for the classification in response to the user input.

Example Ex24. A method implemented by an ear-worn electronic device configured to be worn in, on or about an ear of a wearer, comprising storing a plurality of parameter value sets in non-volatile memory of the device, each of the parameter value sets associated with a different acoustic environment, sensing sound in an acoustic environment, classifying, by a processor of the device, the acoustic environment using the sensed sound, receiving, from the wearer, a user input via a user-actuatable control of the device, determining, by the processor, an activity status of the wearer via a sensor arrangement, and applying, by the processor, one of the parameter value sets appropriate for the classification and the activity status in response to the user input.

Example Ex25. A method implemented by an ear-worn electronic device configured to be worn in, on or about an ear of a wearer, comprising storing a plurality of parameter value sets in non-volatile memory of the device, each of the parameter value sets associated with a different acoustic environment, sensing sound in an acoustic environment, classifying, by a processor of the device, the acoustic environment using the sensed sound, receiving, from the wearer, a user input via a user-actuatable control of the device, sensing, using a sensor arrangement, one or more of a physical state, a physiologic state, and an activity status of the wearer and producing sensor signals by the sensor arrangement, and applying, by the processor, one of the parameter value sets appropriate for the classification in response to actuation of the user-actuatable control by the wearer and the sensor signals.

Example Ex26. The method according to one or more of Ex23 to Ex25, comprising classifying, by the processor, the acoustic environment using the sensed sound and the sensor signals.

Example Ex27. The method according to one or more of Ex23 to Ex26, comprising classifying, by the processor, the acoustic environment using the sensed sound, and selecting, by the processor, one of the parameter value sets appropriate for the classification using the sensor signals.

Example Ex28. The method according to one or more of Ex23 to Ex27, comprising classifying, by the processor, a sensor output state of one or more of the sensors using the sensor signals, and applying, by the processor, one of a plurality of device settings stored in the non-volatile memory in response to the sensor output state classification.

Example Ex29. An ear-worn electronic device configured to be worn in, on or about an ear of a wearer, comprising at least one microphone configured to sense sound in an acoustic environment, an acoustic transducer, a non-volatile memory configured to store a plurality of parameter value sets, each of the parameter value sets associated with a different acoustic environment, a control input configured to receive a control input signal produced by at least one of a user-actuatable control of the ear-worn electronic device and an external electronic device communicatively coupled to the ear-worn electronic device in response to a user action, and a processor operably coupled to the microphone, the acoustic transducer, the non-volatile memory, and the control input, the processor configured to classify the acoustic environment using the sensed sound and apply, in response to the control input signal, one of the parameter value sets appropriate for the classification.

Example Ex30. The device according to Ex29, wherein the user-actuatable control comprises one or more of a button disposed on the device, a sensor responsive to a touch or a tap by the wearer, a voice recognition control implemented by the processor, and gesture detection circuitry responsive to a wearer gesture made in proximity to the device, and the external electronic device communicatively coupled to the ear-worn electronic device comprises one or more of a personal digital assistant, a smartphone, a smart watch, a tablet, and a laptop.

Example Ex31. The device according to Ex29 or Ex30, wherein each of the parameter value sets comprises a set of gain values or gain offsets associated with a different acoustic environment, and one or both of a set of noise-reduction parameters associated with the different acoustic environments, and a set of microphone mode parameters associated with the different acoustic environments.

Example Ex32. The device according to one or more of Ex29 to Ex31, wherein the parameter value sets comprise a normal parameter value set associated with a normal or default acoustic environment, a plurality of other parameter value sets each associated with a different acoustic environment, and each of the other parameter value sets defines offsets to parameters of the normal parameter value set.

Example Ex33. The device according to one or more of Ex29 to Ex32, comprising a sensor arrangement comprising one or more sensors configured to sense, and produce sensor signals indicative of, one or more of a physical state, a physiologic state, and an activity status of the wearer, and the processor is configured to receive the sensor signals, classify the acoustic environment using the sensed sound, and apply, in response to the control input, one of the parameter value sets appropriate for the classification and one or more of the physical state, the physiologic state, and the activity status of the wearer.

Example Ex34. The device according to Ex33, wherein the one or more sensors comprise one or both of a motion sensor and a physiologic sensor.

Example Ex35. The device according to one or more of Ex29 to Ex34, wherein the processor is configured to apply one of the parameter value sets that enhance intelligibility of speech in the acoustic environment.

Example Ex36. The device according to one or more of Ex29 to Ex35, wherein the acoustic environment includes muffled speech, and the processor is configured to classify the acoustic environment as an acoustic environment including muffled speech using the sensed sound, and apply a parameter value set that enhances intelligibility of muffled speech.

Example Ex37. The device according to one or more of Ex29 to Ex36, wherein, subsequent to applying an initial parameter value set appropriate for an initial classification of the acoustic environment in response to receiving an initial control input signal, the processor is configured to automatically apply an adapted parameter value set appropriate for the initial or a subsequent classification of the current acoustic environment in the absence of receiving a subsequent control input signal by the processor.

Example Ex38. The device according to one or more of Ex29 to Ex37, wherein the processor is configured to apply one or more different parameter value sets appropriate for the classification of the current acoustic environment in response to one or more subsequently received control input signals, learn wearer preferences using utilization data acquired during application of the different parameter value sets by the processor, and adapt selection of subsequent parameter value sets by the processor for subsequent use in the current acoustic environment using the learned wearer preferences.

Example Ex39. The device according to one or more of Ex29 to Ex38, wherein the processor is configured to apply one or more different parameter value sets appropriate for the classification of the current acoustic environment in response to one or more subsequently received control input signals, store, in the memory, one or both of utilization data and contextual data acquired by the processor during application of the different parameter value sets associated with the current acoustic environment, and adapt selection of subsequent parameter value sets by the processor for subsequent use in the current acoustic environment using one or both of the utilization data and the contextual data.

Example Ex40. The device according to one or more of E37 to Ex39, wherein the processor is configured with instructions to implement a machine learning algorithm to one or more of automatically apply an adapted parameter value set appropriate for the initial or a subsequent classification of the current acoustic environment, learn wearer preferences using utilization data acquired during application of the different parameter value sets applied by the processor, adapt selection of subsequent parameter value sets by the processor for subsequent use in the current acoustic environment using learned wearer preferences, and adapt selection of subsequent parameter value sets for subsequent use in the current acoustic environment using one or both of utilization data and contextual data.

Example Ex41. A method implemented by an ear-worn electronic device configured to be worn in, on or about an car of a wearer, comprising storing a plurality of parameter value sets in non-volatile memory of the device, each of the parameter value sets associated with a different acoustic environment, sensing sound in an acoustic environment, classifying, by a processor of the device, the acoustic environment using the sensed sound, receiving, by the processor, a control input signal produced by at least one of a user-actuatable control of the device and an external electronic device communicatively coupled to the device in response to a user action, and applying, by the processor in response to the control input signal, one of the parameter value sets appropriate for the classification.

Example Ex42. The method according to Ex41, comprising sensing, using a sensor arrangement of the device, one or more of a physical state, a physiologic state, and an activity status of the wearer, producing, by the sensor arrangement, sensor signals indicative of one or more of the physical state, the physiologic state, and the activity status of the wearer, and applying, by the processor in response to the control input signal, one of the parameter value sets appropriate for the classification and one or more of the physical state, the physiologic state, and the activity status of the wearer.

Example Ex43. The method according to Ex41 or Ex42, wherein the processor is configured with instructions to execute a machine learning algorithm to implement one or more method steps of one or both of Ex41 and Ex42.

Example Ex44. A method implemented by an ear-worn electronic device configured to be worn in, on or about an ear of a user comprises storing a plurality of parameter value sets in the device, each of the parameter value sets associated with a different acoustic environment. The method also comprises classifying an acoustic environment of the user using sound sensed by the device, receiving an input signal in response to a user action, and determining a listening intent preference of the user. The method further comprises applying, in response to the input signal, one of the parameter value sets to a captured audio stream to deliver processed sound through the device, the processed sound being appropriate for the classification and consistent with the listening intent preference of the user.

Example Ex45. The method according to Ex44, wherein the listening intent preference of the user is a preference to enhance speech intelligibility.

Example Ex46. The method according to Ex44, wherein the listening intent preference of the user is a preference to reduce noise.

Example Ex47. The method according to one or more of Ex44 to Ex46, wherein determining the listening intent preference comprises receiving a sensor signal from which the listening intent preference is determined.

Example Ex48. The method according to Ex47, wherein the sensor signal is generated by an accelerometer or an inertial measurement unit of the device.

Example Ex49. The method according to Ex47, wherein the sensor signal is generated by a microphone of the device.

Example Ex50. The method according to Ex47, wherein the sensor signal is generated by a physiologic sensor of the device.

Example Ex51. The method according to one or more of Ex44 to Ex50, wherein determining the listening intent preference comprises receiving a preference signal from an external electronic device.

Example Ex52. An ear-worn electronic device configured to be worn in, on or about an ear of a user comprises at least one microphone configured to sense sound in an acoustic environment, an acoustic transducer, and a memory configured to store a plurality of parameter value sets, each of the parameter value sets associated with a different acoustic environment. A control input is configured to receive a control input signal produced by at least one of a user-actuatable control of the ear-worn electronic device and an external electronic device communicatively coupled to the ear-worn electronic device in response to a user action. A processor is operably coupled to the microphone, the acoustic transducer, the memory, and the control input. The processor is configured to classify the acoustic environment using the sensed sound and determine a listening intent preference of the user. The processor is configured to apply, in response to the control input signal, one of the parameter value sets appropriate for the classification and the listening intent preference of the user.

Example Ex53. The device according to Ex52, wherein the processor is configured to determine the listening intent preference of the user in response to one or both of a user input and a sensor signal.

Example Ex54. The device according to Ex52, wherein the processor is configured to determine the listening intent preference of the user in response to a sensor signal, the sensor signal generated by the microphone, an accelerometer of the device, an inertial measurement unit of the device, or a physiologic sensor of the device.

Example Ex55. The device according to one or more of Ex52 to Ex54, wherein the processor is configured to determine the listening intent preference of the user in response to a user input received from an external electronic device.

Example Ex56. The device according to one or more of Ex52 to Ex55, wherein the listening intent preference of the user is a preference to enhance speech intelligibility.

Example Ex57. The device according to one or more of Ex52 to Ex56, wherein the listening intent preference of the user is a preference to reduce noise.

Example Ex58. A method implemented by an ear-worn electronic device configured to be worn in, on or about an ear of a user comprises receiving an adaptation request in response to a user action, capturing a sample of ambient sound in response to the adaptation request, receiving a listening intent preference of the user, and determining a set of audio processing parameters based on the ambient sound and the listening intent preference. The method comprises applying the set of audio processing parameters to a captured audio stream to deliver processed sound through the device, the processed sound being consistent with the listening intent preference of the user.

Example Ex59. The method according to Ex58, wherein receiving the listening intent preference comprises receiving a preference between two or more listening intent preferences.

Example Ex60. The method according to Ex58 or Ex59, wherein receiving the listening intent preference comprises receiving a preference to enhance speech.

Example Ex61. The method according to Ex58 or Ex60, wherein receiving the listening intent preference comprises receiving a preference to reduce noise.

Example Ex62. The method according to one or more of Ex58 to Ex61, wherein receiving the listening intent preference comprises receiving a preference to optimize sound for the user's acoustic environment.

Example Ex63. The method according to one or more of Ex58 to Ex62, comprising receiving the listening intent preference via a control input of the device.

Example Ex64. The method according to one or more of Ex58 to Ex62, comprising receiving the listening intent preference via an external electronic device.

Example Ex65. The method according to one or more of Ex58 to Ex64, wherein the adaptation request is generated by an accelerometer or an inertial measurement unit of the device.

Example Ex66. The method according to one or more of Ex58 to Ex65, wherein the adaptation request is generated by an external electronic device.

Example Ex67. An ear-worn electronic device configured to be worn in, on or about an ear of a user comprises a control input configured to receive an adaptation request in response to a user action, at least one microphone configured to capture a sample of ambient sound in response to the adaptation request, and an acoustic transducer. A memory is configured to store audio processing parameters. A processor is operably coupled to the microphone, the acoustic transducer, the memory, and the control input. The processor is configured to determine a listening intent preference of the user and a set of audio processing parameters based on the ambient sound and the listening intent preference. The processor is configured to apply the set of audio processing parameters to a captured audio stream to deliver processed sound through the device, the processed sound being consistent with the listening intent preference of the user.

Example Ex68. The device according to Ex67, wherein the processor is configured to determine the listening intent preference of the user in response to one or both of a user input and a sensor signal.

Example Ex69. The device according to Ex67 or Ex68, wherein the processor is configured to determine the listening intent preference of the user in response to a sensor signal, the sensor signal generated by the microphone, an accelerometer of the device, an inertial measurement unit of the device, or a physiologic sensor of the device.

Example Ex70. The device according to one or more of Ex67 to Ex69, wherein the processor is configured to determine the listening intent preference of the user in response to a user input received from an external electronic device.

Example Ex71. The device according to one or more of Ex67 to Ex70, wherein the listening intent preference of the user is a preference to enhance speech intelligibility.

Example Ex72. The device according to one or more of Ex67 to Ex71, wherein the listening intent preference of the user is a preference to reduce noise.

FIG. 1A illustrates an ear-worn electronic device 100 in accordance with any of the embodiments disclosed herein. The hearing device 100 includes a housing 102 configured to be worn in, on, or about an ear of a wearer. The hearing device 100 shown in FIG. 1A can represent a single hearing device configured for monaural or single-ear operation or one of a pair of hearing devices configured for binaural or dual-ear operation (see e.g., FIG. 1B). The hearing device 100 shown in FIG. 1A includes a housing 102 within or on which various components are situated or supported. The housing 102 can be configured for deployment on a wearer's ear (e.g., a BTE device housing), within an ear canal of the wearer's ear (e.g., an ITE, ITC, IIC or CIC device housing) or both on and in a wearer's ear (e.g., a RIC or RITE device housing).

The hearing device 100 includes a processor 120 operatively coupled to a main memory 122 and a non-volatile memory 123. The processor 120 is operatively coupled to components of the hearing device 100 via a communication bus 121 (e.g., a rigid or flexible PCB). The processor 120 can be implemented as one or more of a multi-core processor, a digital signal processor (DSP), a microprocessor, a programmable controller, a general-purpose computer, a special-purpose computer, a hardware controller, a software controller, a combined hardware and software device, such as a programmable logic controller, and a programmable logic device (e.g., FPGA, ASIC). The processor 120 can include or be operatively coupled to main memory 122, such as RAM (e.g., DRAM, SRAM). The processor 120 can include or be operatively coupled to non-volatile memory 123, such as ROM, EPROM, EEPROM or flash memory. As will be described in detail hereinbelow, the non-volatile memory 123 is configured to store a multiplicity of parameter value sets 125, each of the parameter value sets associated with a different acoustic environment.

The hearing device 100 includes an audio processing facility operably coupled to, or incorporating, the processor 120. The audio processing facility includes audio signal processing circuitry (e.g., analog front-end, DSP, and various analog and digital filters), a microphone arrangement 130, and an acoustic transducer 132, such as a speaker or a receiver. The microphone arrangement 130 can include one or more discrete microphones or a microphone array(s) (e.g., configured for microphone array beamforming). Each of the microphones of the microphone arrangement 130 can be situated at different locations of the housing 102. It is understood that the term microphone used herein can refer to a single microphone or multiple microphones unless specified otherwise. The microphones of the microphone arrangement 130 can be any microphone type. In some embodiments, the microphones are omnidirectional microphones. In other embodiments, the microphones are directional microphones. In further embodiments, the microphones are a combination of one or more omnidirectional microphones and one or more directional microphones. One, some, or all of the microphones can be microphones having a cardioid, hypercardioid, supercardioid or lobar pattern, for example. One, some, or all of the microphones can be multi-directional microphones, such as bidirectional microphones. One, some, or all of the microphones can have variable directionality, allowing for real-time selection between omnidirectional and directional patterns (e.g., selecting between omni, cardioid, and shotgun patterns). In some embodiments, the polar pattern(s) of one or more microphones of the microphone arrangement 130 can vary depending on the frequency range (e.g., low frequencies remain in an omnidirectional pattern while high frequencies are in a directional pattern).

Depending on the hearing device implementation, different microphone technologies can be used. For example, the hearing device 100 can incorporate any of the following microphone technology types (or combination of types): MEMS (micro-electromechanical system) microphones (e.g., capacitive, piezoelectric MEMS microphones), moving coil/dynamic microphones, condenser microphones, electret microphones, ribbon microphones, crystal/ceramic microphones (e.g., piezoelectric microphones), boundary microphones, PZM (pressure zone microphone) microphones, and carbon microphones.

The hearing device 100 also includes a user interface comprising a user-actuatable control 127 operatively coupled to the processor 120 via a control input 129 of the hearing device 100 or the processor 120. The user-actuatable control 127 is configured to receive an input from the wearer of the hearing device 100 and, in response, generate a control input signal which is communicated to the control input 129. The input from the wearer can be any type of user input, such as a touch input, a gesture input, a voice input or a sensor input. The input from the wearer can be a wearer input to an external electronic device 152 (e.g., a smartphone or a smart watch) communicatively coupled to the hearing device 100.

The user-actuatable control 127 can include one or more of a tactile interface, a gesture interface, and a voice command interface. The tactile interface can include one or more manually actuatable switches (e.g., a push button, a toggle switch, a capacitive switch). For example, the user-actuatable control 127 can include a number of manually actuatable buttons or switches disposed on the hearing device housing 102. The user-actuatable control 127 can comprises a sensor responsive to a touch or a tap by the wearer. The user-actuatable control 127 can comprise a voice recognition control implemented by the processor 120.

The user-actuatable control 127 can comprise gesture detection circuitry responsive to a wearer gesture made in proximity to the hearing device 100 (e.g., a non-contacting gesture made spaced apart from the device). A single antenna and gesture detection circuitry of the hearing device 100 can be used to classify wearer gestures, such as hand or finger motions made in proximity to the hearing device. As the wearer's hand or finger moves, the electrical field or magnetic field of the antenna is perturbed. As a result, the antenna input impedance is changed. When a wearer performs hand or finger motions (e.g. waving, swipe, tap, holds, zoom, circular movements, etc.), an antenna impedance monitor records the reflection coefficients of the signals or impedance. As the wearer's hand or finger moves, the changes in antenna impedance show unique patterns due to the perturbation of the antenna's electrical field or magnetic field. These unique patterns can correspond to predetermined user inputs, such as an input to implement an acoustic environment adaptation feature of the hearing device 100. As will be discussed in detail hereinbelow, the user-actuatable control 127 is configured to receive an input from the wearer of the hearing device 100 to initiate an acoustic environment adaptation feature of the hearing device 100.

In any of the embodiments disclosed herein, the hearing device 100 includes a sensor arrangement 134. The sensor arrangement 134 can include one or more sensors configured to sense one or more of a physical state, a physiologic state, and an activity status of the wearer and to produce sensor signals. The sensor arrangement 134 can include a motion sensor arrangement 135. The motion sensor arrangement 135 can include one or more sensors configured to sense motion and/or a position (e.g., physical state and/or activity status) of the wearer of the hearing device 100. The motion sensor arrangement 135 can comprise one or more of an inertial measurement unit or IMU, an accelerometer(s), a gyroscope(s), a nine-axis sensor, a magnetometer(s) (e.g., a compass), and a GPS sensor. The IMU can be of a type disclosed in commonly-owned U.S. Pat. No. 9,848,273, which is incorporated herein by reference. The sensor arrangement 134 can include physiologic sensor arrangement 137, exclusive of or in addition to the motion sensor arrangement 135. The physiologic sensor arrangement 137 can include one or more physiologic sensors including, but not limited to, an EKG or ECG sensor, a pulse oximeter, a respiration sensor, a temperature sensor, a blood pressure sensor, a blood glucose sensor, an EEG sensor, an EMG sensor, an EOG sensor, an electrodermal activity sensor, and a galvanic skin response (GSR) sensor.

The hearing device 100 also includes a classification module 138 operably coupled to the processor 120. The classification module 138 can be implemented in software, hardware, or a combination of hardware and software. The classification module 138 can be a component of, or integral to, the processor 120 or another processor (e.g., a DSP) coupled to the processor 120. The classification module 138 is configured to classify sound in a particular acoustic environment by executing a classification algorithm. The processor 120 is configured to process sound using an outcome of the classification of the sound for specified hearing device functions. For example, the processor 120 can be configured to control different features of the hearing device in response to the outcome of the classification by the classification module 138, such as adjusting directional microphones and/or noise reduction settings, for purposes of providing optimum benefit in any given listening environment.

The classification module 138 can be configured to detect different types of sound and different types of acoustic environments. The different types of sound can include speech, music, and several different types of noise (e.g., wind, transportation noise and vehicles, machinery), etc., and combinations of these and other sounds (e.g., transportation noise with speech). The different types of acoustic environments can include a moderately loud restaurant, quiet restaurant speech, large room speech, sports stadium, concert auditorium, etc. Speech can include clean speech, noisy speech, and muffled speech. Clean speech can comprise speech spoken by different peoples at different reverberation situations, such as a living room or a cafeteria. Noisy speech can be clean speech mixed randomly with noise (e.g., noise at three levels of SNR: −6 dB, 0 dB and 6 dB). Machine noise can contain noise generated by various machineries, such as an automobile, a vacuum and a blender. Other sound types or classes can include any sounds that are not suitably described by other classes, for instance the sounds from water running, foot stepping, etc.

According to various embodiments, the classification module 138 can be configured to classify sound sensed by the microphone(s) 130 by executing a classification algorithm including a Hidden Markov Model (HMM). In some embodiments, the classification module 138 can be configured to classify sound sensed by the microphone(s) 130 by executing a classification algorithm including a Gaussian model, such as a Gaussian Mixture Model (GMM). In further embodiments, the classification module 138 can be configured to classify sound sensed by the microphone(s) 130 by executing other types of classification algorithms, such as neural networks, deep neural networks (DNN), regression models, decision trees, random forests, etc.

In various embodiments, the classification module 138 can be configured to classify sound sensed by the microphone(s) 130 as one of music, speech, and non-speech. The non-speech sound classified by the classification module 138 can include one of machine noise, wind noise, and other sounds. According to various embodiments, and as disclosed in commonly-owned U.S. Published Patent Application Serial No. 2011/0137656 which is incorporated herein by reference, the classification module 138 can comprise a feature set having a number of features for sound classification determined based on performance and computational cost of the sound classification. In some implementations, for example, the feature set can comprise 5 to 7 features, such as Mel-scale Frequency cepstral coefficients (MFCC). In other implementations, the feature set can comprise low level features.

The hearing device 100 can include one or more communication devices 136 coupled to one or more antenna arrangements. For example, the one or more communication devices 136 can include one or more radios that conform to an IEEE 802.11 (e.g., WiFi®) or Bluetooth® (e.g., BLE, Bluetooth® 4. 2, 5.0, 5.1, 5.2 or later) specification, for example. It is understood that the hearing device 100 can employ other radios, such as a 900 MHz radio. In addition, or alternatively, the hearing device 100 can include a near-field magnetic induction (NFMI) sensor (e.g., an NFMI transceiver coupled to a magnetic antenna) for effecting short-range communications (e.g., car-to-car communications, car-to-kiosk communications). Ear-to-car communications, for example, can be implemented by one or both processors 120 of a pair of hearing devices 100 when synchronizing the application of a selected parameter value set 125 during implementation of a user-initiated acoustic environment adaptation feature in accordance with various embodiments.

The antenna arrangement operatively coupled to the communication device(s) 136 can include any type of antenna suitable for use with a particular hearing device 100. A representative list of antennas includes, but are not limited to, patch antennas, planar inverted-F antennas (PIFAs), inverted-F antennas (IFAs), chip antennas, dipoles, monopoles, dipoles with capacitive-hats, monopoles with capacitive-hats, folded dipoles or monopoles, meandered dipoles or monopoles, loop antennas, Yagi-Udi antennas, log-periodic antennas, spiral antennas, and magnetic antennas. Many of these types of antenna can be implemented in the form of a flexible circuit antenna. In such embodiments, the antenna is directly integrated into a circuit flex, such that the antenna does not need to be soldered to a circuit that includes the communication device(s) 136 and remaining RF components.

The hearing device 100 also includes a power source, which can be a conventional battery, a rechargeable battery (e.g., a lithium-ion battery), or a power source comprising a supercapacitor. In the embodiment shown in FIG. 1A, the hearing device 100 includes a rechargeable power source 124 which is operably coupled to power management circuitry for supplying power to various components of the hearing device 100. The rechargeable power source 124 is coupled to charging circuity 126. The charging circuitry 126 is electrically coupled to charging contacts on the housing 102 which are configured to electrically couple to corresponding charging contacts of a charging unit when the hearing device 100 is placed in the charging unit.

Figure 1B:
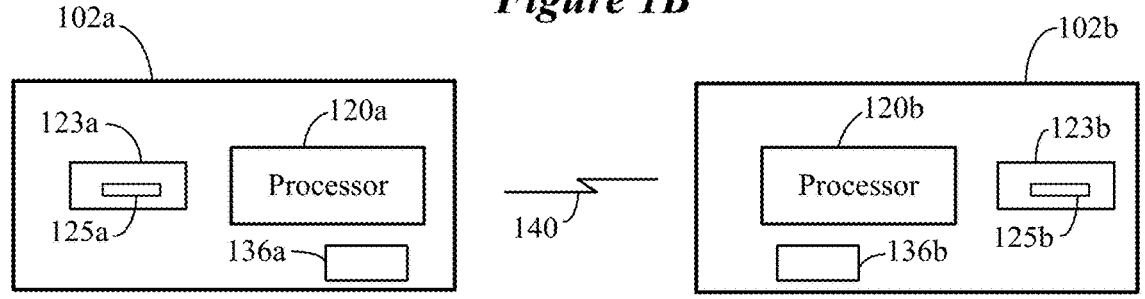
FIG. 1B illustrates a system comprising left and right ear-worn electronic devices of the type shown in FIG. 1A in accordance with any of the embodiments disclosed herein.

As was previously discussed, a hearing device system can include a left hearing device 102a and a right hearing device 102b, as is shown in FIG. 1B. The hearing devices 102a, 102b are shown to include a subset of the components shown in FIG. 1A for illustrative purposes. Each of the hearing devices 102a, 102b includes a processor 120a, 120b operatively coupled to non-volatile memory 123a, 123b and communication devices 136a, 136b. In some embodiments, the non-volatile memory 123a, 123b of each hearing device 102a, 102b is configured to store a plurality of parameter value sets 125a, 125b each of which is associated with a different acoustic environment. In other embodiments, only one of the non-volatile memories 123a, 123b is configured to store a plurality of parameter value sets 125a, 125b. In accordance with various embodiments disclosed herein, and after performing an acoustic environment classification process, at least one of the processors 120a, 120b is configured to apply one of the parameter value sets 125a, 125b stored in at least one of the non-volatile memories 123a, 123b appropriate for the classification. The communication devices 136a, 136b are configured to implement car-to-car communications (e.g., via an RF or NFMI link 140) when synchronizing the application of a selected parameter value set 125a, 125b by at least one of the processors 120a, 120b during implementation of a user-initiated acoustic environment adaptation feature in accordance with various embodiments.

Figure 2:
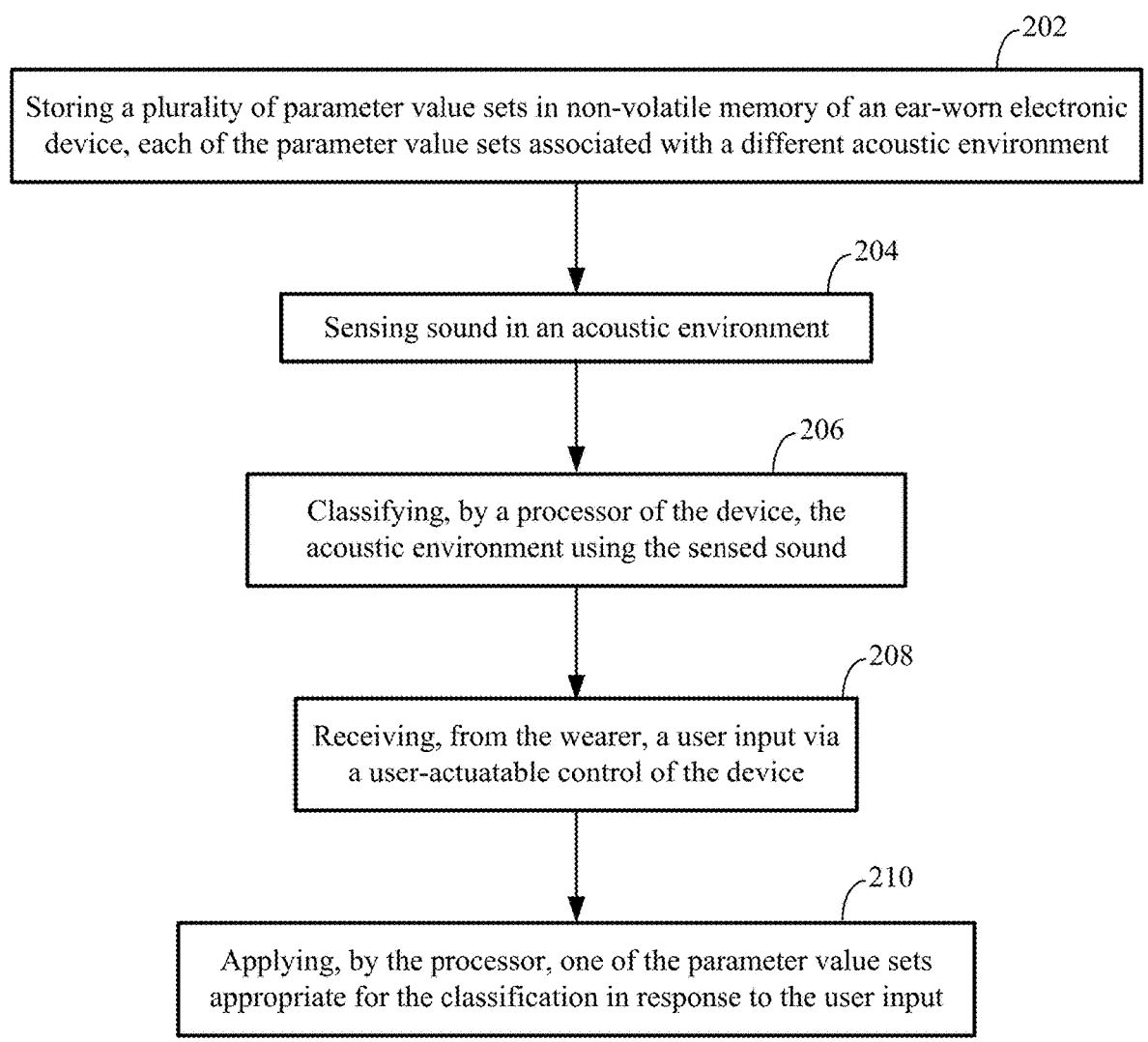
FIG. 2 illustrates a method of implementing an acoustic environment adaptation feature of an ear-worn electronic device in accordance with any of the embodiments disclosed herein.

FIG. 2 illustrates a method of implementing a user-initiated acoustic environment adaptation feature of an ear-worn electronic device in accordance with any of the embodiments disclosed herein. The method shown in FIG. 2 involves storing 202 a plurality of parameter value set in non-volatile memory of the hearing device. Each of the parameter value sets is associated with a different acoustic environment. The method involves sensing 204 sound in acoustic environment using one or more microphones of the hearing device. The method also involves classifying 206, by a processor of the hearing device, the acoustic environment using the sensed sound. The method further involves receiving 208, from the wearer, a user input via a user-actuatable control of the hearing device. The method also involves applying 210, by the processor, one of the parameter value set appropriate for the classification in response to the user input.

Figure 3:
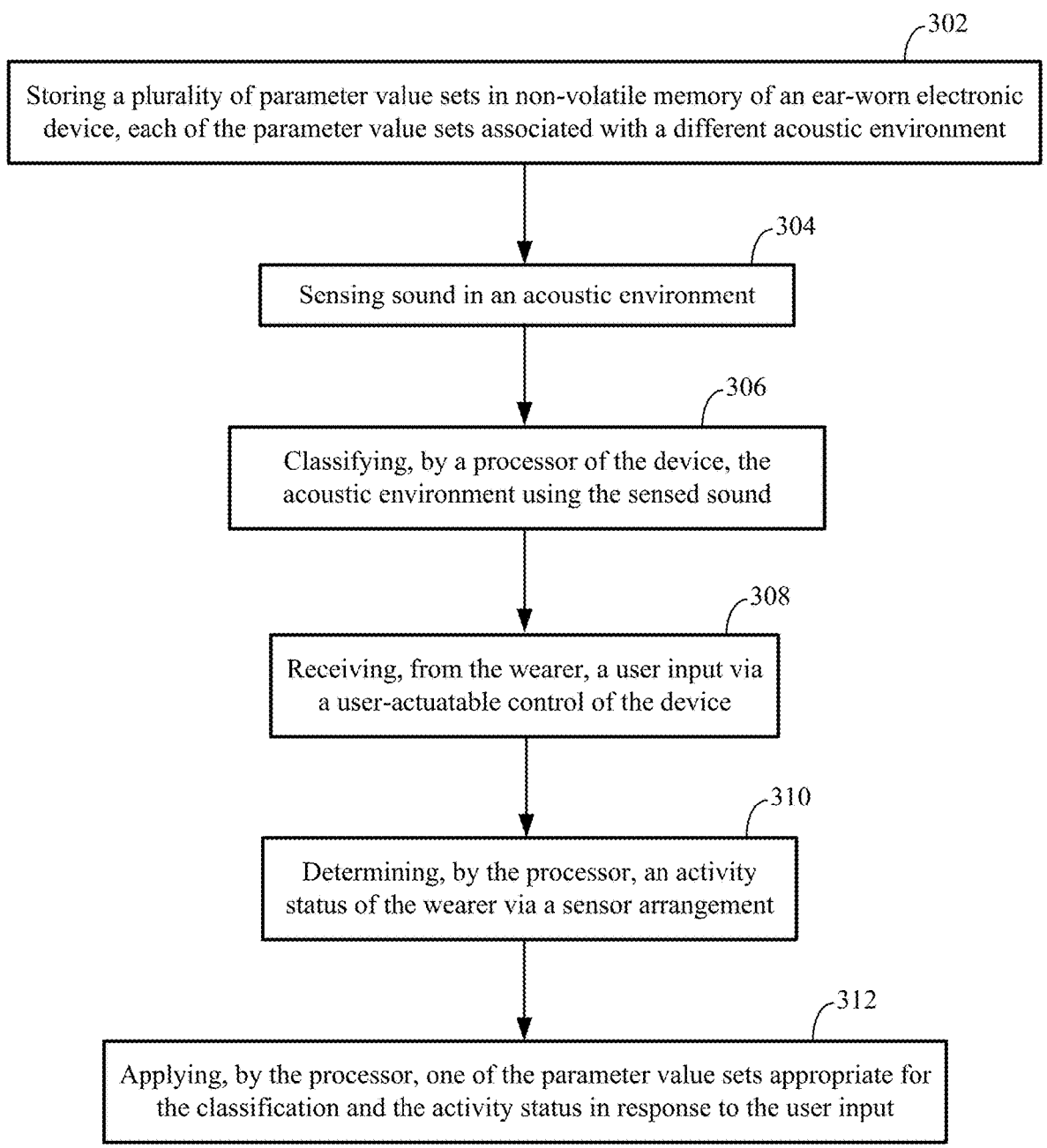
FIG. 3 illustrates a method of implementing an acoustic environment adaptation feature of an ear-worn electronic device in accordance with any of the embodiments disclosed herein.

FIG. 3 illustrates a method of implementing a user-initiated acoustic environment adaptation feature of an car-worn electronic device in accordance with any of the embodiments disclosed herein. The method shown in FIG. 3 involves storing 302 a plurality of parameter value sets in non-volatile memory of the hearing device. Each of the parameter value sets is associated with a different acoustic environment. The method involves sensing 304 sound in an acoustic environment using one or more microphones of the hearing device. The method also involves classifying 306, by a processor of the hearing device, the acoustic environment using the sensed sound. The method further involves receiving 308, from the wearer, a user input via a user-actuatable control of the hearing device. The method involves determining 310, by the processor, an activity status of the wearer. The method also involves applying 312, by the processor, one of the parameter value set appropriate for the classification and the activity status in response to the user input.

Figure 4:
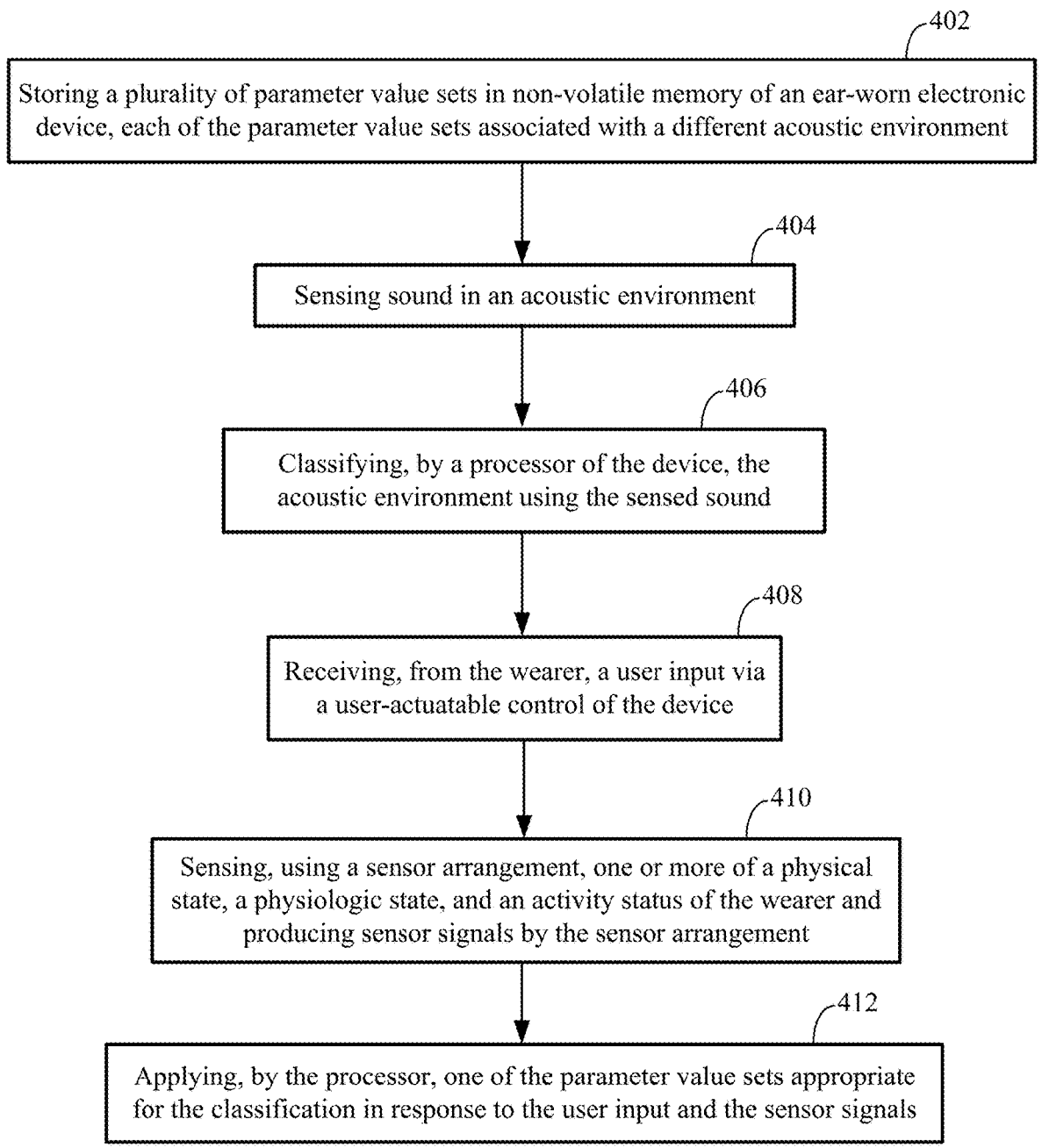
FIG. 4 illustrates a method of implementing an acoustic environment adaptation feature of an ear-worn electronic device in accordance with any of the embodiments disclosed herein.

FIG. 4 illustrates a method of implementing a user-initiated acoustic environment adaptation feature of an car-worn electronic device in accordance with any of the embodiments disclosed herein. The method shown in FIG. 4 involves storing 402 a plurality of parameter value sets in non-volatile memory of the hearing device. Each of the parameter value sets is associated with a different acoustic environment. The method involves sensing 404 sound in an acoustic environment using one or more microphones of the hearing device. The method also involves classifying 406, by a processor of the hearing device, the acoustic environment using the sensed sound. The method further involves receiving 408, from the wearer, a user input via a user-actuatable control of the hearing device. The method involves sensing 410, using a sensor arrangement, one or more of a physical state, a physiologic state, and an activity state of the wearer and producing signals by the sensor arrangement. The method also involves applying 412, by the processor, one of the parameter value set appropriate for the classification in response to the user input and the sensor signals.

By way of example, the wearer may be sitting alone in a moderately loud café and engaged in reading a newspaper. According to the method illustrated in FIG. 4, the processor of the wearer's hearing device would classify the acoustic environment generally as a moderately loud restaurant. In addition, the processor would receive sensor signals from a sensor arrangement of the hearing device which provide an indication of the wearer's physical state, the physiologic state, and/or activity status while present in the current acoustic environment. In this illustrative example, a motion sensor could sense relatively little or minimal head or neck movement indicative of reading rather than speaking with a tablemate at the café. The processor could also sense the absence of speaking by the wearer and/or a nearby person in response to signals produced by the microphone(s) of the hearing device. The additional information provided by the sensor arrangement of the hearing device provides contextual or listening intent information which can be used by the processor to refine the acoustic environment classification. For example, without the additional sensor information, the processor would configure the hearing device for operation in an acoustic environment classified as "quiet restaurant speech." This classification would assume that the wearer is engaged in conversation with another person within a quiet restaurant environment, which would not be accurate. In response to determining that the wearer is not engaged in conversation based on sensor signals received from the sensor arrangement, the processor of the hearing device would refine the acoustic environment classification as "quiet restaurant non-speech" or "quiet restaurant reading," which would be reflective of the listener's intent within the current acoustic environment.

Figure 5:
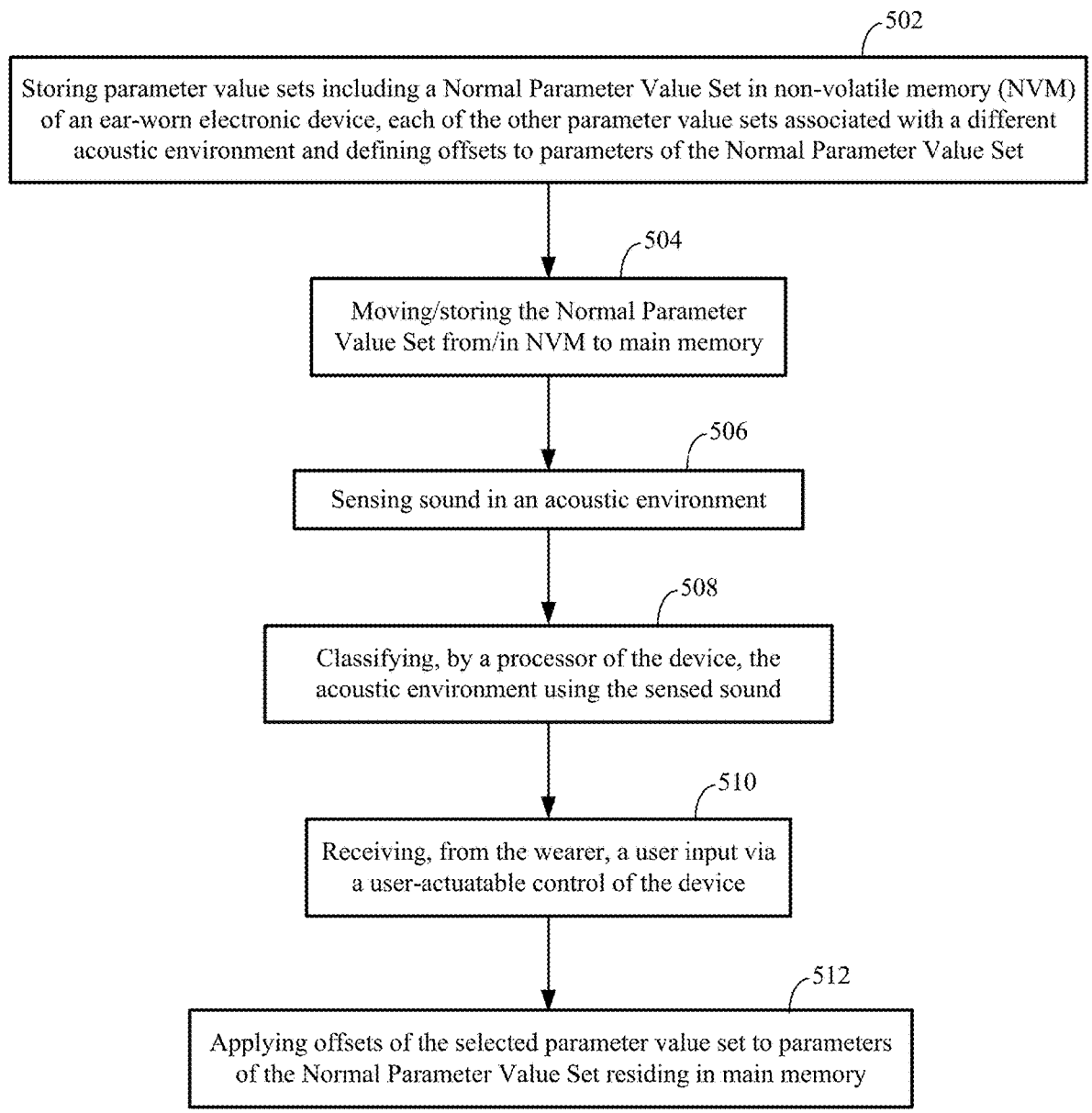
FIG. 5 illustrates a method of implementing an acoustic environment adaptation feature of an ear-worn electronic device in accordance with any of the embodiments disclosed herein.

FIG. 5 illustrates a method of implementing a user-initiated acoustic environment adaptation feature of an ear-worn electronic device in accordance with any of the embodiments disclosed herein. The method shown in FIG. 5 involves storing 502 parameter value sets including a Normal Parameter Value Set and other parameter value sets in non-volatile memory (NVM) of an ear-worn electronic device. Each of the other parameter value sets is associated with a different acoustic environment and defines offsets to parameters of the Normal Parameter Value Set. The method involves moving/storing the Normal Parameter Value Set from/in NVM to main memory of the device. The method also involves sensing 506 sound in an acoustic environment using one or more microphones of the device. The method further involves classifying 508, by a processor of the device, the acoustic environment using the sensed sound. The method also involves receiving 510, from the wearer, a user input via a user-actuatable control of the device. The method further involves applying 512 offsets of the selected parameter value set to parameters of the Normal Parameter Value Set residing in main memory.

Figure 6:
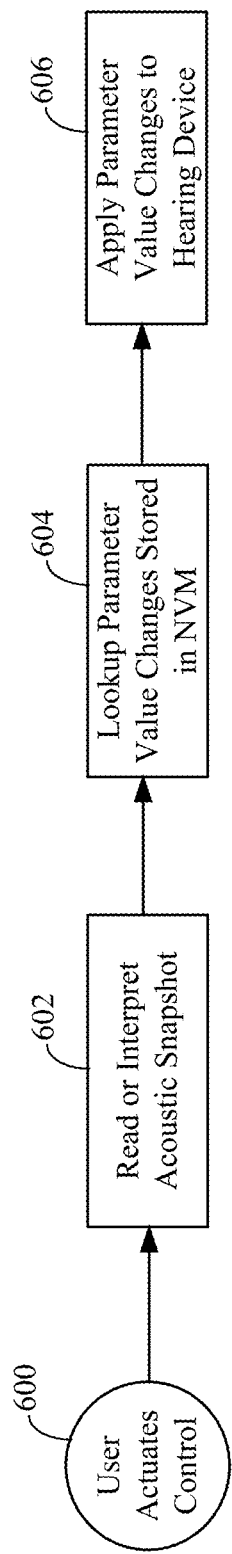
FIG. 6 illustrates a method of implementing an acoustic environment adaptation feature of an ear-worn electronic device in accordance with any of the embodiments disclosed herein.

FIG. 6 illustrates a process of implementing a user-initiated acoustic environment adaptation feature of an car-worn electronic device in accordance with any of the embodiments disclosed herein. According to the process shown in FIG. 6, the acoustic environment adaptation feature is initiated in response to a user actuating 600 a control of a hearing device. Prior to or after user actuation of the control, an acoustic snapshot of the listening environment is read or interpreted 602 by the hearing device. In some implementations, the hearing device can be configured to continuously or repetitively (e.g., every 5, 10, or 30 seconds) sense and classify the acoustic environment prior to actuation of the user-actuatable control. In other implementations, the hearing device can be configured to classify the acoustic environment in response to actuation of the user-actuatable control by the wearer (e.g., after actuation of the user-actuated control). An acoustic snapshot is generated by the hearing device based on the classification of the acoustic environment. After reading or interpreting 602 the acoustic snapshot, the method involves looking up 604 parameter value changes (e.g., offsets) stored in non-volatile memory of the hearing device. The method also involves applying 606 parameter value changes to the hearing device.

The processes shown in FIG. 6 can be initiated and repeated on an "on-demand" basis by the wearer by actuating the user-actuatable control of the hearing device. This on-demand capability allows the wearer to quickly (e.g., instantly or immediately) configure the hearing device for optimal performance in the wearer's current acoustic environment and in accordance with the wearer's listening intent. In contrast, conventional fully-autonomous sound classification techniques implemented in hearing devices provide for slow and gradual adaptation to the wearer's current acoustic environment. Moreover, conventional fully-autonomous sound classification techniques do not always provide desirable sound and can be distracting when the wearer is in a dynamic acoustic environment and the adaptations occur frequently.

Figure 7:
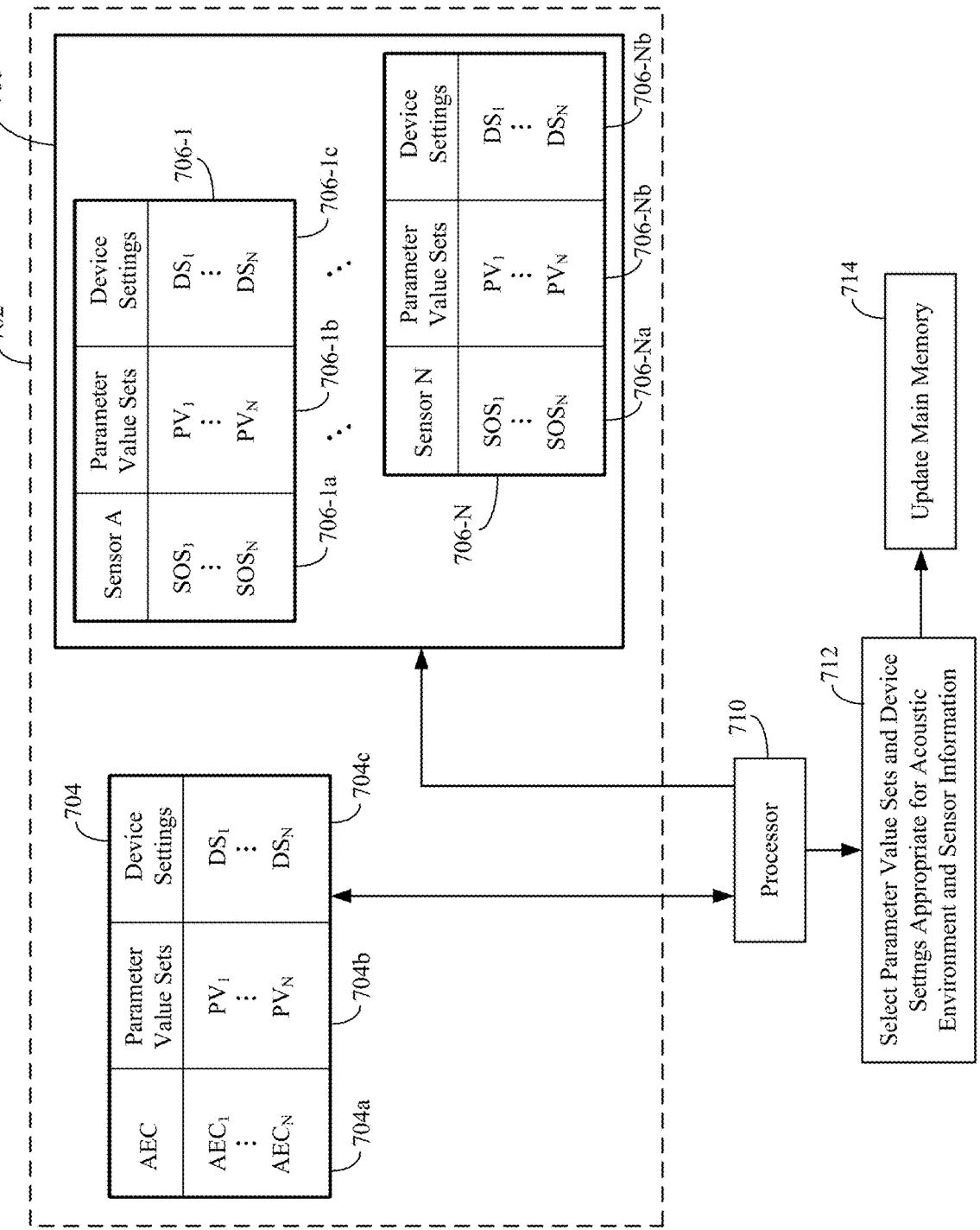
FIG. 7 illustrates a processor and non-volatile memory of an ear-worn electronic device configured to implement an acoustic environment adaptation feature in accordance with any of the embodiments disclosed herein.

FIG. 7 illustrates a processor and non-volatile memory of an car-worn electronic device configured to implement a user-initiated acoustic environment adaptation feature in accordance with any of the embodiments disclosed herein. FIG. 7 illustrates additional details of the processes of the method shown in FIG. 4. The processor 710 is operably coupled to non-volatile memory 702 which is configured to store a number of lookup tables 704, 706.

Lookup table 704 includes a table comprising a plurality of different acoustic environment classifications 704a ($AEC_1$-$AEC_N$). A non-exhaustive, non-limiting list of different acoustic environment classifications 704a can include, for example, any one or any combination of speech in quiet, speech in babble noise, speech in car noise, speech in noise, car noise, wind noise, and other noise. Each of the acoustic environment classifications 704a has associated with it a set of parameter values 704b ($PV_1$-$PV_N$) and a set of device settings 704c ($DS_1$-$DS_N$). The parameter value sets 704b ($PV_1$-$PV_N$) can include, for example, a set of gain values or gain offsets associated with each of the different acoustic environment classifications 704a ($AEC_1$-$AEC_N$). The device settings 704c ($DS_1$-$DS_N$) can include, for example, a set of noise-reduction parameters associated with each of the different acoustic environment classifications 704a ($AEC_1$-$AEC_N$). The device settings 704c ($DS_1$-$DS_N$) can also include, for example, a set of microphone mode parameters (e.g., omni mode, directional mode) associated with each of the different acoustic environment classifications 704a ($AEC_1$-$AEC_N$).

Lookup table 706 includes a lookup table associated with each of a number of different sensors of the hearing device. In the illustrative example shown in FIG. 7, the lookup table 706 includes table 706-1 associated with Sensor A (e.g., an IMU). Sensor A is characterized to have a plurality of different sensor output states (SOS) 706-1a ($SOS_1$-$SOS_N$) of interest. Each of the sensor output states 706-1a has associated with it a set of parameter values 706-1b ($PV_1$-$PV_N$) and a set of device settings 706-1c ($DS_1$-$DS_N$). The lookup table 706 also includes table 706-N associated with Sensor N (e.g., a physiologic sensor). Sensor N is characterized to have a plurality of different sensor output states 706-Na ($SOS_1$-$SOS_N$) of interest (e.g., an IMU can have sensor output states of sitting, standing, lying down, running, walking, etc.). Each of the sensor output states 706-Na has associated with it a set of parameter values 706-Nb ($PV_1$-$PV_N$) and a set of device settings 706-Nc ($DS_1$-$DS_N$).

The parameter value sets 706-1b, 706-Nb ($PV_1$-$PV_N$) can include, for example, a set of gain values or gain offsets associated with each of the different sensor output states 706-1a ($SOS_1$-$SOS_N$). The device settings 706-1c, 706-Nc ($DS_1$-$DS_N$) can include, for example, a set of noise-reduction parameters associated with each of the different sensor output states 706-Na ($SOS_1$-$SOS_N$). The device settings 706-1c, 706-Nc ($DS_1$-$DS_N$) can also include, for example, a set of microphone mode parameters (e.g., omni mode, directional mode) associated with each of the different sensor output states 706-1a, 706-Na.

The processor 710 of the hearing device, in response to sensing sound in an acoustic environment using one or more microphones, is configured to classify the acoustic environment using the sensed sound. Having classified the sensed sound, the processor 710 performs a lookup in table 704 to obtain the parameter value set 704b and device settings 704c that correspond to the acoustic environment classification 704a. Additionally, the processor 710 performs a lookup in table 706 in response to receiving sensor signals from one or more sensors of the hearing device. Having received sensor signals indicative of an output state of one or more hearing device sensors, the processor 710 obtains the parameter value set 706-1b, 706-Nb and device settings 706-1c, 706-Nc that correspond to the sensor output state 706-1a, 706-Na.

After performing lookups in tables 704 and 706, the processor 710 is configured to select 712 parameter value sets and device settings appropriate for the acoustic environment and the received sensor information. The main memory (e.g., custom or active memory) of the hearing device is updated 714 in a manner previously described using the selected parameter value sets and device settings. Subsequently, the processor 710 processes sound using the parameter value settings and device setting residing in the main memory.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

Figure 1C:
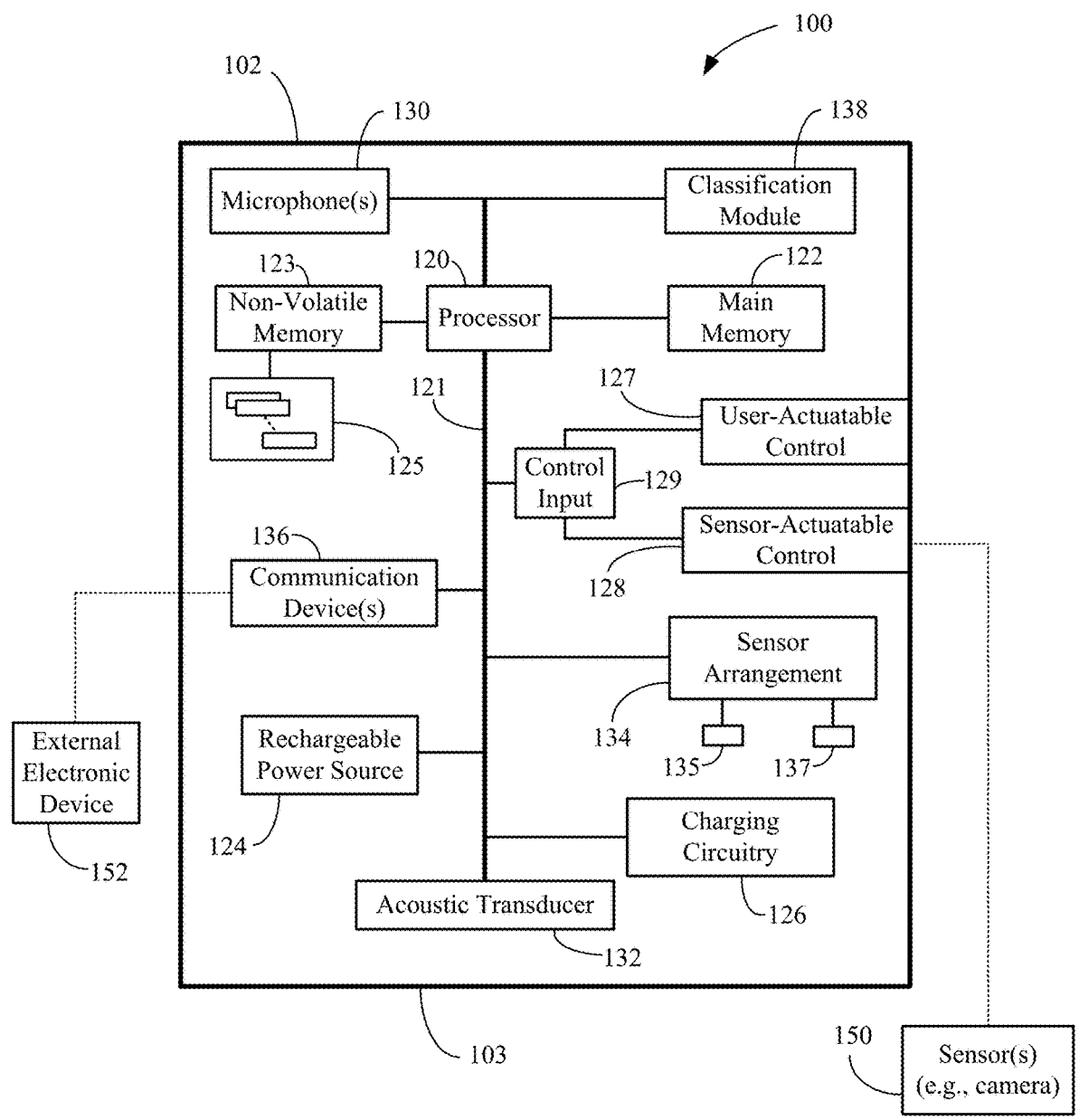
FIG. 1C illustrates an ear-worn electronic device in accordance with any of the embodiments disclosed herein.

According to various embodiments, and with reference to FIG. 1C, a Mask Mode mechanism of a hearing device can be activated manually in response to one or more control input signals generated by a user-actuatable control of the hearing device and/or automatically or semi-automatically by the hearing device in response to one or more control input signals generated by one or more sensors. The one or more sensors can be integral, or separate but communicatively coupled to, the hearing device. For example, a body-worn camera and/or a hand-carried camera can detect presence of a mask on the wearer and other persons within the acoustic environment. The camera(s) can communicate a control input signal to the hearing device which, in response to the control input signal(s), activates a hearing device mechanism (e.g., Mask Mode feature(s)) to optimally and automatically set hearing device parameters appropriate for the current acoustic environment and muffled speech within the current acoustic environment to enhance intelligibility of speech heard by the hearing device wearer.

Figure 1D:
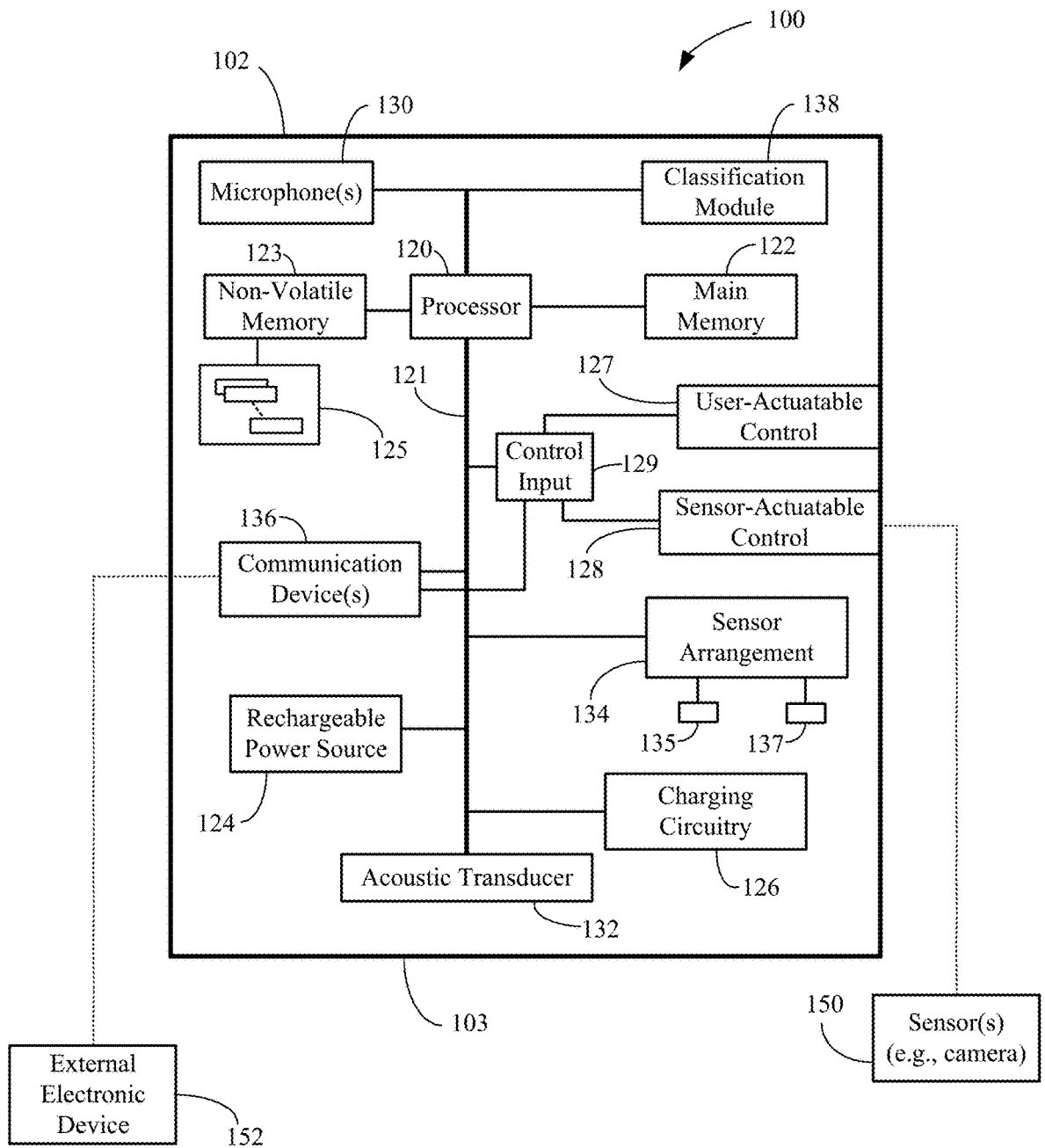
FIG. 1D illustrates an ear-worn electronic device in accordance with any of the embodiments disclosed herein.

According to various embodiments, and with reference to FIG. 1D, a Mask Mode mechanism of a hearing device can be activated manually in response to one or more control input signals generated by a user-actuatable control of the hearing device and/or automatically or semi-automatically by the hearing device in response to one or more control input signals generated by one or more sensors and/or a communication device communicatively coupled to the hearing device. The one or more sensors can be integral, or separate but communicatively coupled to, the hearing device, and be of a type described herein (e.g., a camera). The communication device can be any wireless device or system (see examples disclosed herein) configured to communicatively to the hearing device. In response to the control input signal(s), a hearing device mechanism (e.g., Mask Mode feature(s)) is activated to optimally and automatically set hearing device parameters appropriate for the current acoustic environment and muffled speech within the current acoustic environment to enhance intelligibility of speech heard by the hearing device wearer.

By way of example, a hearing device can be configured to automatically (e.g., autonomously) or semi-automatically (e.g., via a control input signal received from a smartphone or a smart watch in response to a user input to the smartphone or smart watch) detect the presence of a mask covering the face/mouth of a hearing device wearer and, in response, automatically (or semi-automatically via a confirmation input by the wearer via a user-actuatable control or the hearing device or via a smartphone or smart watch) activate a Mask Mode configured to enhance intelligibility of the wearer's and/or other person's muffled speech. For example, the hearing device can sense for a reduction in gain for a specified frequency range or a specified frequency band or bands while monitoring the wearer's and/or other person's speech in the acoustic environment. This gain reduction for the specified frequency range/band is indicative of muffled speech due to the presence of a mask covering the wearer's mouth. One or more gain/frequency profiles indicative of muffled speech due to the wearing of a mask (e.g., a single mask or different masks) can be developed specifically for the hearing device wearer or for a population of hearing device wearers. The pre-established gain/frequency profile(s) can be stored in a memory of the hearing device and compared against real-time gain/frequency data produced by a processor of the hearing device while monitoring the wearer's and/or other person's speech in the acoustic environment.

In various embodiments, the mechanisms (e.g., Edge Mode and/or Mask Mode) to assess the acoustic environment including the presence of speaker (which may or may not include masked speakers) within the acoustic environment (and optionally user activity) can be contained completely on the hearing device, without the need for connection/communication with a mobile processing device or the Internet. Hearing device wearers do not have to remember which program memory is used for which acoustic situation-instead, they simply get the best settings for their current situation through the simple press of a button or control on the hearing device or by way of automatic or semi-automatic activation via a camera and/or other sensor and/or an external electronic device (e.g., a smartphone or smart watch). Hearing device wearers are not subject to parameter changes if they don't want them (e.g., there need not be fully automatic adaptation involved). All parameter changes can be user-driven and are optimal for the wearer's current listening situation, such as those involving muffled speech delivered by masked persons within the current acoustic environment.

A hearing device according to various embodiments is configured to detect a discrete set of listening situations, through monitoring acoustic characterization variables in the hearing device as well as (optionally) activity monitoring data. For these discrete set of situations, parameters (e.g., parameter offsets) are created during the fitting process and stored on the hearing device. In the case of one or more Mask Modes of the hearing device, the hearing device can be configured to detect a discrete set of listening situations involving masked speakers, through monitoring acoustic characterization variables in the hearing device aid as well as (optionally) activity monitoring data. For these discrete set of situations, parameters (e.g., parameter offsets) are created during the fitting process and stored on the hearing device for each of the one or more Mask Modes. When the hearing device wearer generates a control input signal via, e.g., pushing a memory button on the hearing device or an activation button presented on a smartphone or smart watch display (with the smartphone or smart watch running a hearing device interactive app), for example, the current acoustic/activity (optional) situation is assessed, interpreted, and used to lookup the appropriate parameter set in the stored configurations. The relevant parameters are loaded and made available in the current active memory for the user to experience.

Mask Mode embodiments of the disclosure are directed to improving intelligibility of muffled speech communicated to the ear drum of a hearing device wearer when the wearer is within an acoustic environment in which the hearing device wearer and other persons are speaking through a protective mask. Mask Mode embodiments are agnostic with respect to social distancing and simply optimize speech for enhanced intelligibility. Unlike an approach that merely applies a slight change of gain in high frequencies, Mask Mode embodiments of the disclosure analyze the actual voice (acoustic slice) at that time (e.g., in real-time), in that environment, with the mask in place, and then selects settings (e.g., individual settings or selected settings from a number of different presets or libraries of features) that include the most appropriate set of acoustic parameters (compression, gain, etc.) for that specific environment (e.g., with that specific mask, distance, presence of noise, soft speech or loud speech, music, etc.). As discussed previously, Edge Mode embodiments of the disclosure can be implemented in the same or similar manner as Mask Mode embodiments.

Embodiments of the disclosure are defined in the claims. However, below there is provided a non-exhaustive listing of non-limiting Mask Mode examples. Any one or more of the features of these examples may be combined with any one or more features of another example, embodiment, or aspect described herein.

Example Ex0. An ear-worn electronic device configured to be worn in, on or about an ear of a wearer, comprises at least one microphone configured to sense sound in an acoustic environment, a speaker or a receiver, and a non-volatile memory configured to store a plurality of parameter value sets each associated with a different acoustic environment, wherein one or more of the parameter value sets are associated with an acoustic environment with muffled speech delivered by one or more masked persons within the acoustic environment. A control input is operatively coupled to one or both of a user-actuatable control and a sensor-actuatable control, and a processor, operably coupled to the microphone, the speaker or the receiver, the non-volatile memory, and the control input, is configured to classify the acoustic environment as one with muffled speech using the sensed sound and, in response to a signal received from the control input, apply one or more of the parameter value sets appropriate for the classification to enhance intelligibility of muffled speech.

Example Ex1. An ear-worn electronic device configured to be worn in, on or about an ear of a wearer, comprises at least one microphone configured to sense sound in an acoustic environment, an acoustic transducer (e.g., a speaker, a receiver, a bone conduction transducer), and a non-volatile memory configured to store a plurality of parameter value sets each associated with a different acoustic environment, wherein one or more of the parameter value sets are associated with an acoustic environment with muffled speech. A control input is configured to receive a control input signal produced by at least one of a user-actuatable control of the ear-worn electronic device, a sensor of the ear-worn electronic device, and an external electronic device communicatively coupled to the ear-worn electronic device, and a processor, operably coupled to the microphone, the acoustic transducer, the non-volatile memory, and the control input, is configured to classify the acoustic environment as one with muffled speech using the sensed sound and, in response to a signal received from the control input, apply one or more of the parameter value sets appropriate for the classification to enhance intelligibility of muffled speech.

Example Ex2. The device according to Ex0 or Ex1, wherein the processor is configured to apply a first parameter value set to enhance intelligibility of muffled speech uttered by the wearer of the ear-worn electronic device, and apply a second parameter value set, different from the first parameter value set, to enhance intelligibility of muffled speech uttered by one or more persons other than the wearer of the ear-worn electronic device.

Example Ex3. The device according to Ex0 or Ex1, wherein the processor is configured to continuously or repetitively classify the acoustic environment to monitor for a change in gain for frequencies within a specified frequency range relative to a baseline prior to receiving the control input signal, and the change in gain is indicative of the presence of muffled speech.

Example Ex4. The device according to Ex0 or Ex1, wherein the processor is configured to classify the acoustic environment and detect a change in gain for frequencies within a specified frequency range relative to a baseline in response to receiving the control input signal, and the change in gain is indicative of the presence of muffled speech.

Example Ex5. The device according to Ex3 or Ex4, wherein the baseline comprises a generic baseline associated with a population of mask-wearing persons not known by the wearer.

Example Ex6. The device according to Ex3 of Ex4, wherein the baseline comprises a baseline associated with one or more specified groups of mask-wearing persons known to the wearer.

Example Ex7. The device according to Ex0 or Ex1, wherein the parameter value sets associated with an acoustic environment with muffled speech comprise a plurality of parameter value sets each associated with a different type of mask wearable by the one or more masked persons.

Example Ex8. The device according to Ex0 or Ex1, wherein each of the parameter value sets comprises a set of gain values or gain offsets associated with a different acoustic environment, and the processor is configured to increase the set of gain values or gain offsets for a specified frequency range in response to classifying the acoustic environment as one with muffled speech.

Example Ex9. The device according to one or more of Ex2, Ex3, and Ex8, wherein the specific frequency range comprises a frequency range of about 0.5 kHz to about 4 kHz.

Example Ex10. The device according to one or more of Ex0 to Ex9, wherein each of the parameter value sets comprises a set of gain values or gain offsets associated with a different acoustic environment and a set of noise-reduction parameters associated with the different acoustic environments.

Example Ex11. The device according to one or more of Ex0 to Ex9, wherein each of the parameter value sets comprises a set of gain values or gain offsets associated with a different acoustic environment, a set of noise-reduction parameters associated with the different acoustic environments, and a set of microphone mode parameters associated with the different acoustic environments.

Example Ex12. The device according to one or more of Ex0 to Ex 11, wherein the parameter value sets comprise a normal parameter value set associated with a normal or default acoustic environment, and a plurality of other parameter value sets each associated with a different acoustic environment including one or more parameter value sets associated with an acoustic environment with muffled speech.

Example Ex13. The device according to Ex12, wherein each of the other parameter value sets define offsets to parameters of the normal parameter value set.

Example Ex14. The device according to Ex13, wherein the processor is coupled to a main memory and the normal parameter value set resides in the main memory, and the processor is configured to select a parameter value set appropriate for the classification and, in response to the control input signal, apply offsets of the selected parameter value set to parameters of the normal parameter value set residing in the main memory.

Example Ex15. The device according to one or more of Ex0 to Ex 14, wherein the user-actuatable control comprises a button disposed on the device.

Example Ex16. The device according to one or more of Ex0 to Ex15, wherein the user-actuatable control comprises a sensor responsive to a touch or a tap by the wearer.

Example Ex17. The device according to one or more of Ex0 to Ex16, wherein the user-actuatable control comprises a voice recognition control implemented by the processor.

Example Ex18. The device according to one or more of Ex0 to Ex17, wherein the user-actuatable control comprises gesture detection circuitry responsive to a wearer gesture made in proximity to the device.

Example Ex19. The device according to one or more of Ex0 to Ex18, wherein the sensor-actuatable control comprises a camera carried or supported by the wearer, and the camera, the processor, or a remote processor communicatively coupled to the device is configured to detect presence of a mask on the one or more mask-wearing persons within the acoustic environment.

Example Ex20. The device according to Ex19, wherein the camera, the processor, or the remote processor is configured to detect the type of the mask on the one or more mask-wearing persons.

Example Ex21. The device according to Ex19 or Ex20, wherein the camera comprises a body-wearable camera.

Example Ex22. The device according to Ex 19 or Ex21, wherein the camera comprises a smartphone camera or a smart watch camera.

Example Ex23. The device according to one or more of Ex1 to Ex22, wherein the external electronic device comprises one or more of a personal digital assistant, a smartphone, a smart watch, a tablet, and a laptop.

Example Ex24. The device according to one or more of Ex0 to Ex23, wherein the processor is configured to apply one or more different parameter value sets appropriate for the classification of the current acoustic environment in response to one or more subsequently received control input signals, learn wearer preferences using utilization data acquired during application of the different parameter value sets applied by the processor, and adapt selection of subsequent parameter value sets by the processor for subsequent use in the current acoustic environment using the learned wearer preferences.

Example Ex25. The device according to one or more of Ex0 to Ex24, wherein the processor is configured to apply one or more different parameter value sets appropriate for the classification of the current acoustic environment in response to one or more subsequently received control input signals, store, in the memory, one or both of utilization data and contextual data acquired by the processor during application of the different parameter value sets associated with the current acoustic environment, and adapt selection of subsequent parameter value sets by the processor for subsequent use in the current acoustic environment using one or both of the utilization data and the contextual data.

Example Ex26. The device according to one or more of Ex0 to Ex25, wherein the processor is configured with instructions to implement a machine learning algorithm to one or more of automatically apply an adapted parameter value set appropriate for an initial or a subsequent classification of the current acoustic environment, learn wearer preferences using utilization data acquired during application of the different parameter value sets applied by the processor, adapt selection of subsequent parameter value sets for subsequent use in the current acoustic environment using learned wearer preferences, and adapt selection of subsequent parameter value sets for subsequent use in the current acoustic environment using one or both of utilization data and contextual data.

Example Ex27. A method implemented by an ear-worn electronic device configured to be worn in, on or about an ear of a wearer comprises storing a plurality of parameter value sets in non-volatile memory of the device. Each of the parameter value sets is associated with a different acoustic environment, wherein one or more of the parameter value sets are associated with an acoustic environment with muffled speech. The method comprises sensing sound in an acoustic environment, classifying, by a processor of the device using the sensed sound, the acoustic environment as one with muffled speech, receiving a signal from a control input of the device, and applying, by the processor in response to the control input signal, one or more of the parameter value sets appropriate for the classification to enhance intelligibility of muffled speech.

Example Ex28. The method according to Ex27, wherein applying comprises applying a first parameter value set to enhance intelligibility of muffled speech uttered by the wearer of the ear-worn electronic device, and applying a second parameter value set, different from the first parameter value set, to enhance intelligibility of muffled speech uttered by one or more persons other than the wearer of the ear-worn electronic device.

Example Ex29. The method according to Ex27, wherein classifying comprises continuously or repetitively classify the acoustic environment to monitor for a change in gain for frequencies within a specified frequency range relative to a baseline prior to receiving the control input signal, and the change in gain is indicative of the presence of muffled speech.

Example Ex30. The method according to Ex27, wherein classifying comprises classifying the acoustic environment and detecting a change in gain for frequencies within a specified frequency range relative to a baseline in response to receiving the control input signal, and the change in gain is indicative of the presence of muffled speech.

Example Ex31. The method according to Ex25 or Ex30, wherein the baseline comprises a generic baseline associated with a population of mask-wearing persons not known by the wearer.

Example Ex32. The method according to Ex25 or Ex30, wherein the baseline comprises a baseline associated with one or more specified groups of mask-wearing persons known to the wearer.

Example Ex33. The method according to Ex27, wherein the parameter value sets associated with an acoustic environment with muffled speech comprise a plurality of parameter value sets each associated with a different type of mask wearable by the one or more masked persons.

Example Ex34. The method according to Ex27, wherein each of the parameter value sets comprises a set of gain values or gain offsets associated with a different acoustic environment, and the processor increases the set of gain values or gain offsets for a specified frequency range in response to classifying the acoustic environment as one with muffled speech.

Example Ex35. The method according to one or more of Ex29, Ex30, and Ex34, wherein the specific frequency range comprises a frequency range of about 0.5 kHz to about 4 kHz.

Example Ex36. The method according to one or more of Ex27 to Ex35, wherein each of the parameter value sets comprises a set of gain values or gain offsets associated with a different acoustic environment, and a set of noise-reduction parameters associated with the different acoustic environments.

Example Ex37. The method according to one or more of Ex27 to Ex35, wherein each of the parameter value sets comprises a set of gain values or gain offsets associated with a different acoustic environment, a set of noise-reduction parameters associated with the different acoustic environments, and a set of microphone mode parameters associated with the different acoustic environments.

Example Ex38. The method according to one or more of Ex27 to Ex37, wherein the parameter value sets comprise a normal parameter value set associated with a normal or default acoustic environment, and a plurality of other parameter value sets each associated with a different acoustic environment including one or more parameter value sets associated with an acoustic environment with muffled speech.

Example Ex39. The method according to Ex38, wherein each of the other parameter value sets define offsets to parameters of the normal parameter value set.

Example Ex40. The method according to Ex39, wherein the processor is coupled to a main memory and the normal parameter value set resides in the main memory, and the processor selects a parameter value set appropriate for the classification and, in response to the control input signal, applies offsets of the selected parameter value set to parameters of the normal parameter value set residing in the main memory.

Example Ex41. The method according to one or more of Ex27 to Ex40, wherein the control input signal is generated by one or both of a user-actuatable control and a sensor-actuatable control.

Example Ex42. The method according to Ex41, wherein the user-actuatable control comprises a button disposed on the device.

Example Ex43. The method according to Ex41 or Ex42, wherein the user-actuatable control comprises a sensor responsive to a touch or a tap by the wearer.

Example Ex44. The method according to one or more of Ex41 to Ex43, wherein the user-actuatable control comprises a voice recognition control implemented by the processor.

Example Ex45. The method according to one or more of Ex41 to Ex44, wherein the user-actuatable control comprises gesture detection circuitry responsive to a wearer gesture made in proximity to the device.

Example Ex46. The method according to one or more of Ex41 to Ex45, wherein the sensor-actuatable control comprises a camera carried or supported by the wearer, and the camera, the processor, or a remote processor communicatively coupled to the device is configured to detect presence of a mask on the one or more mask-wearing persons within the acoustic environment.

Example Ex47. The method according to Ex46, wherein the camera, the processor, or the remote processor is configured to detect the type of the mask on the one or more mask-wearing persons.

Example Ex48. The method according to Ex46 or Ex47, wherein the camera comprises a body-wearable camera or a camera supported by glasses worn by the wearer.

Example Ex49. The method according to one or more of Ex46 to Ex48, wherein the camera comprises a smartphone camera or a smart watch camera.

Example Ex50. The device according to one or more of Ex0 to Ex49 wherein the processor is configured to automatically generate a current parameter value set in response to a first control input, the current parameter value set providing a pleasing or preferred listening experience for the wearer, the processor also configured to store, in the non-volatile memory, the current parameter value set as a user-defined memory in the non-volatile memory.

Example Ex51. The device according to Ex50, wherein the processor is configured to retrieving the user-defined memory from the non-volatile memory in response to a second control input, and apply the parameter value set corresponding to the user-defined memory to recreate the pleasing or preferred listening experience for the wearer.

Example Ex52. The method according to one or more of Ex27 to Ex49, comprising automatically generating a current parameter value set in response to a first control input, the current parameter value set providing a pleasing or preferred listening experience for the wearer, and storing, in the non-volatile memory, the current parameter value set as a user-defined memory in the non-volatile memory.

Example Ex53. The method according to Ex52, comprising retrieving the user-defined memory from the non-volatile memory in response to a second control input, and applying the parameter value set corresponding to the user-defined memory to recreate the pleasing or preferred listening experience for the wearer.

Example Ex54. The method according to one or more of Ex27 to Ex53, comprising wherein applying, by the processor, one or more different parameter value sets appropriate for the classification of the current acoustic environment in response to one or more subsequently received control input signals, learning, by the processor, wearer preferences using utilization data acquired during application of the different parameter value sets applied by the processor, and adapting, by the processor, selection of subsequent parameter value sets by the processor for subsequent use in the current acoustic environment using the learned wearer preferences.

Example Ex55. The method according to one or more of Ex27 to Ex54, comprising applying, by the processor, one or more different parameter value sets appropriate for the classification of the current acoustic environment in response to one or more subsequently received control input signals, storing, by the processor in the memory, one or both of utilization data and contextual data acquired by the processor during application of the different parameter value sets associated with the current acoustic environment, and adapting, by the processor, selection of subsequent parameter value sets by the processor for subsequent use in the current acoustic environment using one or both of the utilization data and the contextual data.

Example Ex56. The method according to one or more of Ex27 to Ex55, wherein the processor is configured with instructions to implement a machine learning algorithm to one or more of automatically apply an adapted parameter value set appropriate for an initial or a subsequent classification of the current acoustic environment, learn wearer preferences using utilization data acquired during application of the different parameter value sets applied by the processor, adapt selection of subsequent parameter value sets for subsequent use in the current acoustic environment using learned wearer preferences, and adapt selection of subsequent parameter value sets for subsequent use in the current acoustic environment using one or both of utilization data and contextual data.

FIGS. 1C and 1D illustrate an ear-worn electronic device 100 in accordance with any of the embodiments disclosed herein. The hearing device 100 shown in FIGS. 1C and 1D can be configured to implement one or more Mask Mode features disclosed herein. The hearing device 100 shown in FIGS. 1C and 1D can be configured to implement one or more Mask Mode features disclosed herein and one or more Edge Mode features disclosed herein. The hearing device 100 shown in FIGS. 1C and 1D can be configured to include some or all of the components and/or functionality of the hearing device 100 shown in FIGS. 1A and 1B.

The hearing device 100 shown in FIG. 1C differs from that shown in FIG. 1A in that a control input 129 of, or operatively coupled to, the processor 120 is operatively coupled to a sensor-actuatable control 128 in addition to the user-actuatable control 127. The hearing device 100 shown in FIG. 1C includes a user interface comprising a user-actuatable control 127 and a sensor-actuatable control 128 operatively coupled to the processor 120 via a control input 129. The control input 129 is configured to receive a control input signal generated by one or both of the user-actuatable control 127 and the sensor-actuatable control 128.

The hearing device 100 shown in FIG. 1D differs from that shown in FIG. 1A and FIG. 1C in that a control input 129 of, or operatively coupled to, the processor 120 is operatively coupled to a sensor-actuatable control 128 and a communication device or devices 136, in addition to the user-actuatable control 127. The hearing device 100 shown in FIG. 1D includes a user interface comprising the user-actuatable control 127, the sensor-actuatable control 128, and the communication device(s) 136, each of which is operatively coupled to the processor 120 via the control input 129. The control input 129 is configured to receive a control input signal generated by one or more of the user-actuatable control 127, the sensor-actuatable control 128, and the communication device(s) 136. The communication device(s) 136 is configured to communicatively couple to an external electronic device 152 (e.g., a smartphone or a smart watch) and to receive a control input signal from the external electronic device 152. The control input signal is typically generated by the external electronic device 152 in response to an activation command initiated by the wearer of the hearing device 100. The control input signal received by the communication device(s) 136 is communicated to the control input 129 via the communication bus 121 or a separate connection.

The hearing device 100 shown in FIGS. 1C and 1D can be configured to include a non-volatile memory 123 configured to store a multiplicity of parameter value sets 125, each of the parameter value sets associated with a different acoustic environment and one or more Mask Modes. The hearing device 100 shown in FIGS. 1C and 1D can be configured to include a non-volatile memory 123 configured to store a multiplicity of parameter value sets 125, each of the parameter value sets associated with a different acoustic environment, one or more Mask Modes, and one or more Edge Modes.

The user-actuatable control 127 is configured to receive an input from the wearer of the hearing device 100. The input from the wearer can be any type of user input, such as a touch input, a gesture input, or a voice input. The user-actuatable control 127 can include one or more of a tactile interface, a gesture interface, and a voice command interface. The tactile interface can include one or more manually actuatable switches (e.g., a push button, a toggle switch, a capacitive switch). For example, the user-actuatable control 127 can include a number of manually actuatable buttons or switches disposed on the hearing device housing 102. The user-actuatable control 127 can comprises a sensor responsive to a touch or a tap (e.g., a double-tap) by the wearer. The user-actuatable control 127 can comprise a voice recognition control implemented by the processor 120. The user-actuatable control 127 can be responsive to different types of wearer input. For example, an acoustic environment adaptation feature of the hearing device 100 can be initiated by a double-tap input followed by voice command and/or assistance thereafter.

The user-actuatable control 127 can comprise gesture detection circuitry responsive to a wearer gesture made in proximity to the hearing device 100 (e.g., a non-contacting gesture made spaced apart from the device). A single antenna and gesture detection circuitry of the hearing device 100 can be used to classify wearer gestures, such as hand or finger motions made in proximity to the hearing device. As the wearer's hand or finger moves, the electrical field or magnetic field of the antenna is perturbed. As a result, the antenna input impedance is changed. When a wearer performs hand or finger motions (e.g. waving, swipe, tap, holds, zoom, circular movements, etc.), an antenna impedance monitor records the reflection coefficients of the signals or impedance. As the wearer's hand or finger moves, the changes in antenna impedance show unique patterns due to the perturbation of the antenna's electrical field or magnetic field. These unique patterns can correspond to predetermined user inputs, such as an input to implement an acoustic environment adaptation feature of the hearing device 100. As will be discussed in detail hereinbelow, the user-actuatable control 127 is configured to receive an input from the wearer of the hearing device 100 to initiate an acoustic environment adaptation feature of the hearing device 100.

The sensor-actuatable control 128 is configured to communicatively couple to one or more external sensors 150. The sensor-actuatable control 128 can include electronic circuitry to communicatively couple to one or more external sensors 150 via a wireless connection or a wired connection. For example, the sensor-actuatable control 128 can include one or more wireless radios (e.g., examples described herein) configured to communicate with one or more sensors 150, such as a camera. The camera 150 can be a body-worn camera, such as a camera affixed to glasses worn by a wearer of the hearing device (e.g., a MyEye camera manufactured by OrCam®). The camera 150 can be a camera of a smartphone or a smart watch. In the context of activating a Mask Mode of the hearing device, the camera 150 can be configured to detect the presence of a mask on the hearing device wearer and other persons within the acoustic environment. A processor of the camera 150 or an external processor (e.g., one or more of a remote processor, a cloud server/processor, a smartphone processor, a smart watch processor) can implement mask recognition software to detect the presence of a mask, the type of mask, the mask manufacturer, and/or the mask material.

For example, mask recognition software implemented by one or more of the aforementioned processors can be configured to identify the following types of masks: a homemade cloth mask, a bandana, a T-shirt mask, a store-bought cloth mask, a cloth mask with filter, a neck gaiter, a balaclava, a disposable surgical mask, a cone-style mask, an N95 mask, and a respirator. In some implementations, the mask recognition software can detect the type, manufacturer, and model of the masks within the acoustic environment. Each of these (and other) mask types can have an associated parameter value set 125 stored in non-volatile memory 123 of the hearing device 100. In some embodiments, mask-related data of the parameter value sets 125 can be received from a smartphone/smart watch or cloud server and integrated into the parameter value sets 125 stored in non-volatile memory 123. In response to performing mask recognition for each mask within the acoustic environment, the processor 120 of the hearing device 100 can select and apply a parameter value set 125 appropriate for the acoustic environment classification and each of the detected masks within the acoustic environment.

As previously discussed, the control input 129 of hearing device 100 shown in FIG. 1D is operatively coupled to the communication device(s) 136 and is configured to receive a control input signal from an external electronic device 152, such as a smartphone or a smartwatch. In response to receiving the control input signal from the external electronic device 152, the processor 120 is configured to initiate an acoustic environment adaptation feature of the hearing device 100, such as by initiating one or more both of an Edge Mode and a Mask Mode of the hearing device 100.

In some embodiments, the hearing device 100 shown in FIGS. 1C and 1D can include a sensor arrangement 134. The sensor arrangement 134 can include one or more sensors configured to sense one or more of a physical state, a physiologic state, and an activity status of the wearer and to produce sensor signals. The sensor arrangement 134 can include one or more of the sensors discussed previously with reference to FIG. 1A.

The hearing device 100 shown in FIGS. 1C and 1D can also include a classification module 138 operably coupled to the processor 120. The classification module 138 can be implemented in software, hardware, or a combination of hardware and software, and in a manner previously described with reference to FIG. 1A.

As previously discussed, the classification module 138 can be configured to detect different types of sound and different types of acoustic environments. The different types of sound can include speech, music, and several different types of noise (e.g., wind, transportation noise and vehicles, machinery), etc., and combinations of these and other sounds (e.g., transportation noise with speech). The different types of acoustic environments can include a moderately loud restaurant, quiet restaurant speech, large room speech, sports stadium, concert auditorium, etc. Speech can include clean speech, noisy speech, and muffled speech delivered by masked speakers/persons. Clean speech can comprise speech spoken by different persons at different reverberation situations, such as a living room or a cafeteria. Muffled speech can comprise speech spoken by different persons speaking through a mask at different reverberation situations, such as a conference room or an airport. Noisy speech (e.g., speech with noise) can be clean speech or muffled speech mixed randomly with noise (e.g., noise at three levels of SNR: −6 dB, 0 dB and 6 dB). Machine noise can contain noise generated by various machineries, such as an automobile, a vacuum and a blender. Other sound types or classes can include any sounds that are not suitably described by other classes, for instance the sounds from water running, foot stepping, etc.

In various embodiments, the classification module 138 can be configured to classify sound sensed by the microphone(s) 130 as one of music, speech (e.g., clear, muffled, noisy), and non-speech. The non-speech sound classified by the classification module 138 can include one of machine noise, wind noise, and other sounds. According to various embodiments, and as disclosed in commonly-owned U.S. Published Patent Application Serial No. 2011/0137656 which is incorporated herein by reference, the classification module 138 can comprise a feature set having a number of features for sound classification determined based on performance and computational cost of the sound classification. In some implementations, for example, the feature set can comprise 5 to 7 features, such as Mel-scale Frequency cepstral coefficients (MFCC). In other implementations, the feature set can comprise low level features.

Figure 8:
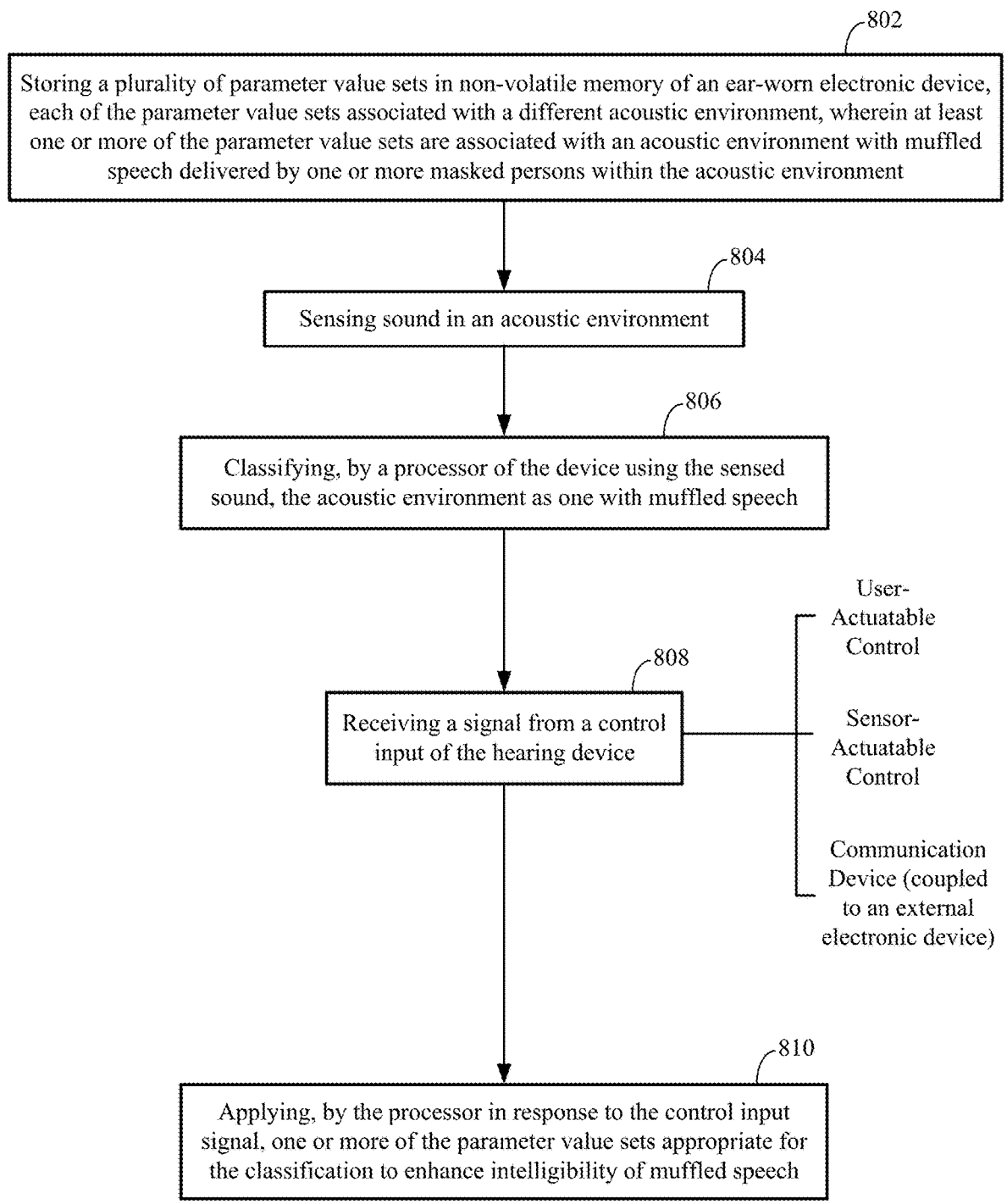
FIG. 8 illustrates a method of implementing an acoustic environment adaptation feature of an ear-worn electronic device in accordance with any of the embodiments disclosed herein.

FIG. 8 illustrates a method of implementing a user-initiated, a sensor-initiated, and/or an external electronic device-initiated acoustic environment adaptation feature of an ear-worn electronic device in accordance with any of the embodiments disclosed herein. The method shown in FIG. 8 involves storing 802 a plurality of parameter value sets in non-volatile memory of the ear-worn electronic device. Each of the parameter value sets is associated with a different acoustic environment, wherein at least one or more of the parameter value sets are associated with an acoustic environment with muffled speech delivered by one or more masked persons within the acoustic environment. The method involves sensing 804 sound in an acoustic environment using one or more microphones of the hearing device. The method also involves classifying 806, by a processor of the hearing device using the sensed sound, the acoustic environment as one with muffled speech.

The method further involves receiving 808 a signal from a control input of the hearing device. The control input signal can be generated by a user-actuatable control, a sensor-actuatable control, or an external electronic device communicatively coupled to a communication device of the hearing device. The method also involves applying 810, by the processor in response to the control input signal, one or more of the parameter value sets appropriate for the classification to enhance intelligibility of muffled speech.

In accordance with any of the embodiments disclosed herein, and as additional processing steps to the method illustrated in FIG. 8, the method can additionally involve determining, by the processor, an activity status of the wearer. The method can also involve applying, by the processor, one or more of the parameter value sets appropriate for the classification (e.g., a classification involving muffled speech) and the activity status in response to the control input signal.

According to any of the embodiments disclosed herein, and as additional processing steps to the method illustrated in FIG. 8, the method can additionally involve sensing, using a sensor arrangement, one or more of a physical state, a physiologic state, and an activity state of the wearer and producing signals by the sensor arrangement. The method can also involve applying, by the processor, one or more of the parameter value set appropriate for the classification (e.g., a classification involving muffled speech) in response to the control input signal and the sensor signals.

By way of example, the wearer may be sitting alone in a moderately loud café and engaged in reading a newspaper. According to the methods discussed above, the processor of the wearer's hearing device would classify the acoustic environment generally as a moderately loud restaurant. In the case of masked persons being present, the processor would classify the acoustic environment generally as a moderately loud restaurant with masked speakers.

In addition, the processor would receive sensor signals from a sensor arrangement of the hearing device which provide an indication of the wearer's physical state, the physiologic state, and/or activity status while present in the current acoustic environment. In this illustrative example, a motion sensor could sense relatively little or minimal head or neck movement indicative of reading rather than speaking with a tablemate at the café. The processor could also sense the absence of speaking by the wearer and/or a nearby person in response to signals produced by the microphone(s) of the hearing device. The additional information provided by the sensor arrangement of the hearing device provides contextual or listening intent information which can be used by the processor to refine the acoustic environment classification.

For example, without the additional sensor information, the processor would configure the hearing device for operation in an acoustic environment classified as "quiet restaurant speech." This classification would assume that the wearer is engaged in conversation with another person (e.g., masked or non-masked) within a quiet restaurant environment, which would not be accurate. In response to determining that the wearer is not engaged in conversation based on sensor signals received from the sensor arrangement, the processor of the hearing device would refine the acoustic environment classification as "quiet restaurant non-speech" or "quiet restaurant reading," which would be reflective of the listener's intent within the current acoustic environment.

Figure 9:
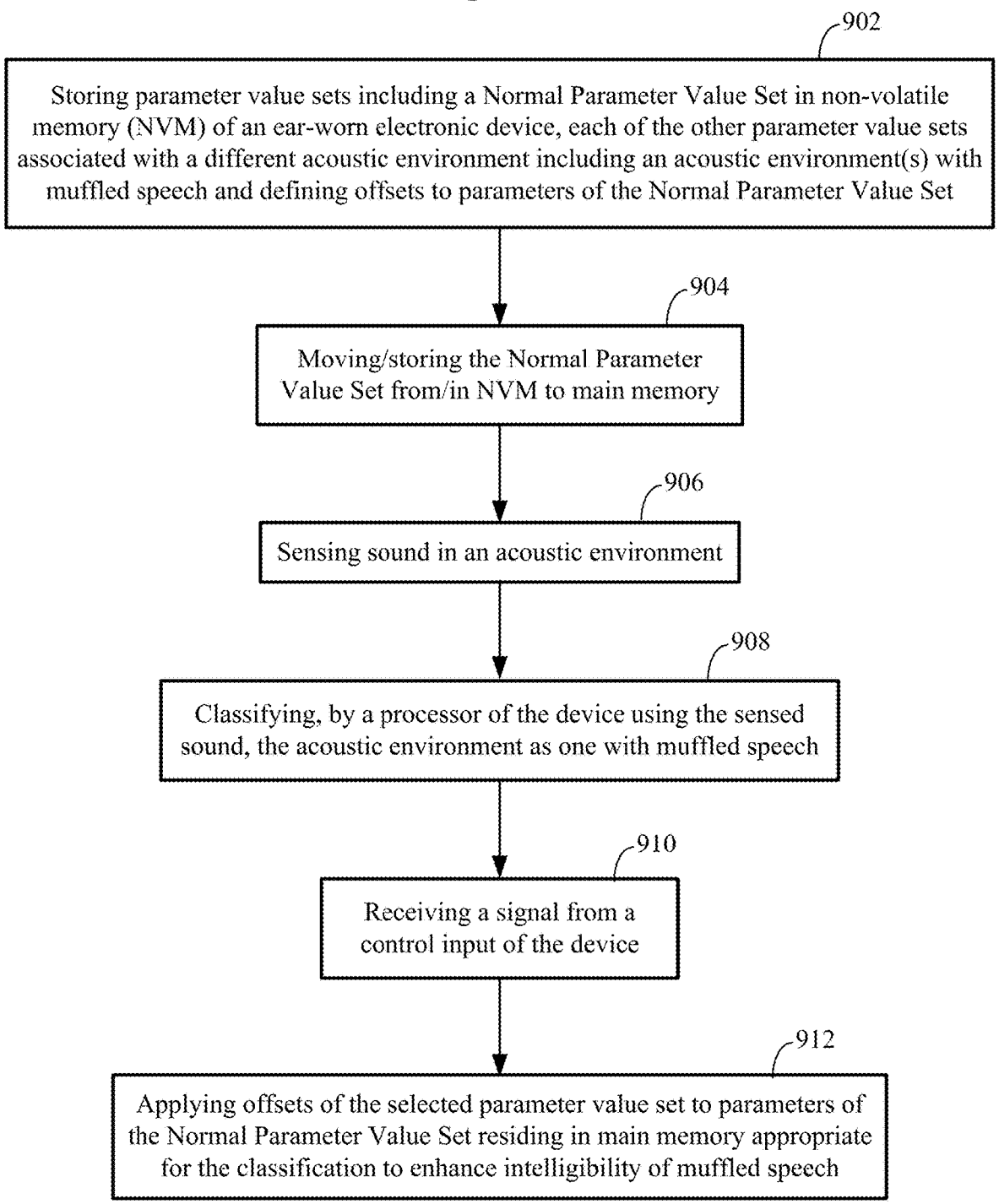
FIG. 9 illustrates a method of implementing an acoustic environment adaptation feature of an ear-worn electronic device in accordance with any of the embodiments disclosed herein.

FIG. 9 illustrates a method of implementing a user-initiated, a sensor-initiated, and/or an external electronic device-initiated acoustic environment adaptation feature of an ear-worn electronic device in accordance with any of the embodiments disclosed herein. The method shown in FIG. 9 involves storing 902 parameter value sets including a Normal Parameter Value Set in non-volatile memory (NVM) of an ear-worn electronic device. Each of the other parameter value sets is associated with a different acoustic environment including an acoustic environment or environments with muffled speech and defining offsets to parameters of the Normal Parameter Value Set.

The method involves moving/storing 904 the Normal Parameter Value Set from/in NVM to main memory of the device. The method also involves sensing 906 sound in an acoustic environment using one or more microphones of the device. The method further involves classifying 908, by a processor of the device using the sensed sound, the acoustic environment as one with muffled speech. The method also involves receiving 910 a signal from a control input of the hearing device. The control input signal can be generated by a user-actuatable control, a sensor-actuatable control, or an external electronic device communicatively coupled to a communication device of the hearing device. The method further involves applying 912 offsets of the selected parameter value set to parameters of the Normal Parameter Value Set residing in main memory appropriate for the classification to enhance intelligibility of muffled speech.

Figure 10:
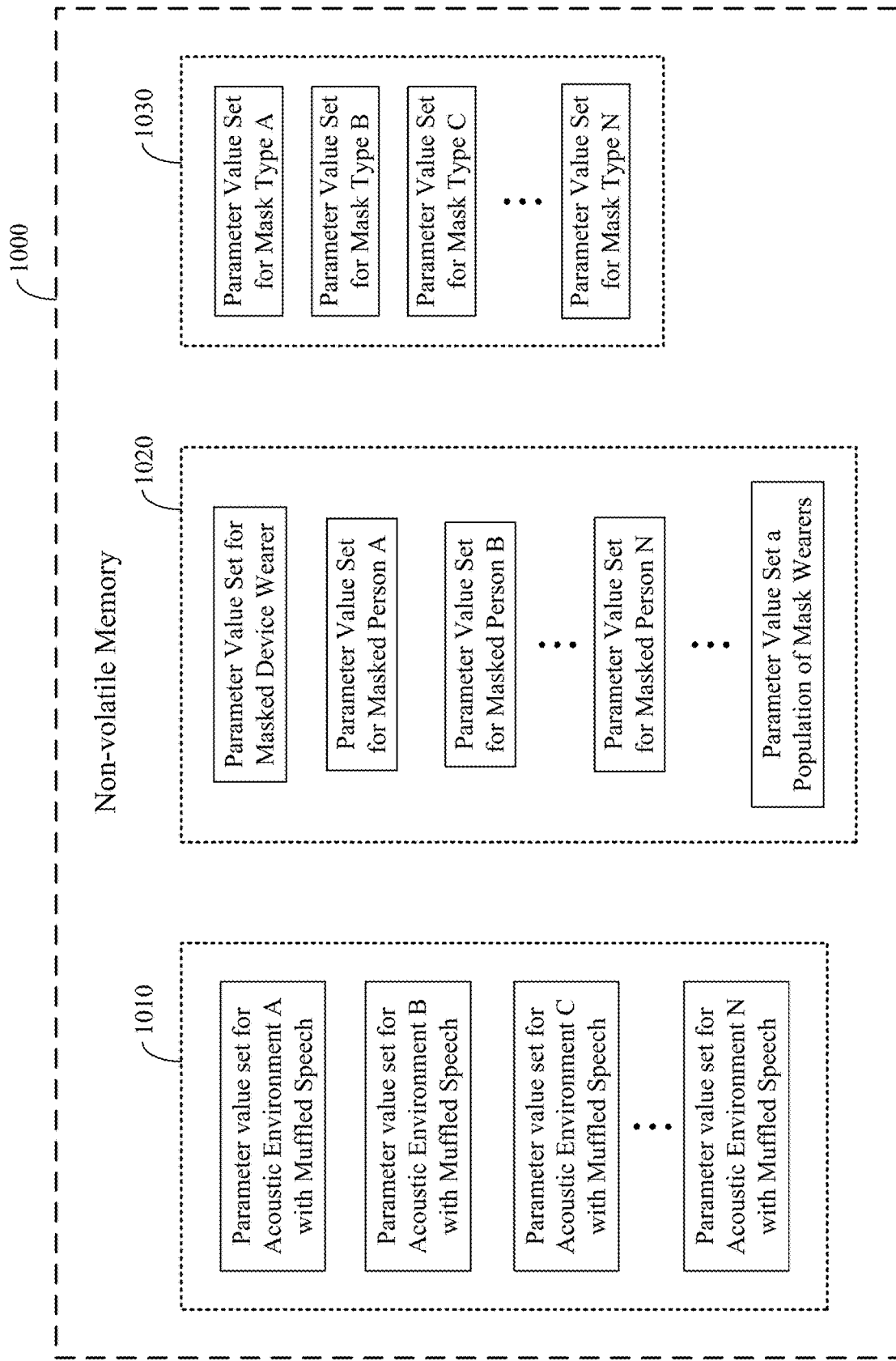
FIG. 10 illustrates various types of parameter value set data that can be stored in non-volatile memory and operated on by a processor of an ear-worn electronic device in accordance with any of the embodiments disclosed herein.

FIG. 10 illustrates various types of parameter value set data that can be stored in non-volatile memory in accordance with any of the embodiments disclosed herein. The non-volatile memory 1000 shown in FIG. 10 can include parameter value sets 1010 for different acoustic environments, including various acoustic environments with muffled speech (e.g., Acoustic Environments A, B, C, . . . . N). The non-volatile memory 1000 can include parameter value sets 1020 for different mask-wearing speakers, including the wearer of the hearing device (masked device wearer), masked persons known the hearing device wearer (e.g., family members, friends, business colleagues-masked persons A-N), and/or a population of mask wearers (e.g., averaged parameter value set, such as average gain values or gain offsets). The non-volatile memory 1000 can include parameter value sets 1030 specific for different types of masks (see examples above). For example, parameter value set A can be specific for a cloth mask, parameter value set B can be specific for a cloth mask with filter, parameter value set C can be specific for a disposable surgical mask, parameter value set D can be specific for an N95 mask, and parameter value set N can be specific for a generic respirator.

Figure 11:
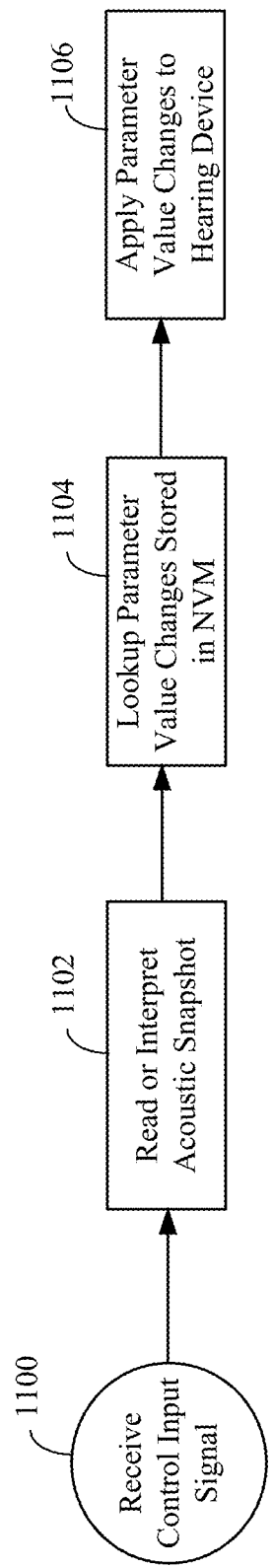
FIG. 11 illustrates a method of implementing an acoustic environment adaptation feature of an ear-worn electronic device in accordance with any of the embodiments disclosed herein.

FIG. 11 illustrates a process of implementing a user-initiated, a sensor-initiated, and/or an external electronic device-initiated acoustic environment adaptation feature of an ear-worn electronic device in accordance with any of the embodiments disclosed herein. According to the process shown in FIG. 11, the acoustic environment adaptation feature is initiated in response to receiving 1100 a control input signal at a control input of the hearing device. The control input signal can be generated by a user-actuatable control, a sensor-actuatable control, or an external electronic device communicatively coupled to a communication device of the hearing device. Prior to or after receiving the control input signal, an acoustic snapshot of the listening environment is read or interpreted 1102 by the hearing device. In some implementations, the hearing device can be configured to continuously or repetitively (e.g., every 5, 10, or 30 seconds) sense and classify the acoustic environment prior receiving the control input signal. In other implementations, the hearing device can be configured to classify the acoustic environment in response to receiving the control input signal (e.g., after actuation of the user-actuated control or the sensor-actuated control). An acoustic snapshot is generated by the hearing device based on the classification of the acoustic environment. After reading or interpreting 1102 the acoustic snapshot, the method involves looking up 1104 parameter value changes (e.g., offsets) stored in non-volatile memory of the hearing device. The method also involves applying 1106 parameter value changes to the hearing device.

The processes shown in FIG. 11 can be initiated and repeated on an "on-demand" basis by the wearer by actuating the user-actuatable control of the hearing device or by generating a control input signal via an external electronic device communicatively coupled to the hearing device. Alternatively or additionally, the processes shown in FIG. 11 can be initiated and repeated on a "sensor-activated" basis in response to a control input signal generated by an external device or sensor (e.g., a camera or other sensor) communicatively coupled to the hearing device. This on-demand/sensor-activated capability allows the hearing device to be quickly (e.g., instantly or immediately) configured for optimal performance in the wearer's current acoustic environment (e.g., an acoustic environment with muffled speech)

and in accordance with the wearer's listening intent. In contrast, conventional fully-autonomous sound classification techniques implemented in hearing devices provide for slow and gradual adaptation to the wearer's current acoustic environment. Moreover, conventional fully-autonomous sound classification techniques do not always provide desirable sound and can be distracting when the wearer is in a dynamic acoustic environment and the adaptations occur frequently.

Figure 12:
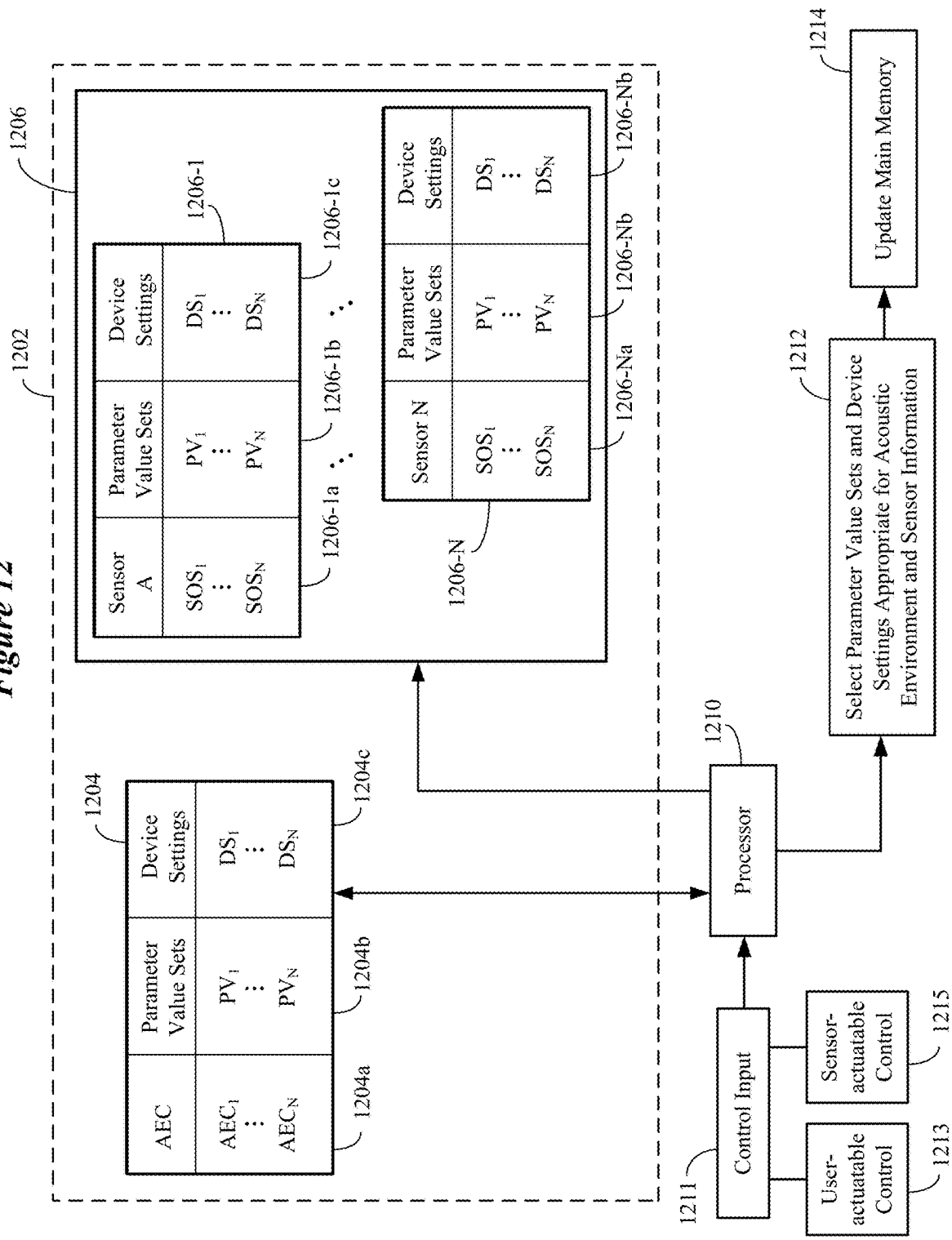
FIG. 12 illustrates a processor and non-volatile memory of an ear-worn electronic device configured to implement an acoustic environment adaptation feature in accordance with any of the embodiments disclosed herein.

FIG. 12 illustrates a processor and non-volatile memory of an ear-worn electronic device configured to implement a user-initiated, a sensor-initiated, and/or an external electronic device-initiated acoustic environment adaptation feature in accordance with any of the embodiments disclosed herein. FIG. 12 illustrates additional details of the processes of the method shown in FIGS. 8 and 9 and other method figures. The processor 1210 is operably coupled to non-volatile memory 1202 which is configured to store a number of lookup tables 1204, 1206.

Lookup table 1204 includes a table comprising a plurality of different acoustic environment classifications 1204a ($AEC_1$-$AEC_N$). A non-exhaustive, non-limiting list of different acoustic environment classifications 1204a can include, for example, any one or any combination of speech in quiet, speech in babble noise, speech in car noise, speech in noise, muffled speech in quiet, muffled speech in babble noise, muffled speech in car noise, muffled speech in noise, car noise, wind noise, machine noise, and other noise. Each of the acoustic environment classifications 1204a has associated with it a set of parameter values 1204b ($PV_1$-$PV_N$) and a set of device settings 1204c ($DS_1$-$DS_N$). The parameter value sets 1204b ($PV_1$-$PV_N$) can include, for example, a set of gain values or gain offsets associated with each of the different acoustic environment classifications 1204a ($AEC_1$-$AEC_N$). The device settings 1204c ($DS_1$-$DS_N$) can include, for example, a set of noise-reduction parameters associated with each of the different acoustic environment classifications 1204a ($AEC_1$-$AEC_N$). The device settings 1204c ($DS_1$-$DS_N$) can also include, for example, a set of microphone mode parameters (e.g., omni mode, directional mode) associated with each of the different acoustic environment classifications 1204a ($AEC_1$-$AEC_N$).

Lookup table 1206 includes a lookup table associated with each of a number of different sensors of the hearing device. In the illustrative example shown in FIG. 12, the lookup table 1206 includes table 1206-1 associated with Sensor A (e.g., an IMU). Sensor A is characterized to have a plurality of different sensor output states (SOS) 1206-1a ($SOS_1$-$SOS_N$) of interest. Each of the sensor output states 1206-1a has associated with it a set of parameter values 1206-1b ($PV_1$-$PV_N$) and a set of device settings 1206-1c ($DS_1$-$DS_N$). The lookup table 1206 also includes table 1206-N associated with Sensor N (e.g., a physiologic sensor). Sensor N is characterized to have a plurality of different sensor output states 1206-Na ($SOS_1$-$SOS_N$) of interest (e.g., an IMU can have sensor output states of sitting, standing, lying down, running, walking, etc.). Each of the sensor output states 1206-Na has associated with it a set of parameter values 1206-Nb ($PV_1$-$PV_N$) and a set of device settings 1206-Nc ($DS_1$-$DS_N$).

The parameter value sets 1206-1b, 1206-Nb ($PV_1$-$PV_N$) can include, for example, a set of gain values or gain offsets associated with each of the different sensor output states 1206-1a ($SOS_1$-$SOS_N$). The device settings 1206-1c, 1206-Nc ($DS_1$-$DS_N$) can include, for example, a set of noise-reduction parameters associated with each of the different sensor output states 1206-Na ($SOS_1$-$SOS_N$). The device settings 1206-1c, 1206-Nc ($DS_1$-$DS_N$) can also include, for example, a set of microphone mode parameters (e.g., omni mode, directional mode) associated with each of the different sensor output states 1206-1a, 1206-Na.

The processor 1210 of the hearing device, in response to sensing sound in an acoustic environment using one or more microphones, is configured to classify the acoustic environment using the sensed sound. Having classified the sensed sound, the processor 1210 performs a lookup in table 1204 to obtain the parameter value set 1204b and device settings 1204c that correspond to the acoustic environment classification 1204a. Additionally, the processor 1210 performs a lookup in table 1206 in response to receiving sensor signals from one or more sensors of the hearing device. Having received sensor signals indicative of an output state of one or more hearing device sensors, the processor 1210 obtains the parameter value set 1206-1b, 1206-Nb and device settings 1206-1c, 1206-Nc that correspond to the sensor output state 1206-1a, 1206-Na.

After performing lookups in tables 1204 and 1206, the processor 1210 is configured to select 1212 parameter value sets and device settings appropriate for the acoustic environment and the received sensor information. The main memory (e.g., custom or active memory) of the hearing device is updated 1214 in a manner previously described using the selected parameter value sets and device settings. Subsequently, the processor 1210 processes sound using the parameter value settings and device setting residing in the main memory. It is understood that, in less complex implementations, the non-volatile memory 1202 can exclude lookup table 1206, and the hearing device can be configured to implement a user-initiated, a sensor-initiated, and/or an external electronic device-initiated acoustic environment adaptation feature using lookup table 1204.

The following features can be implemented by a hearing device in accordance with any of the embodiments disclosed herein. With continued reference to FIG. 12 for purposes of example, the processor 1210 can be configured to apply a first parameter value set (e.g., PV1) to enhance intelligibility of muffled speech uttered by the wearer of the hearing device, and apply a second parameter value set (e.g., PV2), different from the first parameter value set (e.g., PV1), to enhance intelligibility of muffled speech uttered by one or more persons other than the wearer of the hearing device. For example, the first and second parameter value sets can be swapped in and out of main memory 1214 during a conversation between a masked hearing device wearer and the wearer's masked friend to improve the intelligibility of speech uttered by the wearer and the wearer's friend.

The processor 1210 can be configured to classify the acoustic environment and detect a change in gain for frequencies within a specified frequency range relative to a baseline in response to receiving a control input signal at the control input 1211, wherein the change in gain is indicative of the presence of muffled speech. The processor 1210 can be configured to continuously or repetitively classify the acoustic environment to monitor for a change in gain for frequencies within a specified frequency range relative to a baseline prior to receiving a control input signal at the control input 1211, wherein the change in gain is indicative of the presence of muffled speech. The baseline can comprise a generic baseline associated with a population of mask-wearing persons not known by the wearer. The baseline can comprise a baseline associated with one or more specified groups of mask-wearing persons known to the wearer (e.g., family, friends, colleagues).

The parameter value sets associated with an acoustic environment with muffled speech can comprise a plurality of parameter value sets (e.g., $PV_5$-$PV_{10}$) each associated with a different type of mask wearable by the one or more masked persons, including the masked hearing device wearer. Each of the parameter value sets can comprise a set of gain values or gain offsets associated with a different acoustic environment (e.g., $AE_1$-$AE_N$ associated with $AEC_1$-$AEC_N$), and the processor 1210 can be configured to increase the set of gain values or gain offsets for a specified frequency range in response to classifying the acoustic environment as one with muffled speech. The specific frequency range discussed herein can comprise a frequency range of about 0.5 kHz to about 4 kHz.

Each of the parameter value sets can comprise a set of gain values or gain offsets associated with a different acoustic environment (e.g., $AE_1$-$AE_N$ associated with $AEC_1$-$AEC_N$) and a set of noise-reduction parameters (e.g., $DS_1$-$DS_N$) associated with the different acoustic environments. Each of the parameter value sets can comprise a set of gain values or gain offsets associated with a different acoustic environment (e.g., $AE_1$-$AE_N$ associated with $AEC_1$-$AEC_N$), a set of noise-reduction parameters (e.g., $DS_1$-$DS_N$) associated with the different acoustic environments, and a set of microphone mode parameters (e.g., $DS_1$-$DS_N$) associated with the different acoustic environments.

The parameter value sets (e.g., $PV_1$-$PV_N$) can comprise a normal parameter value set associated with a normal or default acoustic environment and a plurality of other parameter value sets each associated with a different acoustic environment including one or more parameter value sets associated with an acoustic environment with muffled speech. Each of the other parameter value sets can define offsets to parameters of the normal parameter value set.

Figure 13:
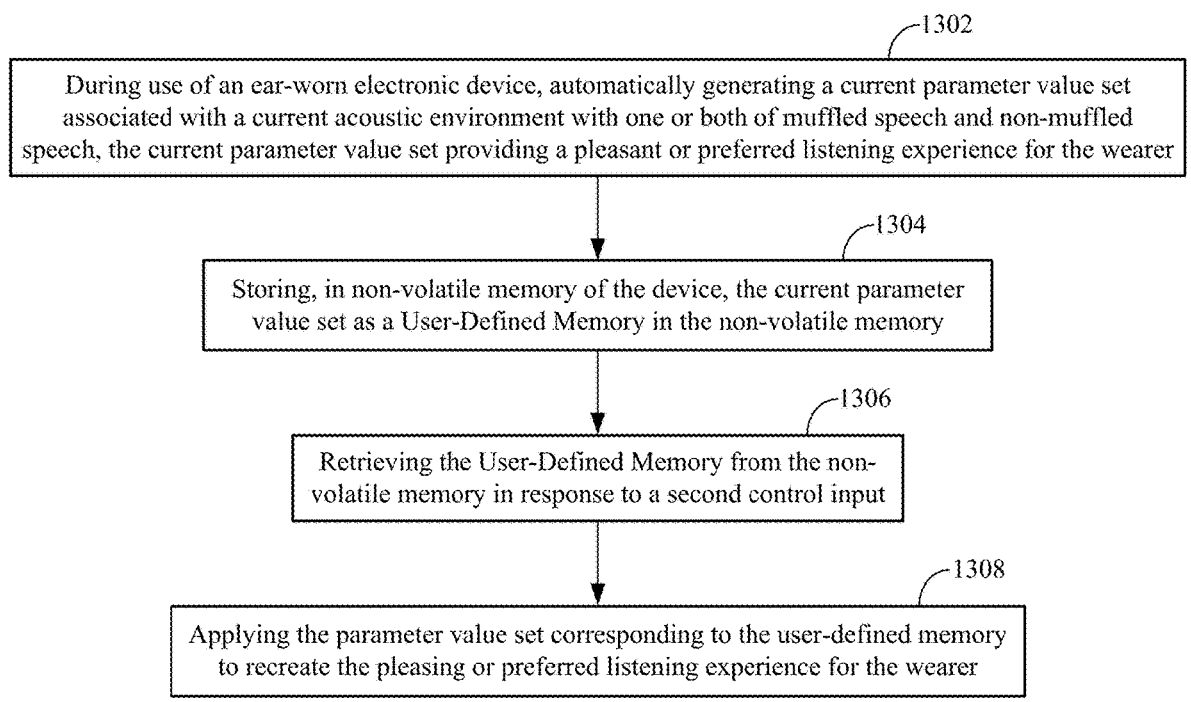
FIG. 13 illustrates a method of implementing an acoustic environment adaptation feature of an ear-worn electronic device in accordance with any of the embodiments disclosed herein.

FIG. 13 illustrates a method of implementing a user-initiated, a sensor-initiated, and/or an external electronic device-initiated acoustic environment adaptation feature of an ear-worn electronic device in accordance with any of the embodiments disclosed herein. The method shown in FIG. 13 can be implemented alone or in combination with any of the methods and processes disclosed herein. The method shown in FIG. 13 involves automatically generating 1302, during use of an ear-worn electronic device, a current parameter value set associated with a current acoustic environment with one or both of muffled speech and non-muffled speech. The current parameter value set can be one that provides a pleasant or preferred listening experience for the wearer of the car-worn electronic device within the current acoustic environment.

The method involves storing 1304, in non-volatile memory of the car-worn electronic device, the current parameter value set as a User-Defined Memory in the non-volatile memory. The method also involves retrieving 1306 the User-Defined Memory from the non-volatile memory in response to a second control input. The method further involves applying 1308 the parameter value set corresponding to the User-Defined Memory to recreate the pleasing or preferred listening experience for the wearer.

It is understood that, in the context of car-worn electronic devices such as hearing aids, the term "memories" (e.g., the User-Defined Memory of FIG. 13) refers generally to a set of parameter settings (e.g., parameter value sets, device settings) that are stored in long-term (e.g., non-volatile) memory of an car-worn electronic device. One or more of these memories can be recalled by a wearer of the car-worn electronic device (or automatically/semi-automatically by the car-worn electronic device) as desired and applied by a processor of the ear-worn electronic device to provide a particular listening experience for the wearer.

In some embodiments, the method illustrated in FIG. 13 (and in other figures) can be implemented with the assistance of a smartphone or other personal digital assistant (e.g., a smart watch, tablet or laptop). For example, and with reference to FIGS. 14A-14C, a smartphone 1400 can store and execute an app configured to facilitate connectivity and interaction with an car-worn electronic device of a type previously described. The app executed by the smartphone 1400 allows the wearer to display the current listening mode (e.g., Edge Mode, Mask Mode, other mode), which in the case of FIG. 14A is an Edge Mode. As can be seen on the display of the smartphone 1400 in FIG. 14A, Edge Mode is indicated as currently active. Although FIGS. 14A-14C illustrate smartphone features associated with Edge Mode, it is understood that these figures and corresponding functions are equally applicable to smartphone features associated with Mask Mode. In other words, the term Edge Mode in FIGS. 14A-14C can be replaced by the term Mask Mode.

With Edge Mode (or Mask Mode) active, the wearer can perform a number of functions, such as Undo, Try Again, and Create New Favorite functions as can be seen on the display of the smartphone 1400 in FIG. 14B. The wearer can tap on the ellipses and choose one of the various available functions. For example, the wearer can tap on the Create New Favorite icon to create a User-Defined Memory. Tapping on the Create New Favorite icon shown in FIG. 14B causes a Favorites display to be presented, as can be seen in FIG. 14C. The wearer can press the Add icon to create a new User-Defined Memory. The wearer is prompted to name the new User-Defined Memory, which is added to the Favorite menu (which can be activated using the Star icon on the home page shown in FIG. 14A).

As can be seen in FIG. 14C, a number of different User-Defined Memories can be created by the wearer, each of which can be named by the wearer. A number of predefined memories can also be made available to the wearer via the Favorites page. The User-Defined Memories and/or predefined memories can be organized based on acoustic environment, such as Home, Office, Restaurant, Outdoors, and Custom (wearer-specified) environments. In some implementations, the last three temporary states (Edge Mode or Mask Mode attempts) are kept and the wearer user can tap on the ellipses next to one of those labels under the Recent heading and convert that to a Favorite.

Figure 15:
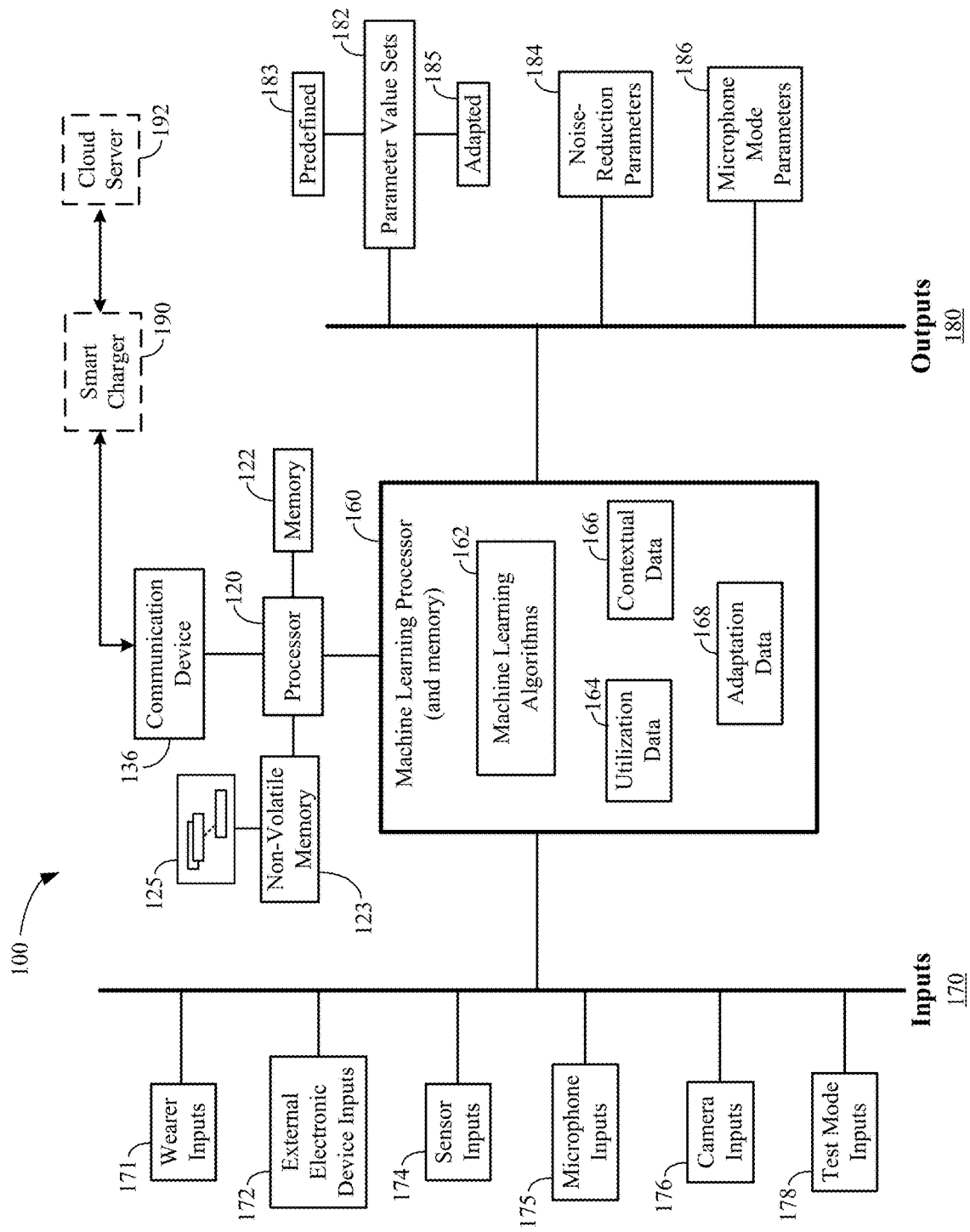
FIG. 15 illustrates a processor, a machine learning processor, and a non-volatile memory of an ear-worn electronic device configured to implement an acoustic environment adaptation feature in accordance with any of the embodiments disclosed herein.

FIG. 15 illustrates a processor, a machine learning processor, and a non-volatile memory of an car-worn electronic device configured to implement an acoustic environment adaptation feature in accordance with any of the embodiments disclosed herein. The components and functionality shown and described with reference to FIG. 15 can be incorporated and implemented in any of the hearing devices disclosed herein (e.g., see FIGS. 1A-1D, 7, 10, 12). The processes described with reference to FIG. 15 can be processing steps of any of the methods disclosed herein (e.g., sec FIGS. 2-6, 8, 9, 11, and 13).

FIG. 15 shows various components of a hearing device 100 in accordance with any of the embodiments disclosed herein. The hearing device 100 includes a processor 120 (e.g., main processor) coupled to a memory 122, a non-volatile memory 123, and a communication device 136. These components of the hearing device 100 can be of a type and have a functionality previously described. The processor 120 is operatively coupled to a machine learning processor 160. The machine learning processor 160 is configured to execute computer code or instructions (e.g., firmware, software) including one or more machine learning algorithms 162. The machine learning processor 160 is configured to receive and process a multiplicity of inputs 170 and generate a multiplicity of outputs 180 via one or more machine learning algorithms 162. The machine learning processor 160 can be configured to process and/or generate various internal data using the input data 170, such as one or more of utilization data 164, contextual data 166, and adaptation data 168. The machine learning processor 160 generates, via the one or more machine learning algorithms 162, various outputs 180 using these data.

The machine learning processor 160 can be configured with executable instructions to process one or more of the inputs 170 and generate one or more of the outputs 180 shown in FIG. 15 and other figures via a neural network and/or a support vector machine (SVM). The neural network can comprise one or more of a deep neural network (DNN), a feedforward neural network (FNN), a recurrent neural network (RNN), a long short-term memory (LSTM), gated recurrent units (GRU), light gated recurrent units (LiGRU), a convolutional neural network (CNN), and a spiking neural network.

An acoustic environment adaptation feature of the hearing device 100 can be initiated by a double-tap input followed by voice commands uttered by the wearer and/or voice assistance provided by the hearing device 100. Alternatively, or additionally, an acoustic environment adaptation feature can be initiated via a control input signal generated by an external electronic device. A voice recognition facility of the hearing device 100 can be configured to listen for voice commands, keywords (e.g., performing keyword spotting), and key phrases uttered by the wearer after initiating the acoustic environment adaptation feature. The machine learning processor 162, in cooperation with the voice recognition facility, can be configured to ascertain/identify the intent of a wearer's voice commands, keywords, and phrases and, in response, adjust the acoustic environment adaptation to more accurately reflect the wearer's intent. For example, the machine learning processor 160 can be configured to perform keyword spotting for various pre-determined keywords and phrases, such as "activate [or deactivate] Edge Mode" and "activate [or deactivate] Mask Mode."

FIG. 15 shows a representative set of inputs 170 that can be received and processed by the machine learning processor 160. The inputs 170 can include wearer inputs 171 (e.g., via a user-interface of the hearing device 100), external electronic device inputs 172 (e.g., via a smartphone or smartwatch), one or more sensor inputs 174 (e.g., via a motion sensor and/or one or more physiologic sensors), microphone inputs 175 (e.g., acoustic environment sensing, wearer voice commands), and camera inputs 176 (e.g., for detecting masked persons in the acoustic environment). The inputs 170 can also include test mode inputs 178 (e.g., random variations of selected hearing device parameters 182, 184, 186) which can cause the hearing device 100 to strategically and automatically make various hearing device adjustments/adaptations to evaluate the wearer's acceptance or non-acceptance of such adjustments/adaptations. For example, the machine learning processor 160 can learn how long a wearer stays in a particular setting during a test mode. Test mode data can be used to fine-tune the relationship between noise and particular parameters. The test mode inputs 178 can be used to facilitate automatic enhancement (e.g., optimization) of an acoustic environment adaptation feature implemented by the hearing device 100.

The outputs 180 from the machine learning processor 160 can include identification and selection of one or more parameter value sets 182, one or more noise-reduction parameters 184, and/or one or more microphone mode parameters 186 that provide enhanced speech intelligibility and/or a more pleasing listening experience. The parameter value sets 182 can include one or both of predefined parameter value sets 183 (e.g., those established using fitting software at the time of hearing device fitting) and adapted parameter value sets 185. The adapted parameter value sets 185 can include parameter value sets that have been adjusted, modified, refined or created by the machine learning processor 160 via the machine learning algorithms 162 operating on the various inputs 170 and/or various data generated from the inputs 170 (e.g., utilization data 164, contextual data 166, adaptation data 168).

The utilization data 164 generated and used by the machine learning processor 160 can include how frequently various modes of the hearing device (e.g., Edge Mode, Mask Mode) are utilized. For example, the utilization data 164 can include the amount of time the hearing device 100 is operated in the various modes and the acoustic classification for which each mode is engaged and operative. The utilization data 164 can also include wearer behavior when switching between various modes, such as how the wearer switches from a specific adaptation to a different adaptation (e.g., timing of mode switching; mode switching patterns).

Contextual data 166 can include contextual and/or listening intent information which can be used by the machine learning processor 160 as part of the acoustic environment classification process and to adapt the acoustic environment classification to more accurately track the wearer's contextual or listening intent. Sensor, microphone, and/or camera input signals can be used by the machine learning processor 162 to generate contextual data 166, which can be used alone or together with the utilization data 164 to ascertain and identify the intent of the wearer when adapting the acoustic environment classification feature of the hearing device 100. These input signals can be used by the machine learning processor 160 to determine the contextual factors that caused or cause the wearer to initiate acoustic environment adaptations and changes to such adaptations. The input signals can include motion sensor signals, physiologic sensor signals, and/or microphone signals indicative of sound in the acoustic environment.

For example, motion sensor signals can be used by the machine learning processor 162 ascertain and identify the activity status of the wearer (e.g., walking, sitting, sleeping, running). By way of example, a motion sensor of the hearing device 100 can be configured to detect changes in wearer posture which can be used by the machine learning processor 160 to infer that the wearer is changing environments. For example, the motion sensor can be configured to detect changes between sitting and standing, from which the machine learning processor 160 can infer that the acoustic environment is or will soon be changing (e.g., detecting a change from sitting in a car to walking from the car into a store; detecting a change from lying down to standing and walking into another room). Microphone and/or camera input signals can be used by the machine learning processor 160 to corroborate the change in wearer posture or activity level detected by the motion sensor.

In another example, the microphone input signals can be used by the machine learning processor 162 to determine whether the wearer is engaged in conversation (e.g., interactive mode) or predominantly engaged in listening (e.g., listening to music at a concert or to a person giving a speech). The microphone input signals can be used by the machine learning processor 162 to determined how long (e.g., a percentage or ratio) the wearer is using his or her own voice relative to other persons speaking (or the wearer listening) by implementing an "own voice" algorithm. The microphone input signals can also be used by the machine learning processor 162 to determine whether a "significant other" is speaking by implementing a "significant other voice" algorithm. The microphone input signals can be used by the machine learning processor 162 to detect various characteristics of the acoustic environment, such as noise sources, reverberation, and vocal qualities of speakers. Using the microphone input signals, the machine learning processor 160 can be configured to select one or more of a parameter value set 182, noise reduction parameters 184, and/or microphone mode parameters 186 best suited for the wearer's current acoustic environment/mode (e.g., interactive or listening; own voice; significant other speaking; noisy).

The machine learning processor 160 is configured to learn wearer preferences using the utilization data 164 and/or the contextual data 166, and to generate adaptation data 168 in response to learning the wearer preferences. The adaptation data 168 can be used by the machine learning processor 160 to select one or more of a parameter value set 182, noise reduction parameters 184, and/or microphone mode parameters 186 best suited for the wearer's current acoustic environment/mode.

For example, the machine learning processor 160 can be configured to apply an initial parameter value set 182 (e.g., a predefined parameter value set 183) appropriate for an initial classification of an acoustic environment in response to receiving an initial control input signal from the wearer or the wearer's smartphone or smart watch, for example. The machine learning processor 160, subsequent to applying the initial parameter value set, can be configured to automatically apply an adapted parameter value set 185 appropriate for the initial or a subsequent classification of the current acoustic environment in the absence of receiving a subsequent control input signal from the wearer or the wearer's smartphone or smart watch.

In another example, the machine learning processor 160 can be configured to apply one or more different parameter value sets 182 appropriate for the classification of the current acoustic environment in response to one or more subsequent control input signals received from the wearer or the wearer's smartphone or smart watch, for example. The machine learning processor 160 can be configured learn wearer preferences using utilization data 164 and/or contextual data 166 acquired during application of the different parameter value sets 182 by the machine learning processor 160, and adapt selection of subsequent parameter value sets 182 by the machine learning processor 160 for subsequent use in the current acoustic environment using the learned wearer preferences.

In a further example, the machine learning processor 160 can be configured apply one or more different parameter value sets 182 appropriate for the classification of the current acoustic environment in response to one or more subsequent control input signals received from wearer or the wearer's smartphone or smart watch, for example. The machine learning processor 160 can be configured to store, in a memory, one or both of utilization data 164 and contextual data 166 acquired by the machine learning processor 160 during application of the different parameter value sets associated with the current acoustic environment. The machine learning processor 160 can be configured to adapt selection of subsequent parameter value sets 182 by the machine learning processor 160 for subsequent use in the current acoustic environment using one or both of the utilization data 164 and the contextual data 166.

In another example, the machine learning processor 160 can be configured to one or more of automatically apply an adapted parameter value set appropriate for an initial or a subsequent classification of the current acoustic environment, learn wearer preferences using utilization data 164 and/or contextual data 166 acquired during application of the different parameter value sets 182 applied by the machine learning processor 160, adapt selection of subsequent parameter value sets 182 by the machine learning processor 160 for subsequent use in the current acoustic environment using learned wearer preferences, and adapt selection of subsequent parameter value sets 182 for subsequent use in the current acoustic environment using one or both of utilization data 164 and contextual data 166.

After having learned preferences of the wearer, the machine learning processor 160 can implement other processes, such as changing memories, re-adapting selection of parameter value sets 182, repeating this process to refine selection of parameter value sets 182, and turning on and off the dynamic adaptation feature implemented by the hearing device 100. The machine learning processor 160 can be configured to learn input signals from various sources that are associated with a change in acoustic environment, which may trigger a dynamic adaptation event. The machine learning processor 160 can be configured to adjust hearing device settings to improve sound quality and/or speech intelligibility, and to achieve an improved or optimal between comfort (e.g., noise level) and speech intelligibility. For example, the machine learning processor 160 can implement various frequency filters to reduce noise sources depending on the classification of the current acoustic environment.

In some configurations, the machine learning processor 160 can be configured to provide separately adjustable compression pathways for sound received by a microphone arrangement of the hearing device 100. For example, the machine learning processor 160 can be configured to input an audio signal to a fast signal level estimator (fast SLE) having a fast low-pass filter characterized by a rise time constant and a decay time constant. The machine learning processor 160 can be configured to input the audio signal to a slow signal level estimator (slow SLE) having a slow low-pass filter characterized by a rise time constant and a decay time constant. The rise time constant and the decay time constant of the fast low-pass filter can both be between 1 millisecond and 10 milliseconds, and the rise time constant and the decay time constant of the slow low-pass filter can both be between 100 milliseconds and 1000 milliseconds.

The machine learning processor 160 can be configured to subtract the output of the slow SLE from the output of the fast SLE and input the result to a fast level-to-gain transformer. The machine learning processor 160 can be configured to input the output of the slow SLE to a slow level-to-gain transformer, wherein the slow level-to-gain transformer is characterized by expansion when the output of the slow SLE is below a specified threshold. The machine learning processor 160 can be configured to amplify the audio signal with a gain adjusted by a summation of the outputs of the fast level-to-gain transformer and the slow level-to-gain transformer, wherein the output of the fast level-to-gain transformer is multiplied by a weighting factor computed as a function of the output of the slow SLE before being summed with the output of the slow level-to-gain transformer. The hearing device 100 can be configured to provide for separately adjustable compression pathways for sound received by the hearing device 100 in manners disclosed in commonly-owned U.S. Pat. No. 9,408,001, which is incorporated herein by reference.

The machine learning processor 160 can be configured to implement high-speed adaptation of the wearer's listening experience based on whether the wearer is speaking or listening and/or for each of a multiplicity of speakers in an acoustic environment. For example, a different adaptation can be implemented by the machine learning processor 160 when the wearer is speaking and when the wearer is listening. An adaptation implemented by the machine learning processor 160 can be selected to reduce occlusion of the wearer's own voice when speaking (e.g., reduce low frequencies). The machine learning processor 160 can be configured to turn on or off "own voice" and/or "significant other voice" algorithms. In some configurations, the machine learning processor 160 can be configured to implement parallel processing by running multiple adaptations simultaneously and dynamically choosing which of the multiple adaptations is implemented (e.g., gait using "own voice" determination).

The machine learning processor 160 can be configured to implement high-speed adaptation of the wearer's listening experience based on each of a multiplicity of speakers in an acoustic environment. For example, the machine learning processor 160 can analyze the acoustic environment for a relatively short period of time (e.g., one or two minutes) in order to identify different speakers in the acoustic environment. For a given window of time, the machine learning processor 160 can identify the speakers present during the time window. Based on the identified speakers and other characteristics of the acoustic environment, the machine learning processor 160 can switch the acoustic environment adaptation based on the number of speakers and the quality/characteristics of their voices (e.g., pitch, frequency).

In accordance with any of the embodiments disclosed herein, data concerning wearer utilization of various hearing device modes (e.g., Edge Mode, Mask Mode), acoustic environment classification and adaptations, and other data received and produced by the machine learning processor 160 and the processor 120 of the hearing device 100 can be communicated to an external electronic device or system via the communication device 136. For example, these data can be communicated from the hearing device 100 to a smart charger 190 configured to charge a rechargeable power source of the hearing device 100, typically on a nightly basis. The data transferred from the hearing device 100 to the smart charger 190 can be communicated to a cloud server 192 (e.g., via the Internet). These data can be transferred to the cloud server 192 on a once-per-day basis.

The data received by the cloud server 192 can be used by a processor of the cloud server 192 to evaluate wearer utilization of various hearing device modes (e.g., Edge Mode, Mask Mode) and acoustic environment classifications and adaptations. With permission of the wearer, the received data can be subject to machine learning for purposes of improving the wearer's listening experience. Machine learning can be implemented to capture data concerning the various acoustic environment classifications and adaptations, the wearer's switching pattern between different hearing device modes, and the wearer's overriding of the hearing device classifier. Using machine learning data produced by the cloud processor and transferred back to the hearing device 100 via the smart charger 190 and/or communication device 136, the machine learning processor 160 of hearing device 100 can refine or optimize its acoustic environment classification and adaptation mechanism. For example, based on the wearer's activity, the machine learning processor 160 can be configured to enter Edge Mode automatically when a particular acoustic environment is detected or prompt for engagement of Edge Mode (e.g., "do you want to engage Edge Mode?").

As discussed previously, a hearing device system can be configured to implement a user-initiated acoustic environment adaptation feature of the system by engaging Edge Mode, such as by double tapping a hearing device or initiating Edge Mode via a smartphone, smart watch, voice command or other user input. The user-initiated acoustic environment adaptation may have two or more different modes, each of which correspond to a particular listening intent, such as enhancement of speech or reduction of noise. In a representative example, upon initiating Edge Mode, the hearing device system may produce processed sound which is automatically optimized for the wearer's acoustic environment (e.g., as a default active setting). If desired, the hearing device wearer can change the listening mode to best match the wearer's listening intent. For example, the wearer can choose between best sound, noise reduction, and enhancement of speech modes. The hearing device system may apply the most recently selected listening mode, absent a request to change the intent via selection of a different Edge Mode option.

Figure 14F:
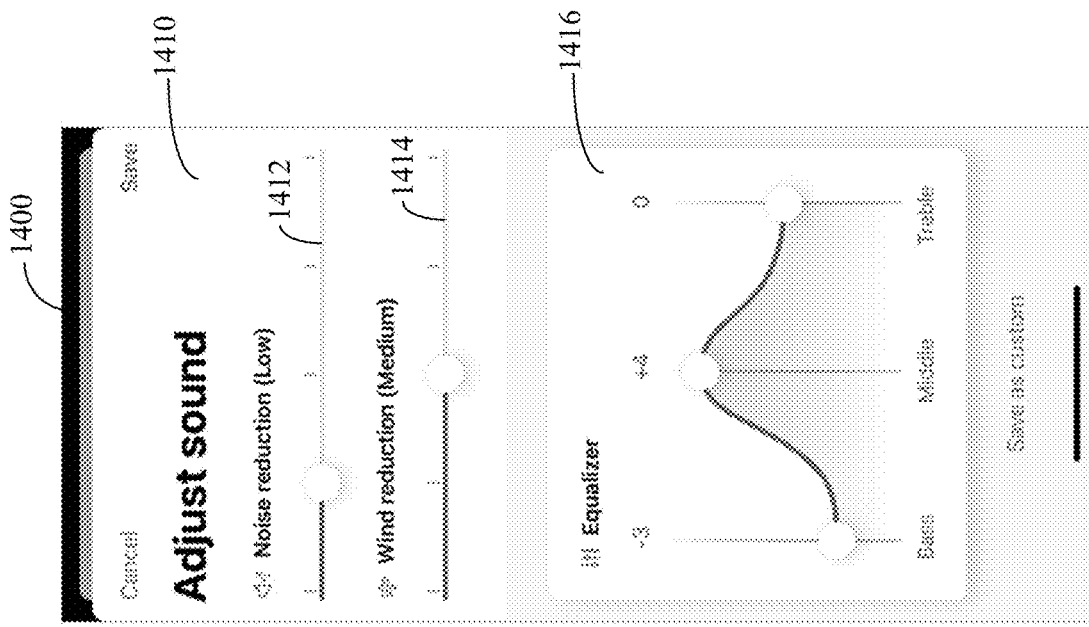
FIGS. 14D-14F illustrate different displays of a smartphone configured to facilitate connectivity and interaction with an ear-worn electronic device for implementing features of an Edge Mode of the ear-worn electronic device in accordance with any of the embodiments disclosed herein.
Figure 14E:
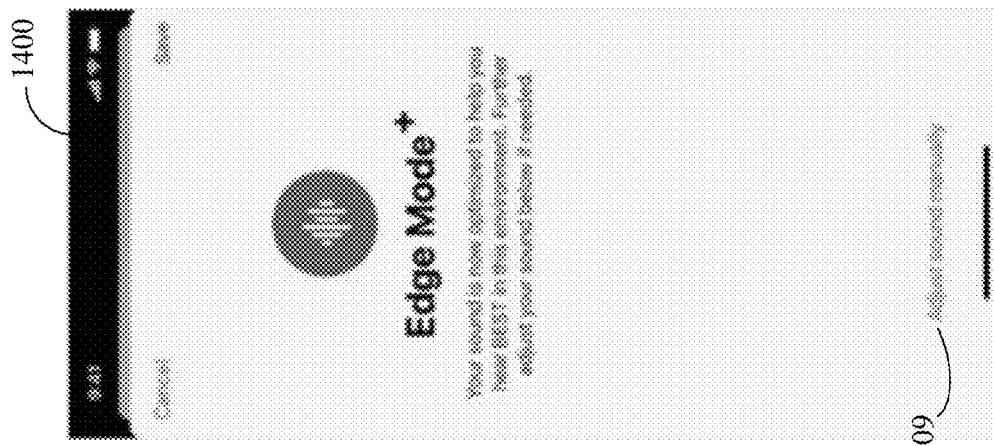
Figure 14D:
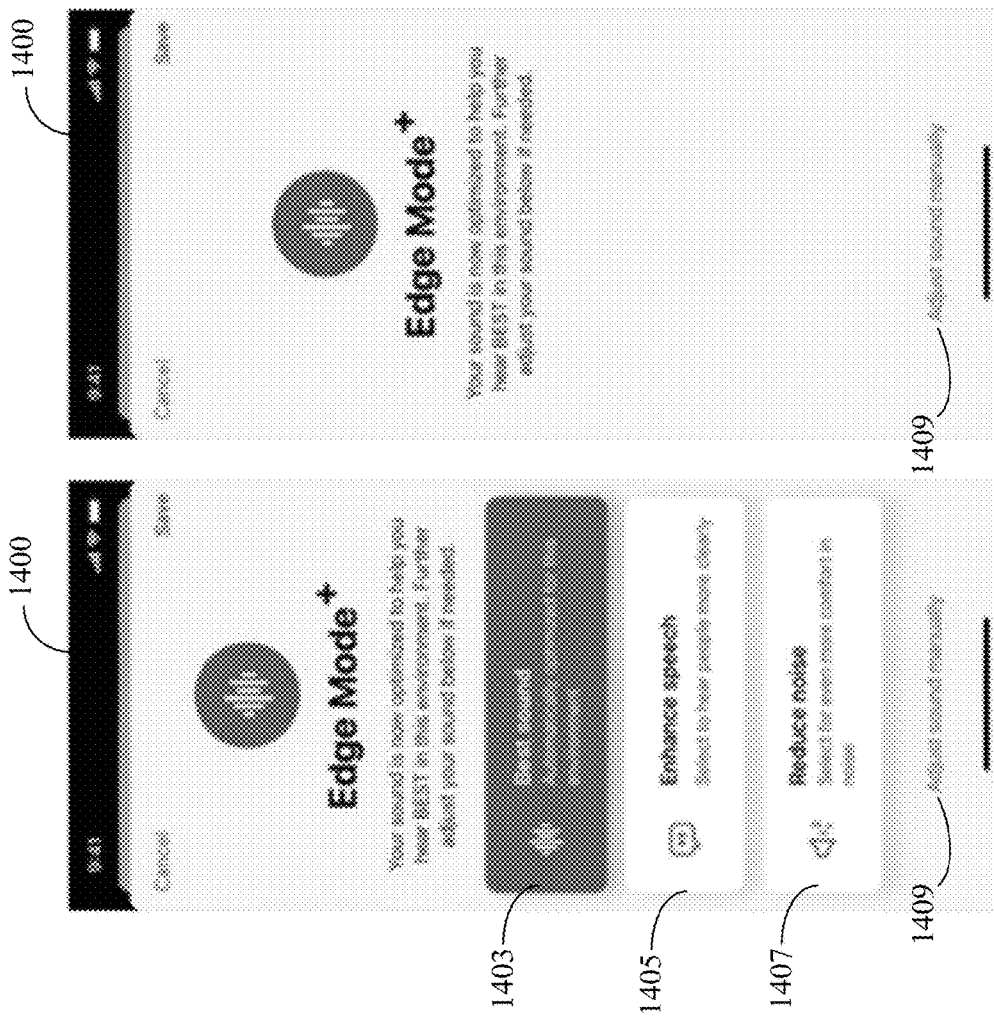

With reference to FIGS. 14D-14F, the smartphone 1400 can execute an app which allows the wearer to select various options involving Edge Mode. The various Edge Mode features allow a wearer of a hearing device to hear better in challenging or unpredictable acoustic environments. The app executed by the smartphone 1400 allows the wearer to select options that automatically set hearing device parameters for the wearer's current acoustic environment and listening intent.

FIG. 14D shows three representative Edge Mode options that are selectable by the wearer. The wearer can press button 1403 to select a Best Sound mode, which results in producing processed sound which is automatically optimized for the wearer's acoustic environment. In some implementations, initiating Edge Mode (e.g., via a wearer input or when opening the Edge Mode screen) defaults to provision of the Best Sound mode. As such, the wearer need not tap the Best Sound button 1403, as Edge Mode is already addressing the wearer's intent by providing the best sound for the current acoustic situation.

FIG. 14E shows a display of the smartphone 1400 that confirms that the Best Sound mode has been selected or executed by default. In response to tapping the Best Sound button 1403, the hearing device system immediately scans the wearer's acoustic environment and applies the best hearing device settings for the environment. As previously discussed, the hearing device wearer does not have to remember which program memory is used for which acoustic situation-instead, the wearer simply gets the best settings for their current situation through the simple press of the Best Sound button 1403.

The wearer can press button 1405 to initiate an Enhance Speech mode, which results in producing processed sound that provides for improved speech intelligibility. The Enhance Speech mode allows the wearer to hear speech more clearly. The wearer can press button 1407 to initiate a Reduce Noise mode, which results in producing processed sound with reduced noise (e.g., machine noise, wind, etc.). Selecting the Reduce Noise mode provides for enhanced wearer comfort in the presence of noise.

In addition to Best Sound, Enhance Speech, and Reduce Noise options, tapping button 1409 opens an Adjust Sound screen 1410 which allows the wearer to adjust the sound manually. As is shown in FIG. 14F, the Adjust Sound screen 1410 includes a Noise Reduction slider 1412 (low to high), a Wind Reduction slider 1414 (low to high), and a multi-band Equalizer 1416. The Equalizer 1416 includes a Base slider, a Middle slider, and a Treble slider. These sliders allow the wearer to achieve more or less emphasis on Bass, Middle (midrange), and Treble sounds.

FIGS. 14G-14I show a smartphone 1400 which can execute an app that allows the wearer to select various options involving Edge Mode in accordance with some implementations. As is shown in FIG. 14G, two Edge mode buttons can be presented to the hearing device wearer. The wearer can tap a Communication button 1420 if it is the wearer's intent to improve speech understanding. In response, the hearing device system applies settings which improve speech intelligibility. The wearer can tap a comfort button 1422 to apply device settings which reduce discomfort from noise. As is shown in FIG. 14H, the wearer can be presented with a screen that allows the wearer to increase or decrease the impact of a selected Edge mode function by selecting a More button or a Less button. The wearer can also tap an Advanced Settings Button which results in presentation of the screen shown in FIG. 14I.

The screen shown in FIG. 14I includes a clarity button 1420, a comfort button 1422, and an energy button 1424. Associated with each of the buttons 1420, 1422, 1424 is a plus button and a minus button. The plus and minus buttons allow the hearing device wearer to increase or decrease the impact of the selected mode. For example, after tapping the clarity button 1420, the user can tap the adjacent plus and minus buttons to respectively increase and decrease the magnitude of speech enhancement experienced by the hearing device wearer. In another example, after tapping the comfort button 1422, the user can tap the adjacent plus and minus buttons to respectively increase and decrease the magnitude of noise reduction experienced by the hearing device wearer. In a further example, after tapping the energy button 1424, the user can tap the adjacent plus and minus buttons to respectively increase and decrease the magnitude of overall sound energy (e.g., less or more compression) experienced by the hearing device wearer.

In some implementations, the hearing device system can also adjust the directionality of the microphone(s) relative to the sound in the wearer's acoustic environment. For example, and as shown in FIG. 14I, the hearing device wearer can select between an All Around option, an Automatic option, and a Directional option. For example, a user input may select All Around or omnidirectional mode, a directional preference (e.g., towards the front or towards the sound source), or "automatic" in which case the system automatically determines appropriate directionality settings based on the ambient environment, the listening intent (e.g., frontal for enhanced speech, omnidirectional in comfort mode), or a combination thereof.

In some implementations, as opposed to choosing between discrete listening intents, the hearing device system may receive a user input to move more toward one listening intent or the other. For example, noise reduction (comfort) and enhancement of speech (clarity) can be thought of as opposite ends of a continuum, with conflicting trade-offs that may tend to work against each other. For example, some parameter changes that enhance speech may tend to increase noise. Conversely, some parameter changes that reduce noise may reduce clarity of speech.

Ideally, comfort and clarity are optimized together, but a user preference may be received to find a "sweet spot" on the continuum. For example, if a noise reduction listening intent is selected, but a user desires a little more conversational clarity, the hearing device system may receive a user request through an input (e.g., "more clarity" button a smartphone interface) that causes the hearing instrument to apply parameters that increase speech intelligibility. Conversely, the system may receive a user request through an input to increase noise reduction, in which case the hearing device system will implement parameters to apply additional noise reduction. The user input may be implemented, for example, as a pair of buttons (e.g., "more comfort" and "more clarity") or as a slider, a dial, or other appropriate user interface element.

For example, if the listening intent (e.g., goal) of the hearing device wearer is noise reduction, more aggressive noise reduction may be applied, and an omnidirectional polar pattern of the hearing device microphone(s) may also be applied. If the listening intent is enhancement of speech, less aggressive noise reduction may be applied as parameters are selected to enhance speech and more ambient noise is tolerated. A frontal directionality may be applied to emphasize sounds coming from the space in front of a person speaking or a calculated directionality may be applied based on the detected direction of a conversational speaker.

In some implementations, the hearing device system may determine a listening intent and apply that listening intent or prompt the user to make a selection if the current setting appears not to match the listening intent determined by the system. The hearing device system may determine the listening intent based on one or more of a sound sample of the ambient environment, the location of the hearing device system (e.g., determined by GPS or by connection to a known wireless network or presences of a Bluetooth beacon), past behavior of the hearing device wearer (e.g., learned based on prior user activity, such as selection of listening intent or lack of change of listening intent), physiological state, and activity state (e.g., walking, running, singing, dancing, presence in an automobile). In other words, the hearing device system may make parameter adjustments based on the ambient environment, the hearing device wearer's listening intent (preferences, such as comfort, clarity, music), and the wearer's past use of the hearing device system or past use of the user-initiated acoustic environment adaptation feature.

By way of example, the system may use "turn-taking" as a signal that the hearing device wearer is participating in a conversation and therefore has an "enhance speech" listing intent. The term "turn-taking" refers to back and forth conversation between at least two persons. The hearing device system may use an "own-voice" detection algorithm to differentiate a hearing device wearer's voice from that of a conversation partner. The back-and-forth characteristics of a conversation may be detected by the hearing device system based on the periodic or intermittent absence and presence of a wearer's voice and that of a nearby talker. Suitable own-voice detection algorithms are disclosed in commonly-owned U.S. Pat. Nos. 10,652,672 and 9,210,518, which are incorporated herein by reference in their entireties. In response to detecting turn-taking, the hearing device system can initiate an Enhance Speech mode automatically or prompt the wearer to provide a user input to indicate that the Enhance Speech mode is desired.

In some implementations, a hearing device system may determine information about a wearer's directional listening intent and apply appropriate settings based on that intent. For example, the hearing device system may detect a characteristic of head-turning behavior (e.g., frequency of head-turning, degree of head-turning) and adapt a directional field (e.g., polar pattern) of the microphone(s) based on the head turning. The head-turning behavior may be determined using a motion sensor (e.g., an accelerometer or IMU), from sound detected by the microphone(s), or a combination thereof.

In other implementations, head-turning and turn-taking may be used together by the hearing device system to infer a listening intent, the intended breadth of a listening field, or both. In other implementations, a hearing device system may use head-turning combined with sound captured from a microphone to determine hearing device parameters. For example, if head-turning correlates with speaking (or speaking from specific directions), the hearing device system may determine that a listener intends to hear a sound from a particular direction and apply directional settings to capture audio from that sound source (e.g., from a talker sitting to the left and front of the hearing device wearer.)

In an example, if it is determined that a hearing device wearer is turning their head left and right during a conversation (or other listening environment), the hearing device system may infer an intent to capture sound from relatively widely distributed sound sources and apply a relatively wide directional field for the microphone(s). In other words, when a user is turning their head frequently during a conversation, the breadth of a directional field may be based on the fact that the user is turning their head and the degree to which they are turning their head (e.g., 75 degrees or 90 degrees or 120 degrees or 150 degrees.) In another example, if a hearing device wearer is talking relative to a singular direction (e.g., little to no head turning as detected by the motion sensor), the hearing device system may infer that the wearer intends to listen in a frontal field and apply a relatively focused (e.g., narrow) directional field.

According to some implementations, and as previously discussed, the listening intent of a hearing device wearer can be learned or inferred based in part on the location of the wearer. The location of the wearer can be determined by the hearing device system or an external electronic device (e.g., a mobile device such as a smartphone or smart watch). For example, one or both of the hearing device system and the mobile device can include a GPS sensor. In another example, wearer location can be determined by the hearing device system or the mobile device based on a connection to a wireless signal (e.g., connection to a WiFi network or Bluetooth beacon).

For example, upon arriving at a certain location (e.g., a store, restaurant, gas station, music hall, home), the hearing device wearer may choose to initiate Edge Mode, such as by applying a double tap to the device. As a result, the hearing device system initiates Edge Mode which may automatically produce processed sound that is optimized for the acoustic environment at the location. The wearer may wish to modify the optimized parameter settings of the device to enhance speech or to provide enhanced comfort by reducing noise (e.g., see FIG. 14D).

The hearing device system can be configured to learn the wearer's listening intent at the location based on the whether or not modifications were made to the listening experience provided by Edge Mode. For example, if the wearer selected the reduce noise option at a certain restaurant, the reduce noise option can become the active setting the next time the wearer visits the same restaurant. The hearing device system can store the geographical location of the restaurant and the Edge Mode selection(s) made by the wearer at the geographical location. The next time the wearer visits the same restaurant location (as detected by the hearing device system or mobile device) and initiates Edge Mode, the hearing device system selects parameter settings appropriate for the restaurant's acoustic environment and the wearer's prior Edge Mode selection(s) made for the restaurant.

The hearing device system may also learn based on specific user customization for a particular geographical location, or a positive or negative user assessment of a particular user-initiated acoustic environment adaptation for that location. For example, the hearing device system may receive specific user feedback ("I like this adaptation" or "I don't like this adaptation") via a user input. The hearing device system may infer that a user-initiated acoustic environment adaptation is not satisfactory based on user behavior, such as a repeated requests for adaptation, or from removal or turning off of the hearing devices (e.g., the user elected not to use the hearing devices). In some examples, the system may prompt a query based on location (e.g., "apply previous Edge Mode selection for this location?").

In a representative example, if the hearing device wearer used comfort in an environment once, or two times, or three out of five times, the hearing device system would know that the user preferred a particular mode (e.g., comfort) for that location. For example, even though a person's normal preferred mode may be clarity, when the person is at a particular location, the hearing device system may switch to comfort mode (e.g., based on past utilization at the location) and implement appropriate settings in response to a user input (e.g., a double-tap).

Referring again to FIG. 14D, four buttons are shown on the screen of the smartphone 1400. It is understood that other buttons can be included that provide for additional Edge Mode features. For example, a button can be added that allows the hearing device wearer to Enhance Music. In response to tapping the Enhance Music button, the hearing device system processes ambient or streamed music by adjusting, for example, the gain of different frequency bands (e.g., bass, midrange, treble). For example, the hearing device system can automatically adjust the bass, midrange, and treble to pre-established levels known to be pleasing to a population of music listeners. The user may tap the Adjust Sound Manually button 1409 to modify the bass, midrange, and treble as desired. These equalizer settings can be stored in a memory of the hearing device system and/or the mobile device for later use by the hearing device system when the Enhance Music button is tapped.

In some implementations, the hearing device system can automatically detect the type of music being played based on spectral and/or temporal content of the music. For example, the hearing device system can be configured to distinguish between classical, jazz, rock, and pop based on spectral and/or temporal profiles established for each genre of music. Music genres can be distinguished, for example, based on a percussion index which estimates the amount of percussion that can be found in a music audio signal and yields a (numerical or categorical) value that represents the amount of percussion detected in the signal. In some implementations, music genres can be distinguished based on a percussion profile, which roughly indicates the existing balance between drums and cymbals. Because the measure of percussiveness (e.g., percentage of percussive sounds) is a high-level feature, it is well suited to be used as a discriminator for distinguishing between music genres. The hearing device system (or the external electronic device) can be configured to distinguish between music genres in a manner described in U.S. Pat. No. 7,718,881, which is incorporated herein by reference.

Equalizer settings of the hearing device system can be established (and modified as desired) for each genre of music of interest to the hearing device wearer. For example, the bass setting can be increased and the treble may be reduced for playing rap music, whereas the base setting can be reduced and the midrange and treble increased when playing classical music. The hearing device system can be configured to apply a pre-established equalizer setting in response to detecting the particular genre of music being monitored by the hearing device.

It is noted that FIGS. 1A, 1B, 1C, and 15 each describe an exemplary ear-worn electronic device 100 with various components. However, it will be appreciated that each of the sensor arrangement 134, the sensor(s) 150, the external electronic device 152, the rechargeable power source 124, the charging circuitry 126, the machine learning processor 160, the smart charger 190, and the cloud server 192 are optional/preferably. Therefore, it will be appreciated by the person skilled in the art that the ear-worn electronic device 100 may have any combination of components including processor 120, main memory 122, non-volatile memory 123, classification module 138, microphone(s) 130, control input 129, communication device(s) 136, acoustic transducer 132, and user-actuatable control 127.

It will be appreciated by the person skilled in the art that the ear-worn electronic device 100 may have any combination of components including processor 120, main memory 122, non-volatile memory 123, classification module 138, microphone(s) 130, control input 129, communication device(s) 136, acoustic transducer 132, user-actuatable control 127, sensor-actuatable control 128, and sensor(s) 150.

It will be appreciated by the person skilled in the art that the ear-worn electronic device 100 may have any combination of components including processor 120, main memory 122, non-volatile memory 123, classification module 138, microphone(s) 130, control input 129, communication device(s) 136, acoustic transducer 132, user-actuatable control 127, sensor-actuatable control 128, sensor(s) 150, and external electronic device 152.

It will be appreciated by the person skilled in the art that the ear-worn electronic device 100 may have any combination of components including processor 120, main memory 122, non-volatile memory 123, classification module 138, microphone(s) 130, control input 129, communication device(s) 136, acoustic transducer 132, user-actuatable control 127, and machine learning processor 160.

It will be appreciated by the person skilled in the art that the ear-worn electronic device 100 may have any combination of components including processor 120, main memory 122, non-volatile memory 123, classification module 138, microphone(s) 130, control input 129, communication device(s) 136, acoustic transducer 132, user-actuatable control 127, sensor-actuatable control 128, sensor(s) 150, and machine learning processor 160.

It will be appreciated by the person skilled in the art that the ear-worn electronic device 100 may have any combination of components including processor 120, main memory 122, non-volatile memory 123, classification module 138, microphone(s) 130, control input 129, communication device(s) 136, acoustic transducer 132, user-actuatable control 127, sensor-actuatable control 128, sensor(s) 150, external electronic device 152, and machine learning processor 160.

It will be appreciated by the person skilled in the art that one or more of the processor 120, the methods implemented using the processor 120, the machine learning processor 160, and the methods implemented using the machine learning processor 160 can be components of an external device or system configured to communicatively couple to the hearing device 100, such as a smartphone or a smart watch. It will also be appreciated by the person skilled in the art that the microphone(s) 130 can be one or more microphones of an external device or system configured to communicatively couple to the hearing device 100, such as a smartphone or a smart watch.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. A method implemented by an ear-worn electronic device configured to be worn in, on or about an ear of a user, the method comprising:
   storing a plurality of parameter value sets in the device, each of the parameter value sets associated with a different acoustic environment;
   classifying, by a processor of the device, an acoustic environment of the user using sound sensed by the device;
   receiving an input signal in response to a user action;
   determining, by the processor, a listening intent preference of the user; and
   applying, by the processor in response to the input signal, one of the parameter value sets to a captured audio stream to deliver processed sound through the device, the processed sound being appropriate for the classification and consistent with the listening intent preference of the user.

2. The method of claim 1, wherein the listening intent preference of the user is a preference to enhance speech intelligibility.

3. The method of claim 2, comprising adjusting a degree of speech intelligibility enhancement in response to a user input.

4. The method of claim 1, wherein the listening intent preference of the user is a preference to reduce noise.

5. The method of claim 4, comprising adjusting a degree of noise reduction in response to a user input.

6. The method of claim 1, wherein the listening intent preference of the user is a preference to optimize sound for the user's acoustic environment.

7. The method of claim 1, wherein determining the listening intent preference comprises receiving a sensor signal from which the listening intent preference is determined.

8. The method of claim 7, wherein the sensor signal is generated by an accelerometer or an inertial measurement unit of the device.

9. The method of claim 7, wherein the sensor signal is generated by a microphone of the device.

10. The method of claim 7, wherein the sensor signal is generated by a physiologic sensor of the device.

11. The method of claim 1, wherein determining the listening intent preference comprises receiving a preference signal from an external electronic device.

12. An ear-worn electronic device configured to be worn in, on or about an ear of a user, comprising:
   at least one microphone configured to sense sound in an acoustic environment;
   an acoustic transducer;
   a non-volatile memory configured to store a plurality of parameter value sets, each of the parameter value sets associated with a different acoustic environment;
   a control input configured to receive a control input signal produced by at least one of a user-actuatable control of the ear-worn electronic device and an external electronic device communicatively coupled to the ear-worn electronic device in response to a user action; and
   a processor operably coupled to the microphone, the acoustic transducer, the non-volatile memory, and the control input, the processor configured to classify the acoustic environment using the sensed sound and determine a listening intent preference of the user, the processor configured to apply, in response to the control input signal, one of the parameter value sets appropriate for the classification and the listening intent preference of the user.

13. The device of claim 12, wherein the processor is configured to determine the listening intent preference of the user in response to one or both of a user input and a sensor signal.

14. The device of claim 12, wherein the processor is configured to determine the listening intent preference of the user in response to a sensor signal, the sensor signal generated by the microphone, an accelerometer of the device, an inertial measurement unit of the device, or a physiologic sensor of the device.

15. The device of claim 12, wherein the processor is configured to determine the listening intent preference of the user in response to a user input received from an external electronic device.

16. The device of claim 12, wherein the listening intent preference of the user is a preference to enhance speech intelligibility.

17. The device of claim 16, wherein the processor is configured to adjust a degree of speech intelligibility enhancement in response to a user input.

18. The device of claim 12, wherein the listening intent preference of the user is a preference to reduce noise.

19. The device of claim 18, wherein the processor is configured to adjust a degree of noise reduction in response to a user input.

20. The device of claim 12, wherein the listening intent preference of the user is a preference to optimize sound for the user's acoustic environment.

* * * * *